(12) United States Patent
Taketa et al.

(10) Patent No.: US 8,326,058 B2
(45) Date of Patent: *Dec. 4, 2012

(54) IMAGE CODING APPARATUS, IMAGE DECODING APPARATUS, IMAGE DISPLAY APPARATUS AND IMAGE PROCESSING APPARATUS

(75) Inventors: Kazuhiko Taketa, Anpachi-Gun (JP); Shigeyuki Okada, Ogaki (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/029,748

(22) Filed: Feb. 17, 2011

(65) Prior Publication Data

US 2011/0206286 A1  Aug. 25, 2011

Related U.S. Application Data

(62) Division of application No. 11/052,094, filed on Feb. 8, 2005, now Pat. No. 8,005,309.

(30) Foreign Application Priority Data

Feb. 9, 2004 (JP) ................. 2004-032383
Feb. 9, 2004 (JP) ................. 2004-032394
Mar. 29, 2004 (JP) ................. 2004-094449

(51) Int. Cl.
*G06K 9/36* (2006.01)
(52) U.S. Cl. ........ 382/232; 382/233; 382/276; 382/250; 382/251
(58) Field of Classification Search .................. 382/232, 382/233, 240, 243, 244, 245, 246, 238, 239, 382/250, 251, 253; 375/240.03, 240.11, 375/240.25, 240.26, 240.24; 348/241, 14.12
See application file for complete search history.

(56) References Cited

U.S. PATENT DOCUMENTS

| 4,903,317 | A | 2/1990 | Nishihara et al. |
| 5,608,458 | A | 3/1997 | Chen et al. |
| 5,799,109 | A | 8/1998 | Chung et al. |
| 5,978,034 | A | 11/1999 | Hosaka |

(Continued)

FOREIGN PATENT DOCUMENTS

CN  1305684 A  7/2001

(Continued)

OTHER PUBLICATIONS

Office Action for related U.S. Appl. No. 11/718,291 (01129-1022), Nov. 16, 2011, pp. 1-28.
Chinese Office Action for corresponding CN Application No. 200510007933.4, dated Nov. 3, 2006, pp. 1-13, China.
Chinese Office Action for corresponding CN Application No. 200510007933.4, dated Nov. 16 2007, pp. 1-17, China.

(Continued)

*Primary Examiner* — Ali Bayat
(74) *Attorney, Agent, or Firm* — Ditthavong Mori & Steiner, P.C.

(57) ABSTRACT

A wavelet transform unit performs a wavelet transform on original images and a quantization unit quantizes wavelet transform coefficients. A ROI selector selects a region of interest or regions of interest in the original image, and a ROI mask generator generates ROI masks with which the wavelet transform coefficients (which are also called ROI transform coefficients) corresponding to the regions of interest are specified. By referring to the ROI masks, a lower-bit zero substitution unit substitutes low-order bits of non-ROI transform coefficients with zeros. An entropy coding unit entropy-codes the wavelet transform coefficients sequentially from high-order bit-planes, after the substitution. A coded data generator turns coded data into streams together with parameters and then outputs coded images.

6 Claims, 41 Drawing Sheets

U.S. PATENT DOCUMENTS

| | | | |
|---|---|---|---|
| 6,256,423 | B1 | 7/2001 | Krishnamurthy et al. |
| 6,263,021 | B1 | 7/2001 | Sethuraman et al. |
| 6,457,030 | B1 | 9/2002 | Adams et al. |
| 6,584,230 | B2 | 6/2003 | Yamaguchi et al. |
| 7,650,567 | B2 | 1/2010 | Itoh et al. |
| 2001/0024525 | A1 | 9/2001 | Hata et al. |
| 2001/0048770 | A1 | 12/2001 | Maeda |
| 2002/0126906 | A1 | 9/2002 | Christopoulos et al. |
| 2002/0154823 | A1 | 10/2002 | Okada |
| 2003/0035478 | A1 | 2/2003 | Taubman |
| 2004/0228403 | A1* | 11/2004 | Yu ............................ 375/240.03 |
| 2005/0025371 | A1* | 2/2005 | Atsumi et al. ................ 382/239 |
| 2006/0072667 | A1* | 4/2006 | Kirenko et al. .......... 375/240.23 |
| 2006/0168517 | A1 | 7/2006 | Itoh et al. |
| 2007/0237409 | A1* | 10/2007 | Atsumi et al. ................ 382/239 |

FOREIGN PATENT DOCUMENTS

| | | |
|---|---|---|
| CN | 1320337 A | 10/2001 |
| CN | 1420633 A | 5/2003 |
| CN | 1496110 A | 5/2004 |
| JP | 4-22280 A | 1/1992 |
| JP | 5-300516 A | 11/1993 |
| JP | 7-203434 A | 8/1995 |
| JP | 7-288806 A | 10/1995 |
| JP | 8-280030 A | 10/1996 |
| JP | 9-18876 A | 1/1997 |
| JP | 9-46710 | 2/1997 |
| JP | 10-98732 A | 4/1998 |
| JP | 10-271510 A | 10/1998 |
| JP | 10-304353 A | 11/1998 |
| JP | 11-75178 A | 3/1999 |
| JP | 2001-45484 A | 2/2001 |
| JP | 2001-119625 A | 4/2001 |
| JP | 2001-128126 | 5/2001 |
| JP | 2001-160062 A | 6/2001 |
| JP | 2001-313944 A | 11/2001 |
| JP | 2002-44551 A | 2/2002 |
| JP | 2002-94991 A | 3/2002 |
| JP | 2002-508606 | 3/2002 |
| JP | 2002-135593 A | 5/2002 |
| JP | 2002-325257 A | 11/2002 |
| JP | 2002-330951 A | 11/2002 |
| JP | 2003-204436 A | 7/2003 |
| JP | 2003-284071 A | 10/2003 |
| JP | 2003-299033 A | 10/2003 |
| JP | 2003-399047 A | 11/2003 |
| JP | 2004-40429 A | 2/2004 |
| JP | 2004-72655 A | 3/2004 |
| JP | 2004-228680 A | 8/2004 |
| JP | 2004-240844 A | 8/2004 |
| JP | 2004-272712 A | 9/2004 |
| WO | WO 99/49412 A1 | 9/1999 |
| WO | WO 99/49413 A1 | 9/1999 |
| WO | WO 00/01153 A1 | 1/2000 |
| WO | WO 00/22832 A1 | 4/2000 |
| WO | WO 03/034740 A1 | 4/2003 |
| WO | WO 2004/081799 A1 | 9/2004 |

OTHER PUBLICATIONS

Chinese Office Action for corresponding CN Application No. 200510007933.4, dated Jan. 22, 2010, pp. 1-15, China.
Chinese Office Action for corresponding CN Application No. 200510081494.1, dated Aug. 3, 2007, pp. 1-20, China.
Chinese Office Action for corresponding CN Application No. 200510081494.1, dated Feb. 15, 2008, pp. 1-20, China.
Chinese Office Action for corresponding CN Application No. 200580036816.9, dated Apr. 4, 2008, pp. 1-13, China.
Chinese Office Action for corresponding CN Application No. 200710197162.9, dated Oct. 30, 2009, China.
Chinese Office Action for corresponding Patent Application No. CN200510007933.4, dated Jul. 17, 2009, China.
International Preliminary Report on Patentability and Written Opinion for PCT/JP2005/019582, dated May 1, 2007, pp. 1-14.
International Preliminary Report on Patentability and Written Opinion for PCT/JP2005/019583, dated May 1, 2007, pp. 1-18.
International Search Report for PCT/JP2005/019582, dated Jan. 17, 2006, pp. 1-12.
International Search Report for PCT/JP2005/019583, dated Dec. 27, 2005, pp. 1-16.
ISA/IEC 15444-1, Information Technology—JPEG2000 image coding system—Part 1: Core coding system (Annex H "coding of images with region of interest", ISA/IEC 2000.
Japanese Office Action for corresponding Application No. JP 2007-157542, dated Aug. 31, 2010, pp. 1-14 Japan.
Japanese Office Action for corresponding Application No. JP 2007-157544, dated Aug. 31, 2010, pp. 1-13 Japan.
Japanese Office Action for corresponding JP Application No. 2004-032383, dated Aug. 5, 2008, pp. 1-4, Japan.
Japanese Office Action for corresponding JP Application No. 2004-032394, dated Jan. 19, 2010, pp. 1-5, Japan.
Japanese Office Action for corresponding JP Application No. 2004-094449, dated Jul. 29, 2008, pp. 1-5, Japan.
Japanese Office Action for corresponding JP Application No. 2004-190802, dated Jul. 29, 2008, pp. 1-4, Japan.
Japanese Office Action for corresponding JP Application No. 2004-190802, dated Oct. 14, 2008, pp. 1-4, Japan.
Japanese Office Action for corresponding JP Application No. 2004-251939, Jun. 30, 2009, Japan.
Japanese Office Action for corresponding JP Application No. 2004-316734, dated Dec. 8, 2009, pp. 1-4, Japan.
Japanese Office Action for corresponding JP Application No. 2004-316734, dated Jun. 22, 2010, pp. 1-4 Japan.
Japanese Office Action for corresponding JP Application No. 2004-316735, dated Jun. 17, 2008, pp. 1-4, Japan.
Japanese Office Action for corresponding JP Application No. 2004-316735, dated Sep. 9, 2008, pp. 1-7, Japan.
Japanese Office Action for corresponding JP Application No. 2004-316735, dated Dec. 9, 2008, pp. 1-4 Japan.
Japanese Office Action for corresponding JP Application No. 2004-316735, dated Feb. 9, 2010, pp. 1-15, Japan.
Japanese Office Action for corresponding JP Application No. 2007-144869, dated Jun. 22, 2010, pp. 1-6 Japan.
Japanese Office Action for corresponding JP Application No. 2007-157542, Jun. 9, 2009, Japan.
Japanese Office Action for corresponding JP Application No. 2007-157542, Sep. 1, 2009, Japan.
Japanese Office Action for corresponding JP Application No. 2007-157544, Jun. 9, 2009, Japan.
Japanese Office Action for corresponding JP Application No. 2007-157544, Sep. 1, 2009, Japan.
Japanese Office Action for corresponding JP Application No. 2010-257512, dated Feb. 8, 2011, pp. 1-26 Japan.
Korean Office Action for corresponding KR Application No. 10-2007-7012013, Aug. 31, 2009, Korea.
Korean Office Action for corresponding KR Application No. 10-2008-7008106, Aug. 31, 2009, Korea.
Korean Office Action for corresponding KR Application No. 10-2008-7008107, Aug. 31, 2009, Korea.
Taiwanese Office Action for related TW Application No. 94137601, dated Feb. 25, 2009, pp. 1-10, Taiwan.
U.S. Office Action for corresponding U.S. Appl. No. 11/718,211, dated May 18, 2010, pp. 1-47.
U.S. Office Action for corresponding U.S. Appl. No. 12/621,952, dated Dec. 27, 2010, pp. 1-26.
Response to Non-Final Office Action for corresponding U.S. Appl. No. 11/718,211, filed May 5, 2011, pp. 1-10.
U.S. Office Action for corresponding U.S. Appl. No. 11/718,211, dated Feb. 17, 2011, pp. 1-15.
Japanese Office Action for corresponding JP Application No. 2004-316734, dated Mar. 29, 2011, pp. 1-6, Japan.
Japanese Office Action for corresponding JP Application No. 2007-144869, dated Jun. 14, 2011, pp. 1-8, Japan.
Final Office Action for related U.S. Appl. No. 11/718,291 (01129-1022) dated Jun. 6, 2011, pp. 1-16.
Office Action for related U.S. Appl. No. 11/762,456, Jun. 10, 2011, pp. 1-95.

* cited by examiner

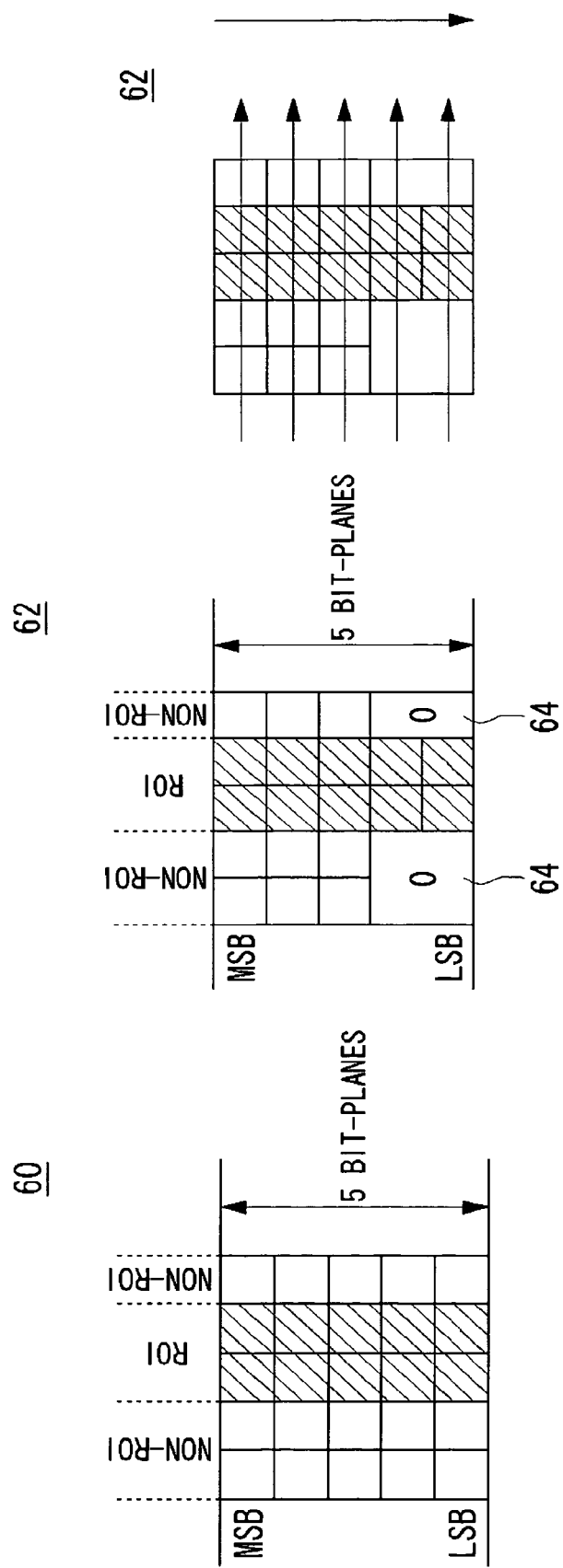

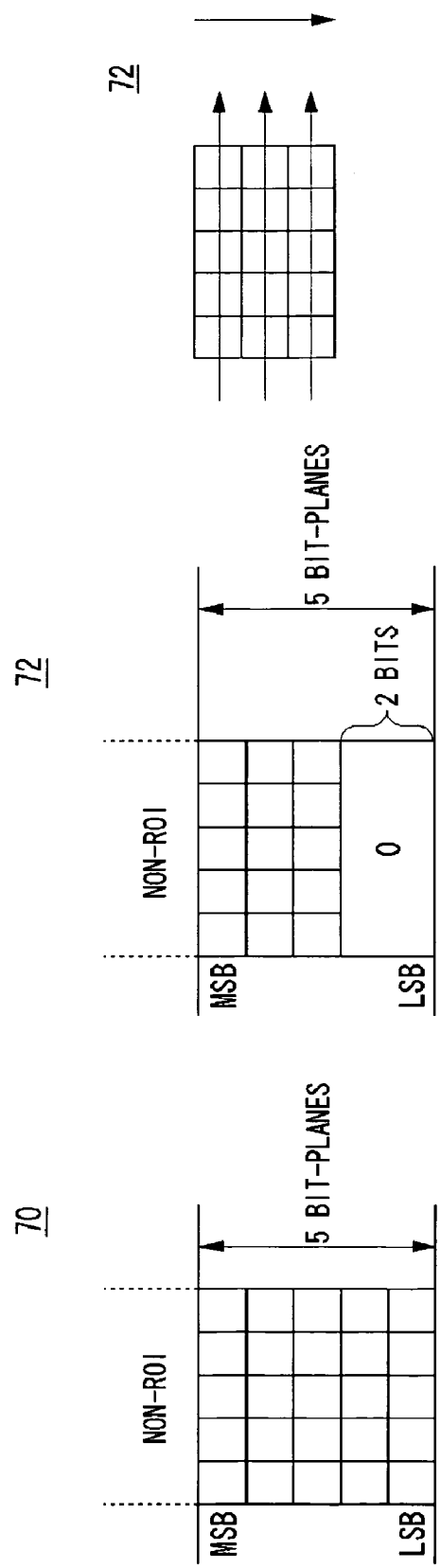

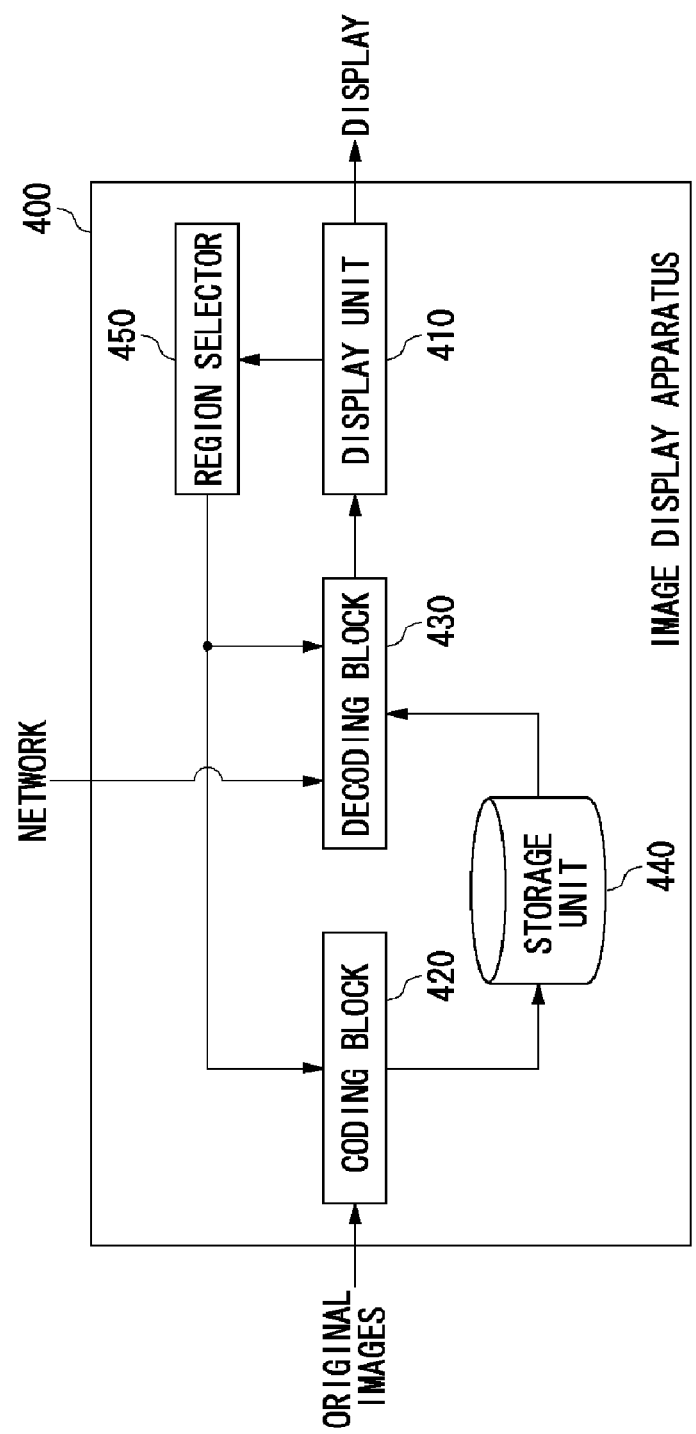

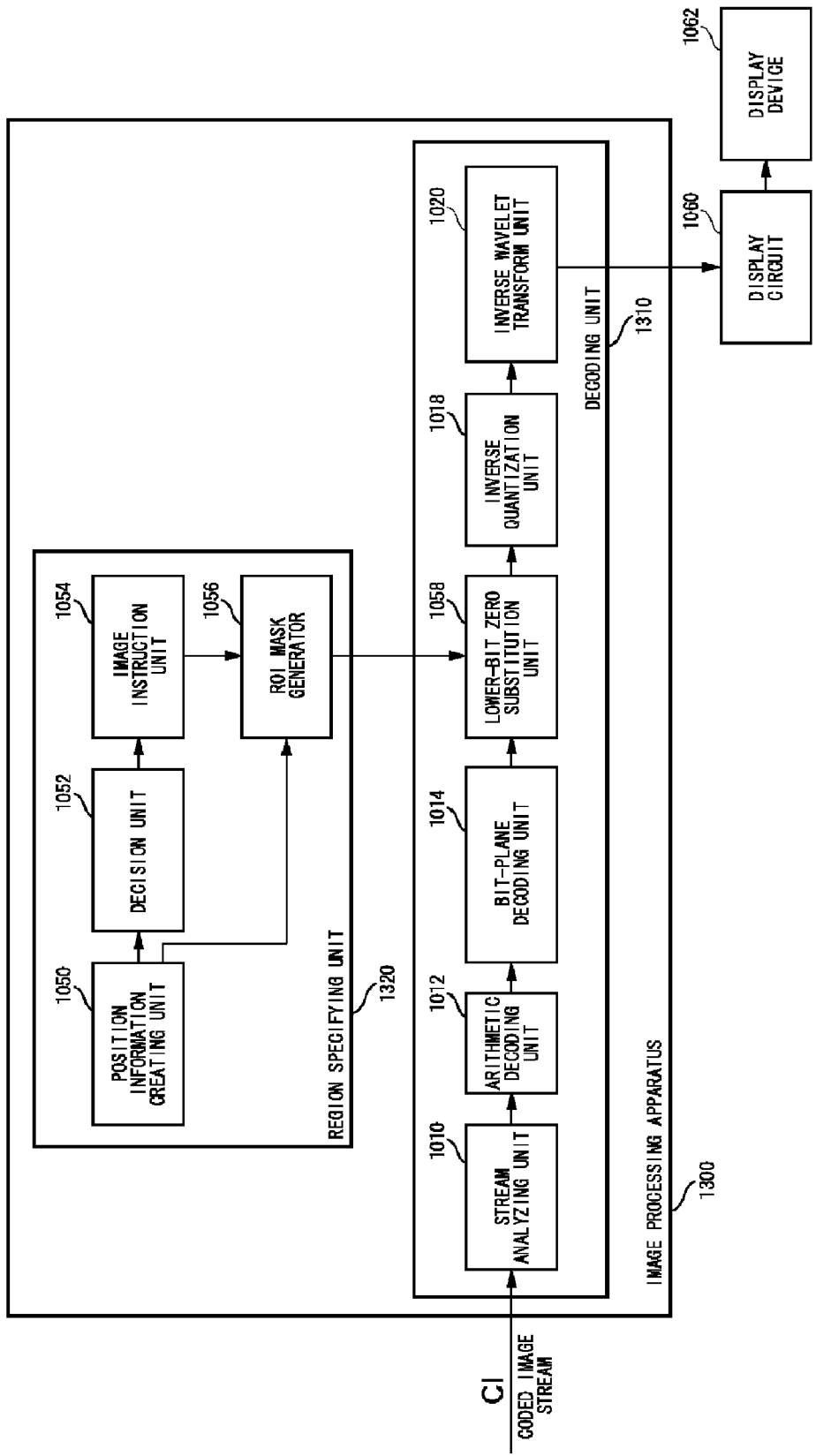

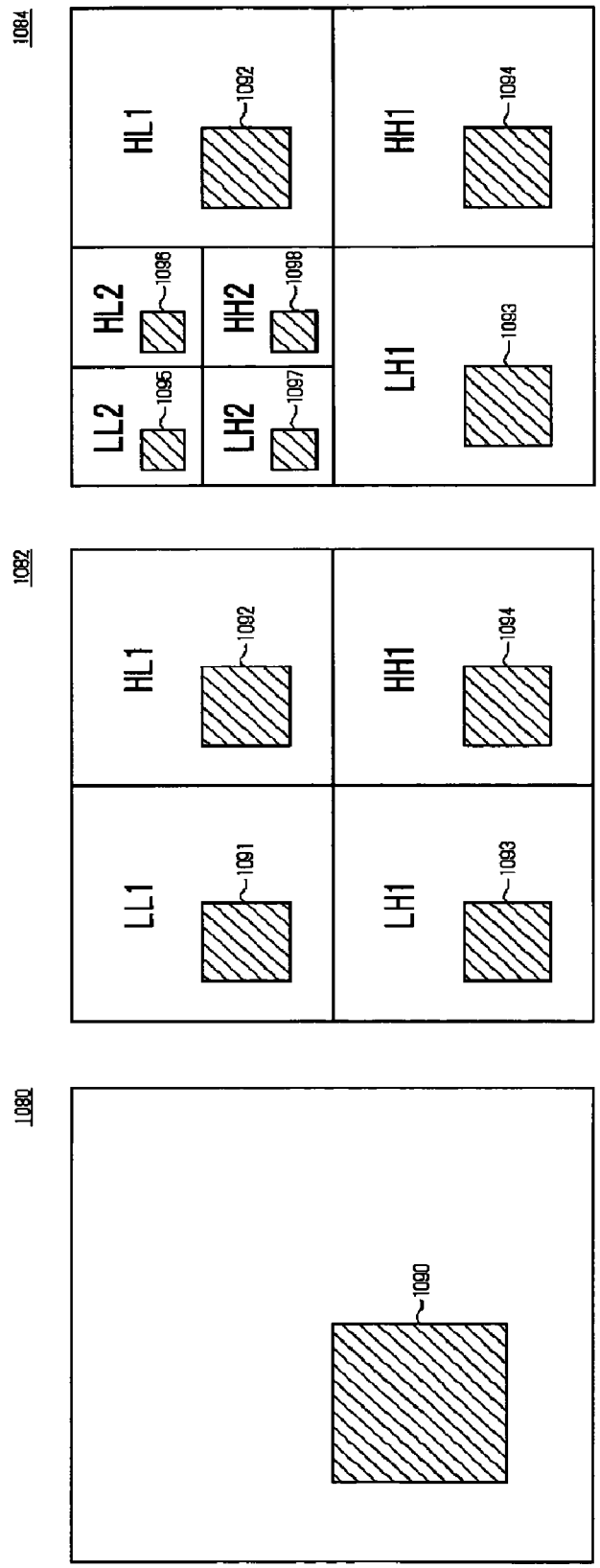

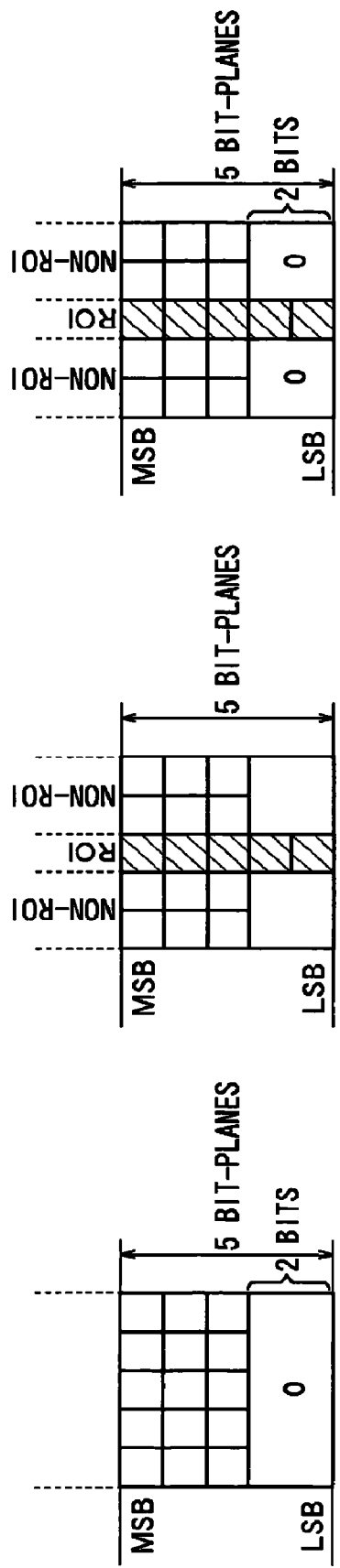

REGION OF INTEREST

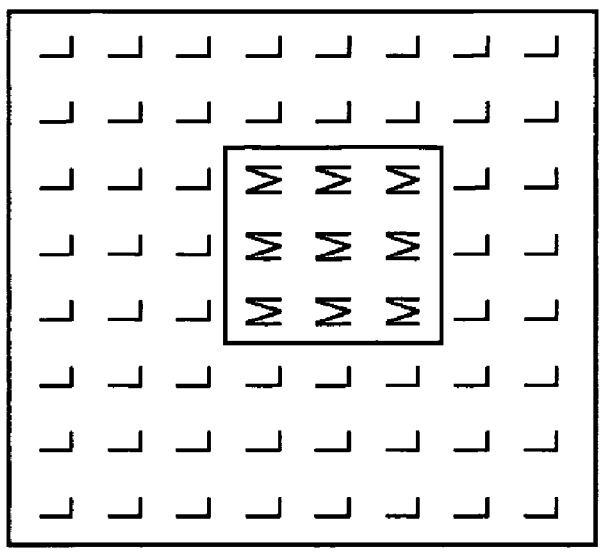
FIG.40B
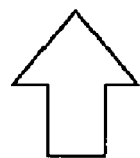
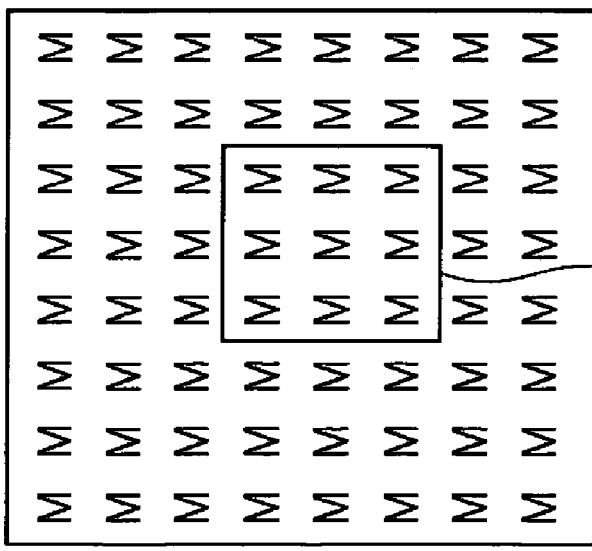
FIG.40A

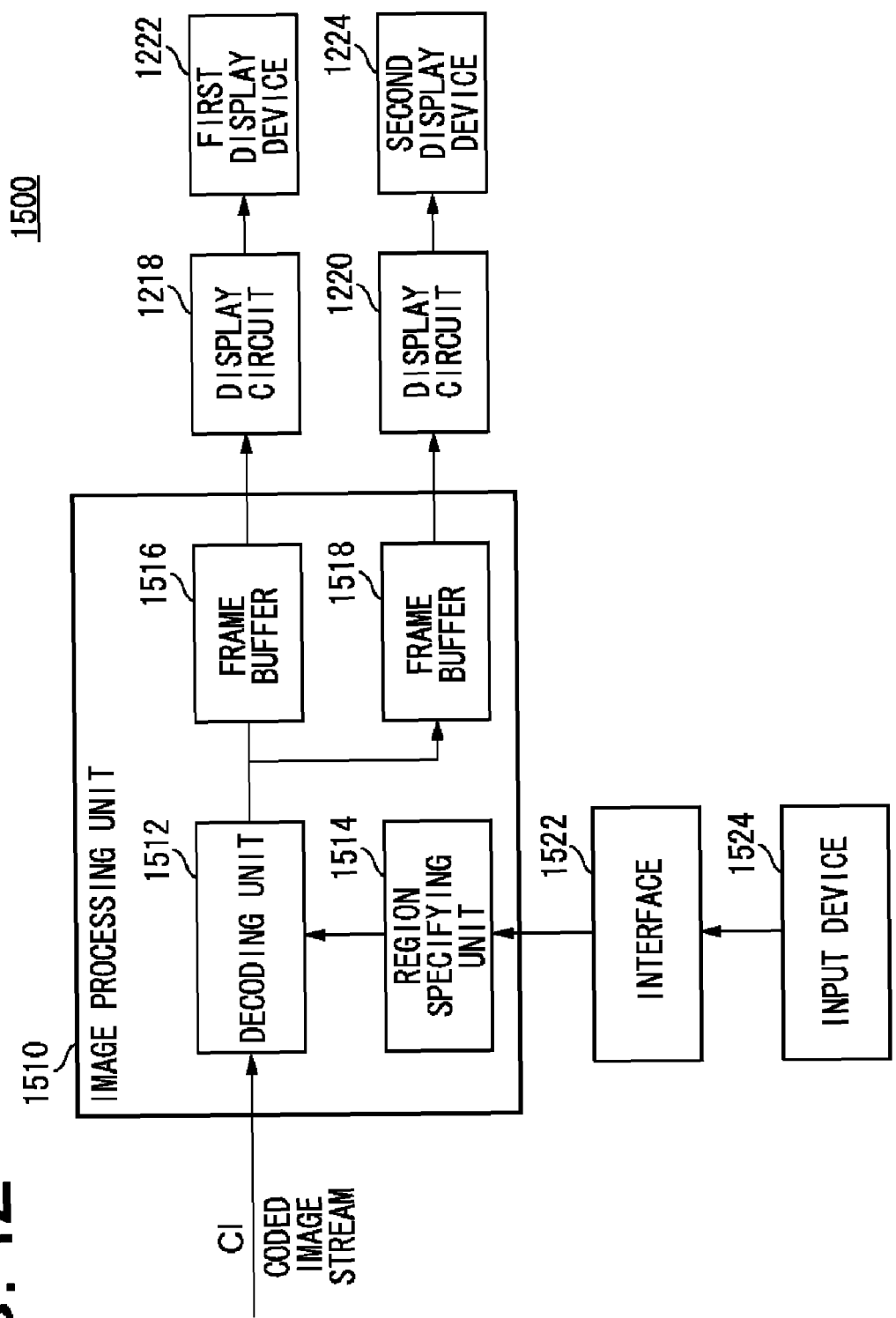

IMAGE CODING APPARATUS, IMAGE DECODING APPARATUS, IMAGE DISPLAY APPARATUS AND IMAGE PROCESSING APPARATUS

This application is a Divisional Application of U.S. application Ser. No. 11/052,094 filed on Feb. 8, 2005, which claims priority to Japanese Application No. 2004-032383 filed on Feb. 9, 2004, Japanese Application No. 2004-032394 filed on Feb. 9, 2004 and Japanese Application No. 2004-094449 filed on Mar. 29, 2004.

BACKGROUND OF THE INVENTION

1. Field of the Invention

The present invention relates to an image coding technology and an image decoding technology, and it particularly relates to method and apparatus for preferentially coding or decoding a partial region of an image. The present invention further relates to an image display apparatus and an image displaying method, and relates also to apparatus for reproducing image streams.

2. Description of the Related Art

At ISO/ITU-T, JPEG2000 using a discrete wavelet transform (DWT) is being standardized as a successor to JPEG (Joint Photographic Expert Group), which is a standard technology for compression and coding of still images. In JPEG2000, a wide range of image quality, from low bit-rate coding to lossless compression, can be coded highly. efficiently, and a scalability function, in which the image quality is gradually raised, can be realized easily. Moreover, JPEG2000 comes with a variety of functions which the conventional JPEG standard did mot-have.

As one of the functions of JPEG2000, the ROI (Region-of-Interest) coding is standardized, in which a region of interest of an image is coded and transferred in preference to other regions. Because of the ROI coding, when the coding rate has an upper limit, the reproduced image quality of a region of interest can be raised preferentially, and also when a codestream is decoded in sequence, a region of interest can be reproduced earlier with high quality.

As the ROI coding, the MAXSHIFT method scales up the bit-planes of wavelet transform coefficients corresponding to a region of interest in an image (hereinafter referred to as "ROI transform coefficients") by a maximum number of bits of the bit-plane of wavelet transform coefficients corresponding to non-ROI regions (hereinafter referred to as "non-ROI transform coefficients"). According to this technique, all the bit-planes of ROI transform coefficients are coded earlier than any of the bit-planes of non-ROI transform coefficients. A method is also known, in which the high-order bits in part of the ROI transform coefficients are coded in preference to the non-ROI transform coefficients by scaling-up the bit-planes of ROI transform coefficients by a predetermined number of bits. Reference (1) in the following Related Art List discloses an improvement technology for these ROI coding techniques.

FIG. 1 illustrates a structure of a conventional image coding apparatus 100. This image coding apparatus 100 carries out a ROI coding by the MAXSHIFT method. A wavelet transform unit 10 performs a wavelet transform on an inputted original image and outputs the wavelet transform coefficients. A quantization unit 12 quantizes the wavelet transform coefficients of the original image. FIG. 2A shows wavelet transform coefficients 50 after quantization, which include bit-planes each having five bits from MSB (most significant bit) to LSB (least significant bit).

A ROI selector 18 selects a region of interest (ROI) in an original image, and a ROI mask generator 20 generates ROI masks that are used to specify the ROI transform coefficients, which are the wavelet transform coefficients corresponding to the selected region of interest. In FIG. 2A, the ROI transform coefficients are represented by the shaded portions of the wavelet transform coefficients 50.

A ROI scale-up unit 22 scales up the quantized ROI transform coefficients by S bits by referring to the ROI mask. That is, the values of the ROI transform coefficients are shifted to the left by as much as S bits. Here, the amount S of the scale-up is a natural number larger than the number of bits of the maximum value of the quantized values of non-ROI transform coefficients, which are the wavelet transform coefficients corresponding to the regions outside the region of interest. FIG. 2B shows wavelet transform coefficients 52 with the ROI transform coefficients scaled up by 5 bits. After the upscaling, zeros are assigned to the digits that are newly created as a result of the upscaling in the wavelet transform coefficients 52.

An entropy coding unit 14 entropy-codes the quantized values of the wavelet transform coefficients 52 resulting from a scale-up by scanning them in order from high-order bit-planes as indicated by the arrows in FIG. 2C. A coded data generator 16 turns the entropy-coded data, together with the coding parameters such as quantizing width, the ROI position information indicative of the position of a region of interest and the amount of scale-up, into a stream and outputs it as a coded image.

FIG. 3 illustrates a structure of a conventional image decoding apparatus 110. This image decoding apparatus 110 decodes images which are ROI-coded by the MAXSHIFT method. A coded data extracting unit 30 extracts coded data, various types of coding parameters, ROI position information and scale-up amount from the inputted coded image. An entropy decoding unit 32 decodes the coded data bit-plane by bit-plane and stores in a memory the derived quantized values of the wavelet transform coefficients. FIG. 4A shows wavelet transform coefficients 54 after an entropy decoding. In correspondence to the example of FIGS. 2A to 2C, the amount S of scale-up is 5 bits, and the wavelet transform coefficients 54 after the entropy decoding include a total of 10 bit-planes.

A ROI mask generator 38 generates masks that specify ROI transform coefficients based on the ROI position information. A ROI sale-down unit 40 scales down, by S bits, the ROI transform coefficients out of the quantized wavelet transform coefficients by referring to the ROI mask. FIG. 4B shows wavelet transform coefficients 56 after the ROI transform coefficients have been scaled down by 5 bits. The 5 high-order bits of non-ROI transform coefficients left by the scale-down are discarded, and as a result, a total of 5 bit-planes of quantized wavelet transform coefficients 56 are obtained.

An inverse quantization unit 34 inverse-quantizes the quantized values of the wavelet transform coefficients including the scaled-down ROI transform coefficients, and an inverse wavelet transform unit 36 performs an inverse wavelet transform on the inverse-quantized wavelet transform coefficients and outputs a decoded image thus obtained.

Motion-JPEG2000, when compared with MPEG (Moving Picture Experts Group) and other moving image coding specifications, is inferior in compression ratio because of its inability to use frame correlation, but is superior in its capacity for editing in frame units and reversible coding, thus holding numerous-potentialities.

As an example of a technology utilizing these characteristics of JPEG2000, Reference (2) in the following Related Art List discloses a technology for simplifying the decoding processing, as necessary, by comparing elapsed time against time limit in each stage of image decoding. According to the technology, a relatively small-scale structure may realize image decoding with relatively high image quality.

Related Art List (1) Japanese Patent Application Laid-Open No. 2001-45484.
(2) Japanese Patent Application Laid-Open No. 2002-325257.

In the above-mentioned conventional ROI coding, coding of the bit-planes is performed after the scale-up of the wavelet transform coefficients corresponding to a region of interest, so that an extra memory capacity to store the bit-planes after the scale-up is required. Moreover, the coding processing takes a longer time because an excess coding must be carried out for the scaled-up bit-planes.

Also, in the decoding of a coded image after a ROI coding, the coded image data are decoded for each bit-plane, so that an extra memory capacity is required in response to the amount of scale-up. Moreover, this decoding process requires specifying wavelet transform coefficients corresponding to the region of interest by acquiring ROI position information from the coded image data and scaling down the thus specified wavelet transform coefficients of the region of interest.

As described above, the conventional ROI coding has problem and drawback in that it involves a scale-up processing, which requires an excess memory capacity and an eventual increase in the amount of computation.

The conventional ROI coding as described above also has a problem in that when there are a plurality of regions of interest, it cannot provide any difference in image quality among the plurality of regions of interest.

It is expected that distribution and use of image contents utilizing JPEG2000 will increase drastically in the years to come. Among such images to be distributed, however, there may be images, like those of a surveillance camera, which requires higher image quality for a certain part of them and not so high quality for the remaining part of them. Furthermore, when a region specified by the user is set for a higher image quality, there may be cases where the image processing capacity is exceeded due to the increase in the amount of processing, thus resulting in the drop of frames.

SUMMARY OF THE INVENTION

The present invention has been made in view of the foregoing circumstances and problems, and an object thereof is to provide an image coding and decoding technology capable of coding part of the region of an image in preference to the rest thereof and decoding the coded image data, without an extra cost.

Another object of the present invention is to provide an image coding technology, an image decoding technology and an image displaying technology which can code, decode and display an image that contains a plurality of regions with different image qualities.

Still another object of the present invention is to provide a technology for adjusting image quality within a given capacity for decoding processing.

A preferred embodiment according to the present invention relates to an image coding apparatus. This apparatus includes: a transform unit which transforms an image to spatial frequency domain so as to generate transform coefficients, each of which corresponds to a pixel of the image; a substitution unit which substitutes a predetermined number of low-order bits with zero values in a bit string of the transform coefficients corresponding to part of a region in the image; and a coding unit which encodes a bit string of the transform coefficients for the entire image sequentially from high-order bits, after substitution by the substitution unit. The apparatus may further include a mask generator which generates masks for specifying the transform coefficients corresponding to the part of a region in the image.

Here, the low-order bits substituted with zeros may be a subset of the bit string, that is, part of a sequential bit string corresponding to a predetermined number of bits counted from the least significant bit.

The part of a region in the image may be a non-region-of-internet provided in the image. This non-region-of-interest may be set relatively by setting a region of interest in the image. The region of interest and the non-region-of-interest may be related to each other by a relative relationship such that if one of the regions is determined as a region of interest, then the other will be a non-region-of-interest. For example, the regions differ in a relative degree of priority, and especially they differ relatively in a level required for image quality. The region of interest may be a region having a higher degree of priority compared to the other region, especially one that requires a higher level of image quality, and the non-region-of-interest may be a region having a lower degree of priority compared to the other region, especially one that requires a lower level of image quality.

By employing this structure, a certain region of an image is coded in preference to the other region, and the image quality of the region in question can be relatively raised at the time of decoding and reproducing the image. Moreover, information on the low-order bits of the other region is discarded, so that the image can be coded at a high compression ratio.

Another preferred embodiment according to the present invention relates also to an image coding apparatus. This apparatus includes: a transform unit which transforms an image to spatial frequency domain so as to generate transform coefficients each of which corresponds to a pixel of the image; a substitution unit which substitutes with zero values a certain number of low-order bits according to a degree of priority defined for each of a plurality of regions in the image in a bit string of the transform coefficients corresponding to the each of the plurality of regions in the image; and a coding unit which encodes bit strings of the transform coefficients for the entire image sequentially from high-order bits, after substitution by the substitution unit. The apparatus may further include a mask generator which generates masks for specifying the transform coefficients corresponding to the each of the plurality of regions in the image.

By employing this structure, an image with different image qualities among a plurality of regions can be provided at the time of reproduction. If there is an area of overlap among the plurality of regions, the substitution unit may determine the number of low-order bits to be zero-substituted in the plurality of regions, based on the degree of priority of a region that has a higher degree of priority.

Another preferred embodiment according to the present invention relates also to an image coding apparatus. This apparatus includes: a transform unit which performs a wavelet transform on an image so as to generate wavelet transform coefficients, each of which corresponds to a pixel of the image; a substitution unit which substitutes a predetermined number of low-order bits with zero values in a bit string of the wavelet transform coefficients corresponding to part of a region in the image; and a coding unit which encodes a bit string of the wavelet transform coefficients for the entire image sequentially from high-order bits, after substitution by the substitution unit. The apparatus may further include a mask generator which generates masks for specifying the wavelet transform coefficients corresponding to the part of a region in the image.

Still another preferred embodiment according to the present invention relates to an image decoding apparatus. This apparatus includes: a decoding unit which decodes an encoded image so as to acquire transform coefficients in spatial frequency domain; a substitution unit which substitutes a predetermined number of low-order bits with zero values in a bit string of the transform coefficients corresponding to part of a region in the image; and an inverse-transform unit which restores the image by subjecting a bit string of the transform coefficients for the entire image to an inverse transform after substitution by the substitution unit. The apparatus may further include a mask generator which generates masks for specifying the transform coefficients corresponding to the part of a region i the image.

By employing this structure, at the time of decoding the encoded image a certain region of an image is decoded in preference to the other region, and said region can be reproduced at high image quality. In other words, information on the low-order bits of the other region is discarded so as to lower the image quality, so that the image quality of said region can be relatively raised and the image with the relatively raised image quality can be reproduced.

Still another preferred embodiment according to the present invention relates also to an image decoding apparatus. This apparatus includes: a decoding unit which decodes an encoded image so as to acquire transform coefficients in spatial frequency domain; a substitution unit which substitutes with zero values a number of low-order bits according to a degree of priority defined for each of a plurality of regions in the image in a bit string of the transform coefficients corresponding to the each of the plurality of regions in the image; and an inverse-transform unit which restores the image by subjecting a bit string of the transform coefficients for the entire image to an inverse transform after substitution by the substitution unit. The apparatus may further include a mask generator which generates masks for specifying the transform coefficients corresponding to the each of the plurality of regions in the image.

By employing this structure, different image qualities can be given among a plurality of regions in an image at the time of decoding.

Still another preferred embodiment according to the present invention relates also to an image decoding apparatus. This apparatus includes: a decoding unit which decodes an encoded image so as to acquire wavelet transform coefficients; a substitution unit which substitutes a predetermined number of low-order bits with zero values in a bit string of the wavelet transform coefficients corresponding to part of a region in the image; and an inverse-transform unit which restores the image by subjecting a bit string of the wavelet transform coefficients for the entire image to an inverse transform after substitution by the substitution unit. The apparatus may further include a mask generator which generates masks for specifying the wavelet transform coefficients corresponding to the part of a region in the image.

Still another preferred embodiment according to the present invention relates to an image coding method. This method is such that in transform coefficients in spatial frequency domain of an image the transform coefficients corresponding to part of a region in the image are specified and a predetermined number of low-order bits are substituted with zero values in a bit string of the transform coefficients corresponding to the specified part of a region in: the image and, thereafter, a bit string of the transform coefficients for the entire image is encoded, as a whole, sequentially from high-order bits.

Still another preferred embodiment according to the present invention relates to an image decoding method. This method is such that in transform coefficients in spatial frequency domain of an image obtained by decoding an encoded image the transform coefficients corresponding to part of a region in the image are specified and a predetermined number of low-order bits are substituted with zero values in a bit string of the transform coefficients corresponding to the specified part of a region in the image and, thereafter, a bit string of the transform coefficients for the entire image are inverse-transformed so as to restore an image.

Still another preferred embodiment according to the present invention relates also to an image coding method. This method is such that in transform coefficients in spatial frequency domain of an image the transform coefficients corresponding to a plurality of regions in the image are specified and a certain number of low-order bits according to a degree of priority defined for each of the plurality of regions in the image are substituted with zero values in a bit string of the transform coefficients corresponding to the specified plurality of regions and, thereafter, a bit string of the transform coefficients for the entire image is encoded, as a whole, sequentially from high-order bits.

Still another preferred embodiment according to the present invention relates also to an image decoding method. This method is such that in transform coefficients in spatial frequency domain of an image obtained by decoding an encoded image the transform coefficients corresponding to a plurality of regions in the image are specified and a certain number of low-order bits according to a degree of priority defined for each of the plurality of regions in the image are substituted by zero values in a bit string of the transform coefficients corresponding to the specified plurality of regions and, thereafter, a bit string of the transform coefficients for the entire image are inverse-transformed so as to restore an image.

Still another preferred embodiment according to the present invention relates to an image display apparatus. This apparatus includes a display unit which displays, on a screen, moving images that differ in image quality for each of a plurality of regions set for the screen.

The image display apparatus may further include a specifying unit which specifies on the screen at least one of a region of interest and a non-region-of-interest, wherein the plurality of regions may be set for the screen by specification of the at least one of a region of interest and a non-region-of-interest. For example, when a region of interest is specified for a screen, two regions which are constituted by the region of interest and the region other than the region of interest are set for the screen. Also, when a non-region-of-interest is specified for a screen, two regions which are constituted by the non-region-of-interest and the region other than the non-region-of-interest are set for the screen. The region of interest and the non-region-of-interest may be such that a plurality of regions of interest or a plurality of non-region-of-interests are specified. Also, by combining the region of interest and non-region-of-interest, a plurality of regions constituted by, for instance, a region of interest, a non-region-of-interest and the rest of the region may be set.

Here, it is to be understood by the skilled in the art that a "display unit which displays on a screen" includes not only a configuration constituted by both a screen, such as a display, and a display control unit for controlling the output of image signals but also a configuration constituted by the display control unit alone, which contains an interface connected to a display equipment but does not contain the display equipment. And either configuration is encompassed by the technical scope of the present invention.

Still another preferred embodiment according to the present invention relates also to an image display apparatus. This apparatus includes a display unit which displays, on a screen, moving images that have a plurality of regions with different-image qualities and an area of overlap in the regions.

Still another preferred embodiment according to the present invention relates also to an image display apparatus including a display unit which displays, on a screen, moving images that have a plurality of regions that are given different image qualities while visibility is retained. The phrase "given different image qualities while visibility is retained" means that the image quality is adjusted within a range in which an image of an object is recognizable, and it also includes a feature that the image quality of an object is lowered within a range in which the object can be grasped as it is or, conversely, the image quality of a region of interest is set higher than that of the other region.

Still another preferred embodiment according to the present invention relates also to an image display apparatus. This apparatus includes: a selector which selects at least one of a region of interest and a non-region-of-interest for a screen on which moving images are displayed; and a display unit which displays on the screen the moving images that differ in image quality for each of a plurality of regions set for the screen as a result of selecting the at least one of a region of interest and a non-region-of-interest. By employing this structure, the image quality of a plurality of regions can be varied intentionally and then displayed.

Here, the plurality of regions may be selected by user's specifying the regions for the screen. The plurality of regions may also be selected by extracting by using any method the regions that contain specific objects. For example, using an image recognizing method, a region containing characters, a region containing a human figure and the remaining region may be extracted as the plurality of regions. Furthermore, specific regions such as the central part of a screen, the periphery thereof and the surrounding part thereof are set in advance, and the parts thus set beforehand may be selected as the plurality of regions.

The selector may set a degree of priority for each of the plurality of regions and the display unit may display the plurality of regions with image qualities according to the degrees of priority. If an area of overlap exists among the plurality of regions, image quality in the area of overlap may be determined based on a region having a higher degree of priority. The degree of priority may be set when a user specifies a region for a screen. Moreover, the degree of priority for the central part of a screen may be set higher or the degree of priority of a region where there are characters may be set higher, so that the degree of priority may be determined beforehand.

Still another preferred embodiment according to the present invention relates also to an image display apparatus. This apparatus includes: a selector which selects a region of interest for a screen on which moving images are displayed; and a display unit which displays the whole screen with a predetermined image quality in a state where the region of interest is not selected and which displays the region of interest with a higher image quality than that of other regions in a state where the region of interest is selected. By employing this structure, a simplified reproduction, for example, can be done at a low image quality during the normal reproduction of moving images, and the image quality of a region of interest can be raised and the image with the raised image quality can be reproduced if said region of interest is selected.

When a plurality of regions of interest are selected, the display unit may display so that image quality differs for each of the plurality of regions of interest. The selector may select a region which changes with time as the region of interest. When there are a plurality of regions which change with time, the display unit may assign different image qualities to the regions according to the degree of change in time.

Still another preferred embodiment according to the present invention relates to an image display method. This method is such that moving images which are given different image qualities for each of a plurality of regions set for a screen are displayed on the screen. The moving images may be read out from a storage or they may be inputted via a network.

Still another preferred embodiment according to the present invention relates to an image coding apparatus. This apparatus includes: a transform unit which transforms an image to spatial frequency domain so as to generate transform coefficients each of which corresponds to a pixel of the image; a scale-up unit which scales up a bit string of the transform coefficients corresponding to each of a plurality of regions in the image, by a bit number according to a degree of priority defined for each of the plurality of regions in the image; and a coding unit which encodes the transform coefficients for the entire image sequentially from high-order bits, after upscaling by the scale-up unit. The apparatus may further include a mask generator which generates masks for specifying the transform coefficients corresponding to the each of the plurality of regions in the image.

Still another preferred embodiment according to the present invention relates also to an image coding apparatus. This apparatus includes: a transform unit which performs a wavelet transform on an image so as to generate wavelet transform coefficients each of which corresponds to a pixel of the image; a scale-up unit which scales up a bit string of the wavelet transform coefficients corresponding to each of a plurality of regions in the image, by a bit number according to a degree of priority defined for each of the plurality of regions in the image; and a coding unit which encodes the wavelet transform coefficients for the entire image sequentially from high-order bits, after upscaling by the scale-up unit. The apparatus may further include a mask generator which generates masks for specifying the wavelet transform coefficients corresponding to the each of the plurality of regions in the image.

Still another preferred embodiment according to the present invention relates to an image coding method. This method is such that in wavelet transform coefficients of an image the wavelet transform coefficients corresponding to a plurality of regions in the image are specified and a bit string of the specified wavelet transform coefficients corresponding to the plurality of regions in the image are scaled up by a bit number according to a degree of priority defined for each of the plurality of regions in the image and, thereafter, a bit string of the wavelet transform coefficients for the entire image is encoded, as a whole, sequentially from high-order bits.

Still another preferred embodiment according to the present invention relates also to an image coding apparatus. This apparatus includes: a region selector which selects in an image a plurality of regions that differ in a degree of priority; and a coding unit which encodes the image according to the degree of priority for each of the plurality of regions so as to generate a coded image including the plurality of regions that differ in image quality. The apparatus may further include a transform unit which transforms an image to spatial frequency domain so as to generate transform coefficients; and a mask generator which generates masks for specifying the transform coefficients corresponding to the plurality of regions selected by the region selector, wherein the coding unit may encode the image provided with the plurality of regions, by referring to the masks.

Still another preferred embodiment according to the present invention relates to an image decoding apparatus. This apparatus includes: a region selector which selects in an image a plurality of regions that differ in a degree of priority; and an inverse-transform unit which inverse-transforms an image that has been encoded according to respective degrees of priority in the plurality of regions and which restores an image including the plurality of regions that differ in image quality. The apparatus may further include: a decoding unit which decodes an encoded image so as to acquire transform coefficients in spatial frequency domain; and a mask generator which generates masks for specifying the transform coefficients corresponding to the plurality of regions selected by the region selector, wherein the inverse transform unit may inverse-transform the encoded image provided with the plurality of regions, by referring to masks.

Still-another preferred embodiment according to the present invention relates to an image processing, apparatus. This apparatus is such that it decodes moving image data in such a manner that a plurality of regions on a screen are given different image qualities and displayed and adjusts the image quality of the plurality of regions respectively in such a manner that a processing amount of entire decoding processing does not exceed a predetermined value. According to this mode of carrying out the invention, the processing amount can be suppressed to a constant value or below at the time when a plurality of regions in an image are given different image qualities and then moving images are displayed.

Still another preferred embodiment according to the present invention relates also to an image processing apparatus. This apparatus comprises: a region specifying unit which specifies a region of interest for a screen; and a decoding unit which decodes an image in such a manner that a region of interest and a normal region, which is an area other than the region of interest, are each given a different image quality. Here, the "region of interest" is a region whose resolution is to be raised in an image in response to a user's instruction and reproduced accordingly, and it is specified using an input device such as a pointing device. According to this mode of carrying out the invention, the only region of interest specified by a user can be reproduced with a desired image quality.

The decoding unit may adjust the image quality of the region of interest and the normal region, respectively, in a manner such that a processing amount of entire decoding processing does not exceed a predetermined value. Or, the decoding unit may raise the image quality of the region of interest whereas it may lower the image quality of the normal region. By implementing this structure, such a region of interest as the user is interested in can be reproduced at high image quality without causing an increase in the amount of processing for an image processing apparatus.

The region specifying unit may include: a decision unit which determines whether the processing amount of entire decoding processing exceeds the predetermined value or not when the image quality of the region of interest is raised; and an image quality instruction unit which determines, according to a result of decision, whether increase in the image quality of the region of interest is permitted or not. By implementing this structure, when the amount of decoding processing increases and it is likely to exceed the processing capacity of an image processing apparatus, the increase in the image quality of a region of interest is not permitted. Thus, any drop of frames that results from the processing amount exceeding the upper-limit processing capacity of an image processing apparatus can be avoided.

Alternatively, the region specifying unit may include: an image quality instruction unit which raises the image quality of the region of interest; and a decision unit which determines whether the processing amount of a decoding processing exceeds the predetermined value or not when the image quality of the region of interest is raised. In this case, the image quality instruction unit may lower the image quality of the normal region when the decision unit judges that the processing amount thereof exceeds the predetermined value. By implementing this structure, the high image quality is realized by increasing the decoding processing amount for the region of interest, and at the same time the decoding processing amount for the normal region is reduced by a corresponding amount, so that the processing amount of the image processing apparatus as a whole can be held less than or equal to its upper-limit processing capacity.

When the decision unit judges that the processing amount thereof exceeds the predetermined value, the image quality instruction unit may provide a display to warn a user that the image quality of the normal region will be lowered. By implementing this structure, the user can be aware in advance that the image quality of the normal region will be low.

When the decision unit judges that the processing amount thereof exceeds the predetermined value, the image quality instruction unit may inquire of a user whether the image quality of the region of interest is to be raised or hot. By implementing this structure, the user can judge whether the image quality of a region of interest may be raised or not in accordance with importance.

It is to be noted that the coded image data may be multiplexed in accordance with resolution. As an example, the coded image data are data conforming to Motion-JPEG2000 in which the images compressed frame by frame are transmitted consecutively. According to this structure, the coded image data are multiplexed in accordance with resolution, so that it becomes easy to extract an intermediate image generated during a decoding process and use the thus extracted intermediate image as a low-resolution image.

It is to be noted that any arbitrary combination of the above-described structural components and expressions changed among a method, an apparatus, a system, a computer program, a recording medium and so forth are all effective as and encompassed by the present embodiments.

Moreover, this summary of the invention does not necessarily describe all necessary features so that the invention may also be sub-combination of these described features.

BRIEF DESCRIPTION OF THE DRAWINGS

FIGS. 7A to 7C illustrate how low-order bits of wavelet transform coefficients of an original image are zero-substituted.

FIGS. 8A to 8C illustrate how low-order bits of wavelet transform coefficients are zero-substituted when there is no region of interest in an original image.

FIG. 24 illustrates a structure of an image display apparatus according to a sixth embodiment of the present invention.

FIG. 31 illustrates a structure of an image processing apparatus according to a ninth embodiment of the present invention.

FIGS. 32A to 32C illustrate masks for specifying wavelet transform coefficients that correspond to a region of interest in an original image.

FIGS. 34A to 34C illustrate wavelet coefficients when a region of interest is specified in an original image.

FIGS. 40A and 40B illustrate how the image quality for a region of interest remains intact and that for a normal region is lowered.

FIG. 42 illustrates a structure of an image display system according to an eleventh embodiment of the present invention.

DETAILED DESCRIPTION OF THE INVENTION

Figure 1:
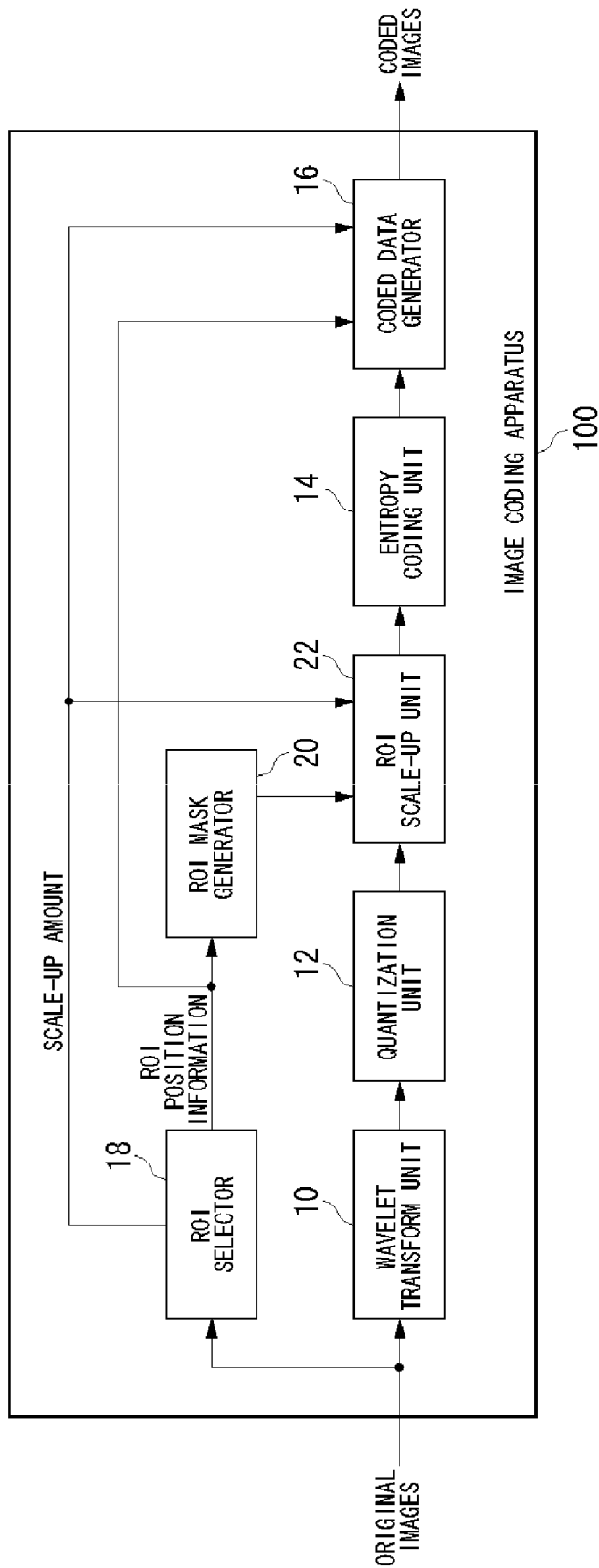
FIG. 1 illustrates a structure of a conventional image coding apparatus.
Figure 2C:
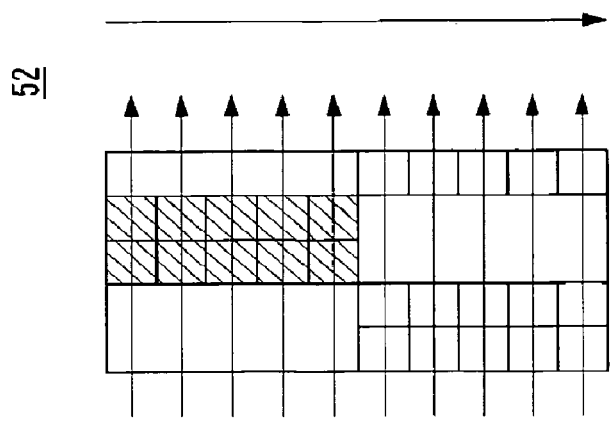
FIGS. 2A to 2C illustrate how wavelet transform coefficients of an original image are scaled up.
Figure 2B:
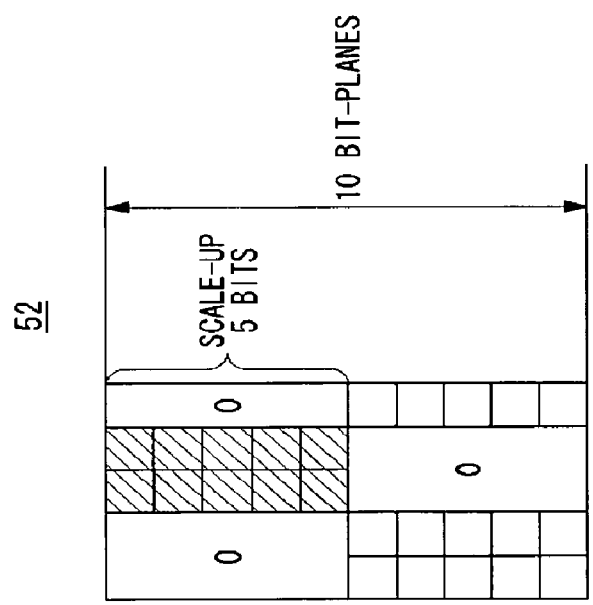
Figure 2A:
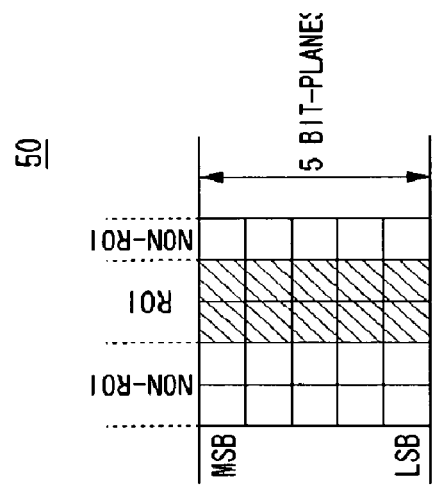
Figure 3:
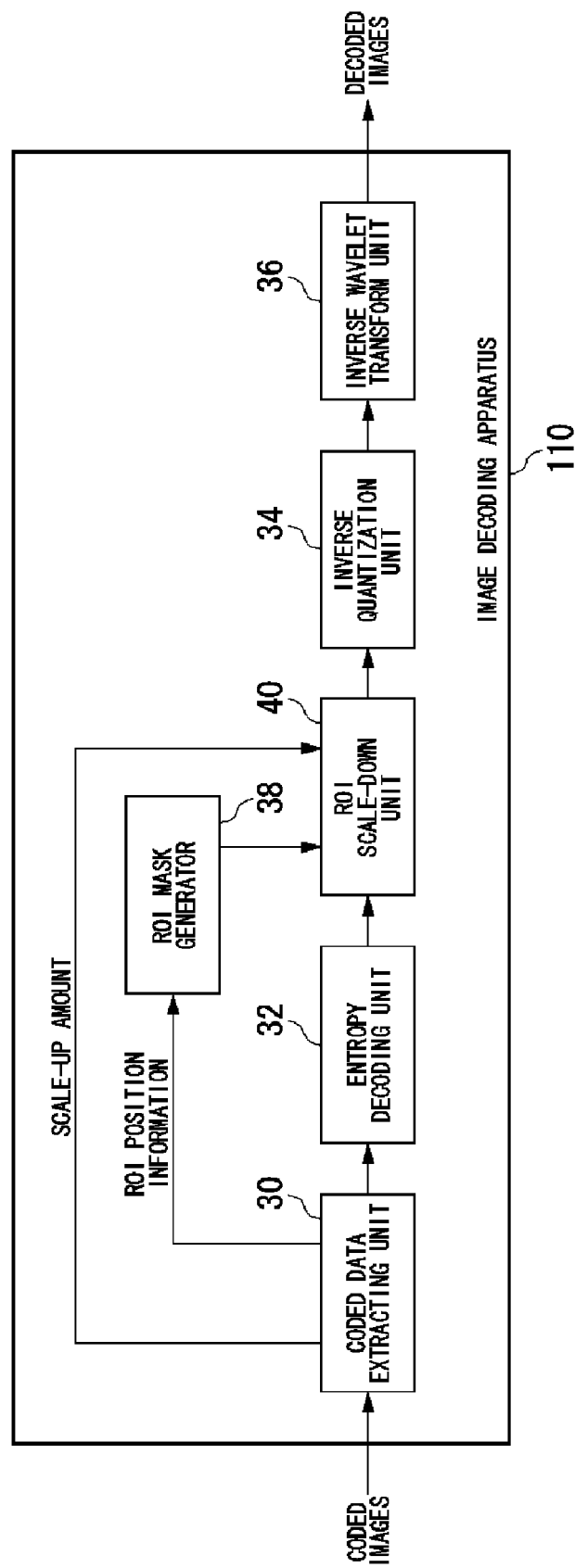
FIG. 3 illustrates a structure of a conventional image decoding apparatus.
Figure 4A:
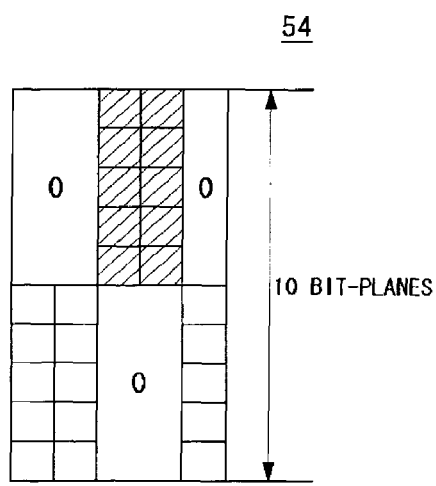
FIGS. 4A and 4B illustrate how wavelet transform coefficients after a decoding of a coded image are scaled down.
Figure 4B:
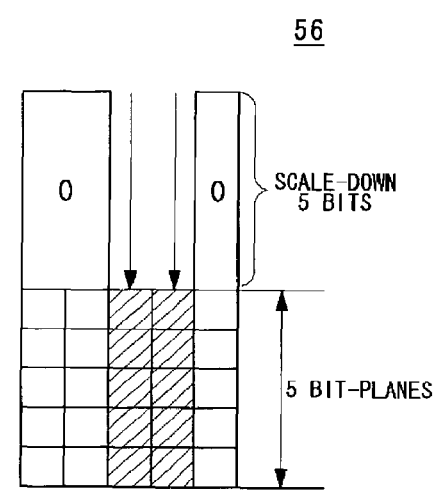
Figure 5:
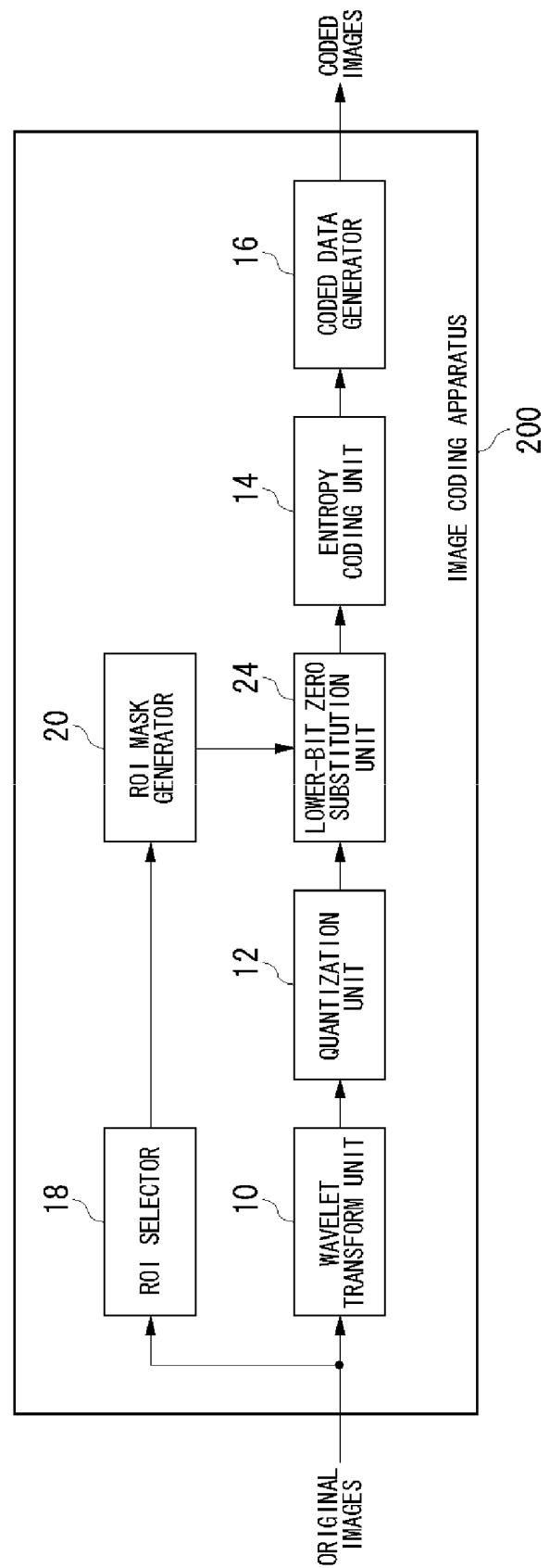
FIG. 5 illustrates a structure of an image coding apparatus according to a first embodiment of the present invention.

The invention will now be described based on the preferred embodiments, which do not intend to limit the scope of the present invention, but exemplify the invention. All of the features and the combinations thereof described in the embodiments are not necessarily essential to the invention.
First Embodiment FIG. 5 illustrates a structure of an image coding apparatus 200 according to a first embodiment of the present invention. In terms of hardware, this structure of image coding apparatus 200 can be realized by a CPU, a memory and other LSIs of an arbitrary computer. In terms of software, it can be realized by memory-loaded programs which have coding functions or the like, but drawn and described herein are function blocks that are realized in cooperation with those. Thus, it is understood by those skilled in the art that these function blocks can be realized in a variety of forms such as by hardware only, software only or the combination thereof.

The image coding apparatus 200 performs compression and coding of inputted original images, which serve as an example, by JPEG2000 scheme. Original images inputted to the image coding apparatus 200 may be frames of moving images. The image coding apparatus 200 can encode sequentially each frame of moving images and generate codestreams of the moving images.

A wavelet transform unit 10 divides the inputted original image into sub-bands, computes wavelet transform coefficients of each of the sub-bands and then generates hierarchized wavelet coefficients.

The wavelet transform unit 10 applies a low-pass filter and a high-pass filter in the respective x and y directions of an original image, and divides the image into four frequency sub-bands so as to carry out a wavelet transform. These sub-bands are an LL sub-band which has low-frequency components: in both x and y directions, an HL sub-band and an LH sub-band which have a low-frequency component in one of the x and y directions and a high-frequency component in the other, and an HH sub-band which has high-frequency component in both x and y directions. The number of pixels in the vertical and horizontal directions of each sub-band is ½ of that of the image before the processing, and one time of filtering produces sub-band images whose resolution, or image size, is ¼ of the image.

The wavelet transform unit 10 performs another filtering processing on the image of the LL sub-band among the thus obtained sub-bands and divides it into another four sub-bands LL, HL, LH and HH so as to perform the wavelet transform. The wavelet transform unit 10 performs this filtering a predetermined number of times, hierarchizes the original image into sub-band images and then outputs wavelet transform coefficients for each of the sub-bands. A quantization unit 12 quantizes, with a predetermined quantizing width, the wavelet transform coefficients outputted from the wavelet transform unit 10.

A ROI selector 18 selects a region of interest in an original image and supplies, to a ROI mask generator 20, ROI position information indicative of the position of the region of interest. If the region of interest is selected as the form of a rectangle, the ROI position information is given by coordinate values of a pixel at the upper left corner of a rectangular area and the number of pixels in the vertical and horizontal directions of the rectangular area.

The region of interest may be selected in a manner that a user specifies a specific region in an original image, or a predetermined region such as a central region in the original image may be selected. It may also be selected by an automatic extraction of an important region where there may be a human figure or characters.

Based on the ROI position information, the ROI mask generator 20 generates ROI masks for specifying wavelet transform coefficients corresponding to the region of interest, namely, ROI transform coefficients.

Figure 6C:
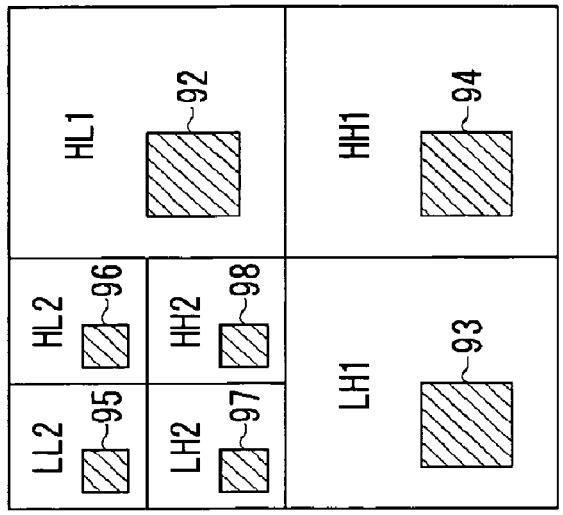
FIGS. 6A to 6C illustrate masks for specifying wavelet transform coefficients corresponding to a region of interest in an original image.
Figure 6B:
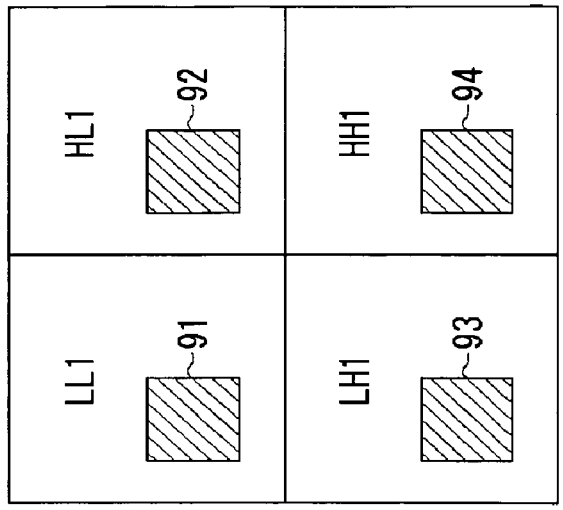
Figure 6A:
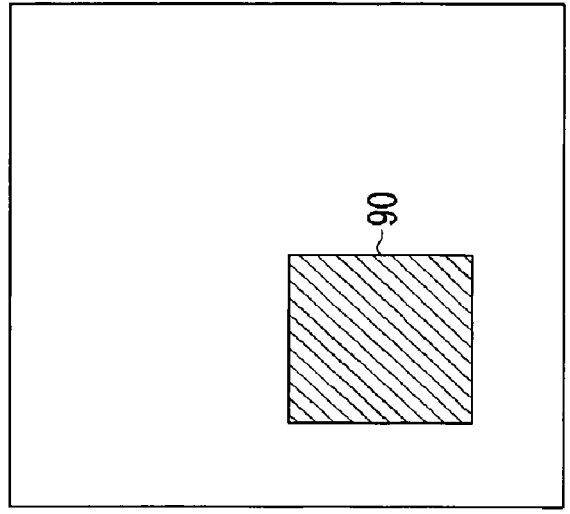

FIGS. 6A to 6C illustrate ROI masks generated by the ROI mask generator 20. As shown in FIG. 6A, suppose that a region of interest 90 is selected in an original image 80 by the ROI selector 18. Then, the ROI mask generator 20 specifies, in each sub-band, wavelet transform coefficients necessary for restoring the selected region of interest in the original image 80.

FIG. 6B shows a first-hierarchy transform image 82 obtained by performing one-time wavelet transform on the original image 80. The transform image 82 in the first hierarchy is composed of four first-level sub-bands which are represented here by LL1, HL1, LH1 and HH1. In each of the first-level-sub-bands of LL1; HL1, LH1 and HH1, the ROI mask generator 20 specifies wavelet transform coefficients on the first-hierarchy transform image 82, namely, ROI transform coefficients 91 to 94 necessary for restoring the region of interest 90 in the original image 80.

FIG. 6C shows a second-hierarchy transform image 84 obtained by performing another wavelet transform on the sub-band LL1 which is the lowest-frequency component of the transform image 82 shown in FIG. 6B. Referring to FIG. 6C, the second-hierarchy transform image 84 contains four second-level sub-bands which are composed of LL2, HL2, LH2 and HH2, in addition to three first-level sub-bands HL1, LH1 and HH1. In each of the second-level sub-bands of LL2, HL2, LH2 and HH2, the ROI mask generator 20 specifies wavelet transform coefficients on the second-hierarchy transform image 84, namely, ROI transform coefficients 95 to 98 necessary for restoring the ROI transform coefficient 91 in the sub-band LL1 of the first-hierarchy transform image 82.

In the similar manner, by specifying recursively the ROI transform coefficients that correspond to the region of interest 90 at each hierarchy for a certain number of times corresponding to the number of wavelet transforms done, all ROI transform coefficients necessary for restoring the region of interest 90 can be specified in the final-hierarchy transform image. The ROI mask generator 20 generates a ROI mask for specifying the position of this finally specified ROI transform coefficient in the last hierarchy transform image. For example, when the wavelet transform is carried out two times only generated are ROI masks which can specify the position of seven ROI transform coefficients 92 to 98 which are represented by areas shaded by oblique lines in FIG. 6C.

A lower-bit zero substitution unit 24 shown in FIG. 5 functions to adjust the number of low-order bits to be substituted with zeros in a bit string of the wavelet transform coefficients corresponding to a non-region-of-interest according to a relative degree of priority of the region of interest to the non-region-of-interest. And by referring to the ROI masks generated by the ROI mask generator 20, the lower-bit zero substitution unit 24 substitutes S bits counted from the least significant bit in a bit string of non-ROI coefficients which are not masked by the ROI masks, with zeros. Here, the zero-substitution bit number S corresponds to the relative degree of priority of the region of interest to the non-region-of-interest. It is an arbitrary natural number the upper limit of which is the maximum bit number of quantized values in the non-region-of-interest. By varying this zero-substitution bit number S, the level of degradation in reproduced image quality of the non-region-of-interest relative to the region of interest can be continuously adjusted.

FIGS. 7A to 7C illustrate how low-order bits of wavelet transform coefficients 60 of an original image are zero-substituted by the lower-bit zero substitution unit 24. FIG. 7A shows the wavelet transform coefficients 60 obtained after a quantization by the quantization unit 12, which include 5 bit-planes, and the ROI transform coefficients are represented by the area shaded by oblique lines.

Referring to FIG. 7B, the lower-bit zero substitution unit 24 substitutes S bits selected from the LSB side of non-ROI transform coefficients which are not masked by the ROI masks, with zeros. S=2 in this example, and the wavelet transform coefficients 62 where 2 bits in the LSB side of non-ROI coefficients are substituted with zeros are obtained as shown by the reference numeral 64 in FIG. 7B.

An entropy coding unit 14 shown in FIG. 5 entropy-codes the wavelet transform coefficients 62 containing the ROI transform coefficients and the zero-substituted non-ROI transform coefficients by scanning the bit-planes in order from MSB as indicated by the arrows in FIG. 7C.

FIGS. 8A to 8C illustrate how low-order bits of wavelet transform coefficients are zero-substituted when there is no region of interest in an original image. FIG. 8A shows 5 bit-plane wavelet transform coefficients composed of non-ROI transform coefficients alone since no region of interest is set in the original image. When the zero-substitution bit number S is 2, the lower-bit zero substitution unit 24 generates wavelet transform coefficients 72 in which the lower 2 bit-planes from the LSB side among 5 bit-planes are substituted with zeros as shown in FIG. 8B.

he entropy coding unit 14 entropy-codes higher 3 bit-planes of the wavelet transform coefficients 72 after a zero-substitution, in order from top, as shown in FIG. 8C. In this case, the lower 2 bit-planes which have been zero-substituted are not coded. Instead of zero-substituting lower 2 bit-planes, the lower 2 bit-planes may simply be discarded.

A coded data generator 16 processes entropy-coded data into a stream together with such coding parameters as quantizing width and outputs it as a coded image.

In cases where there is an upper limit set for the data size of a final coded image due to some limitations in storage capacity, transmission rate and so forth, the entropy coding unit 14 may, in order to operate within the upper limit of the data size, generally discontinue a coding process at a halfway bit-plane when the quantized wavelet coefficients are being coded in sequence from the higher bit-plane. Or, the coded data generator 16 may, in order to operate within the limit of transmission rate, discontinue a stream output at a halfway-bit-plane when coded data are being outputted in a stream bit-plane by bit-plane from the high-order one.

Accordingly, even when the data size of a coded image is subject to some limitation like this, the first embodiment is such that for low-order bit-planes, the wavelet transform coefficients corresponding to non-region-of-interest are zero-substituted and the wavelet transform coefficients corresponding to the region of interest only are subjected to coding as significant information. As a result, the compression efficiency for low-order bit-planes is high, and thus the data size will not increase much even when the coding covers and reaches the lowest bit-plane.

Figure 9:
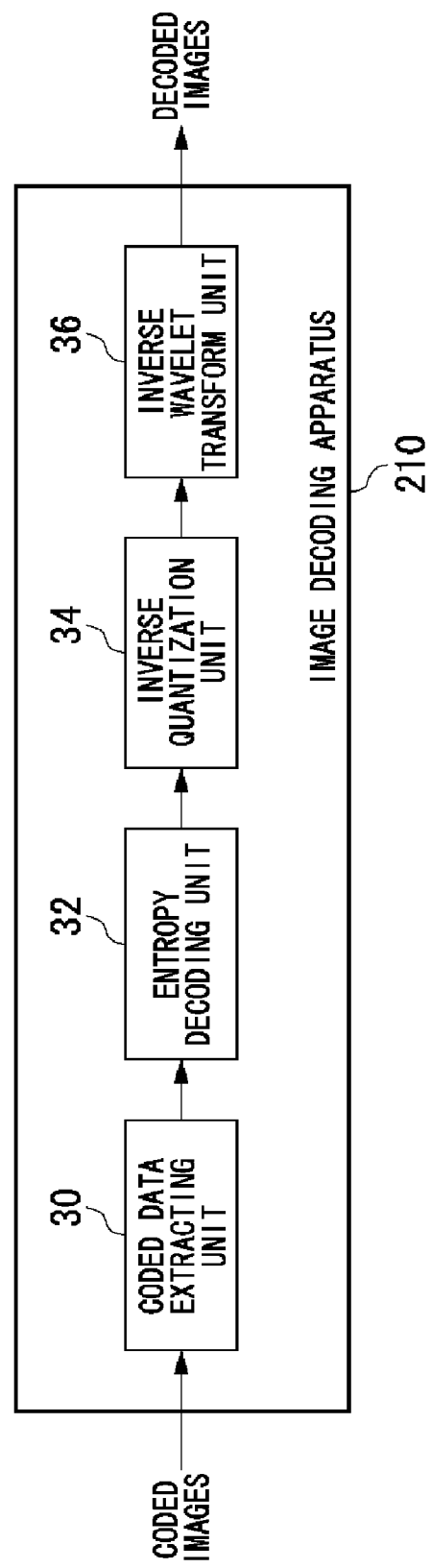
FIG. 9 illustrates a structure of an image decoding apparatus according to a first embodiment of the present invention.

FIG. 9 illustrates a structure of an image decoding apparatus 210 according to a first embodiment of the present invention. Since an image whose ROI has been encoded preferentially by an image coding apparatus 200 according to the first embodiment is a normal coded image without the scale-up of the ROI transform coefficients, the image decoding apparatus 210 can decode the coded image simply by the ordinary decoding scheme of JPEG2000.

A coded data extracting unit 30 extracts coded data from an inputted coded image. For example, data for 5 bit-planes as shown in FIG. 7C, which have been coded in order from top, are obtained. It is to be noted here that the coded data extracting unit 30 is not at all in need of ROI position information that gives the position of a region of interest. An entropy decoding unit 32 decodes the coded data bit-plane by bit-plane. In the example of FIG. 7C, the 5 bit-planes are decoded, and the quantized data are stored in a memory.

An inverse quantization unit 34 inverse-quantizes the decoded quantized data, and an inverse wavelet transform unit 36 inverse transforms the inverse-quantized wavelet transform coefficients and outputs a decoded image thus obtained.

As described above, an image coding apparatus 200 according to the first embodiment encodes a region of interest preferentially by relatively raising the degree of priority of ROI transform coefficients through a zero substitution of non-ROI transform coefficients. Without any scale-up processing of ROI transform coefficients, the image coding apparatus 200 can carry out the coding computation efficiently. Also, with no increase in the number of bit-planes to be coded, any extra storage area is not required, thus reducing hardware cost.

Also, with no need for scale-down processing at decoding, it does not require addition of ROI position information and scale-up amount data to the coded data. Furthermore, an image which has been ROI-coded by an image coding apparatus 200 according to the first embodiment is no different in format from a normal coded image, so that it can be decoded by exactly the same decoding processing as for the normal coded image. This feature ensures to retain compatibility among decoding processings.

Second Embodiment

Figure 10:
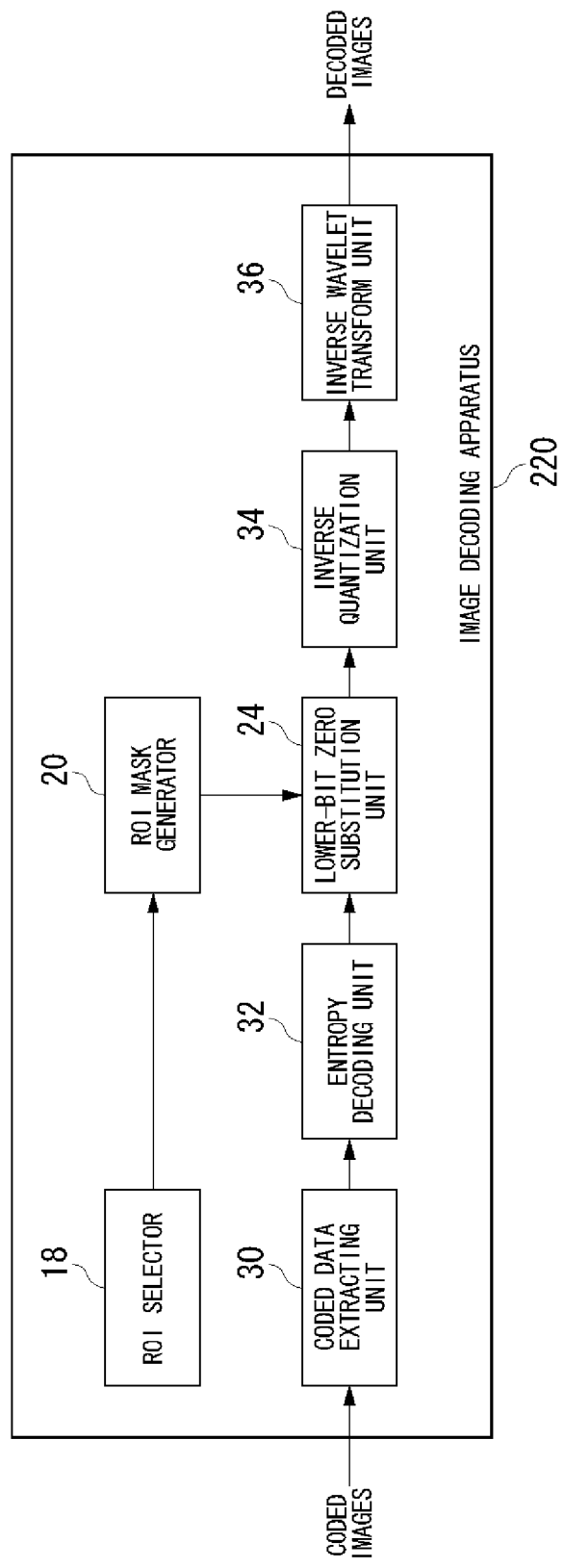
FIG. 10 illustrates a structure of an image decoding apparatus according to a second embodiment of the present invention.

FIG. 10 illustrates a structure of an image decoding apparatus 220 according to a second embodiment of the present invention. According to this second embodiment, a coded image to be inputted to the image decoding apparatus 220 is an ordinary coded image, which has not been subjected to a ROI coding. The image decoding apparatus 220 according to this second embodiment specifies a region of interest at decoding and decodes the region of interest on a preferential basis.

Coded images to be inputted to the image decoding apparatus 220 may also be coded frames of moving images. A moving image can be reproduced by consecutively decoding coded frames of the moving image, which are inputted as a codestream.

A coded data extracting unit 30 extracts coded data from an inputted coded image, and an entropy decoding unit 32 decodes the coded data bit-plane by bit-plane and stores the resulting quantized wavelet transform coefficients in a memory.

A ROI selector 18 selects a region of interest in an image and provides ROI position information indicative of the position of the region of interest to a ROI mask generator 20. A region of interest may be selected by specifying a position in an image, for instance, the center region of an image. It may also be selected by an automatic extraction or a user selection of an important region where there may be a human figure or characters. Where coded frames of a moving image are consecutively inputted to an image decoding apparatus 220, a region of interest may be specified in or extracted from a decoded image frame outputted from the image decoding apparatus 220 and the specified or extracted region of interest may be selected as the region of interest in the next coded frame.

The ROI mask generator 20 generates a ROI mask for specifying the wavelet transform coefficients corresponding to a region of interest, namely, the ROI transform coefficients, based on ROI position information. The lower-bit zero substitution unit 24 functions to adjust the number of low-order bits to be substituted with zeros in a bit string of the wavelet transform coefficients corresponding to a non-region-of-interest according to a relative degree of priority of the ROI to the non-ROI. And by referring to the ROI mask, the lower-bit zero substitution unit 24 performs a zero-substitute processing where a predetermined number of bits selected from the LSB side of non-ROI transform coefficients among the wavelet transform coefficients decoded by the entropy decoding unit 32 are substituted with zeros.

Figure 11:
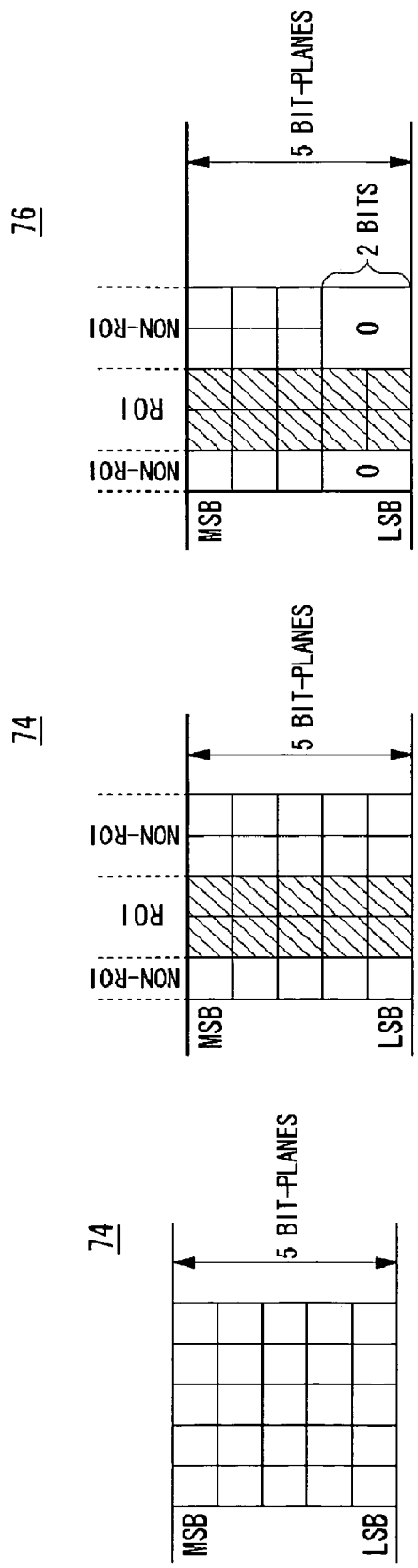
FIGS. 11A to 11C illustrate how low-order bits of wavelet transform coefficients after a decoding of a coded image are zero-substituted.

FIGS. 11A to 11C illustrate how the low-order bits of wavelet transform coefficients after a decoding of a coded image are zero-substituted by a lower-bit zero substitution unit 24. FIG. 11A shows wavelet transform coefficients 74 of an entropy-decoded image, which include 5 bit-planes. In FIG. 11B, the area shaded by oblique lines represents ROI transform coefficients corresponding to a region of interest specified by a ROI selector 18. As shown in FIG. 11C, the lower-bit zero substitution unit 24 generates wavelet transform coefficients 76 with 2 low-order bits of the non-ROI transform coefficients substituted with zeros.

An inverse quantization unit 34 inverse-quantizes the wavelet transform coefficients containing the ROI transform coefficients and the non-ROI transform coefficients whose low-order bits are zero-substituted, and an inverse wavelet transform unit 36 inverse-transforms the inverse-quantized wavelet transform coefficients and outputs a decoded image thus obtained.

It should be noted that the ROI selector 18 may also select a non-region-of-interest instead of a region of interest. For example, if a user wants regions containing personal information, such as a face of a person or a license plate of a car, to be blurred, the arrangement may be such that the ROI selector 18 selects such regions as non-regions-of-interest. In this case, the ROI mask generator 20 can generate a mask for specifying ROI transform coefficients by inverting the mask for specifying the non-ROI transform coefficients. Or the ROI mask generator 20 may give the mask for specifying the non-ROI transform coefficients to the lower-bit zero substitution unit 24.

When coded frames of a moving image are inputted consecutively to the image decoding apparatus 220, the image decoding apparatus 220 can carry out the following operation. That is, the image decoding apparatus 220 normally performs a simplified reproduction by appropriately discarding low-order bit-planes of wavelet transform coefficients in order to reduce processing load. Because of this disposal of lower bit-planes, a simplified reproduction at, for instance, 30 frames per second is possible even when the image decoding apparatus 220 is subject to limitations in its processing performance.

When a region of interest in an image is selected during a simplified reproduction, the image decoding apparatus 220 reproduces the image by decoding, down to the lowest-order bit-plane, the wavelet transform coefficients for which the low-order bits of the non-regions-of-interest have been zero-substituted by the lower-bit zero substitution unit 24. At this time, the processing load rises, and the result may be a loss of frames to 15 frames per second, for instance, or a slowed reproduction, though the region of interest can be reproduced with high image quality.

Thus, when a region of interest is selected in this manner, the region of interest only will be reproduced with a higher quality while the quality of the non-regions-of-interest remains at a level equal to a simplified. reproduction. This proves useful for such applications as a surveillance camera which do not require high-quality images at normal times but have need for higher-quality reproduction of images in times of emergency. For reproduction of moving images by a mobile terminal, the image decoding apparatus 220 may be used in the following manner, for example. That is, the moving images are reproduced with low quality in the power saving mode, with the region of interest reproduced with higher quality only when necessary, so as to ensure a longer life for the battery.

An image decoding apparatus 220 according to the second embodiment, therefore, can decode a normal coded image, which is not ROI-coded, in such a manner that the image quality of the region of interest is relatively raised higher than that of the non-regions-of-interest by zero-substituting the low-order bits of the wavelet transform coefficients corresponding to the non-regions-of-interest. Normally, much computation is required for the reproduction of a whole image with high quality, but according to the present embodiment, the region of interest only is decoded preferentially, so that the amount of computation can be suppressed.

Third Embodiment

Figure 12:
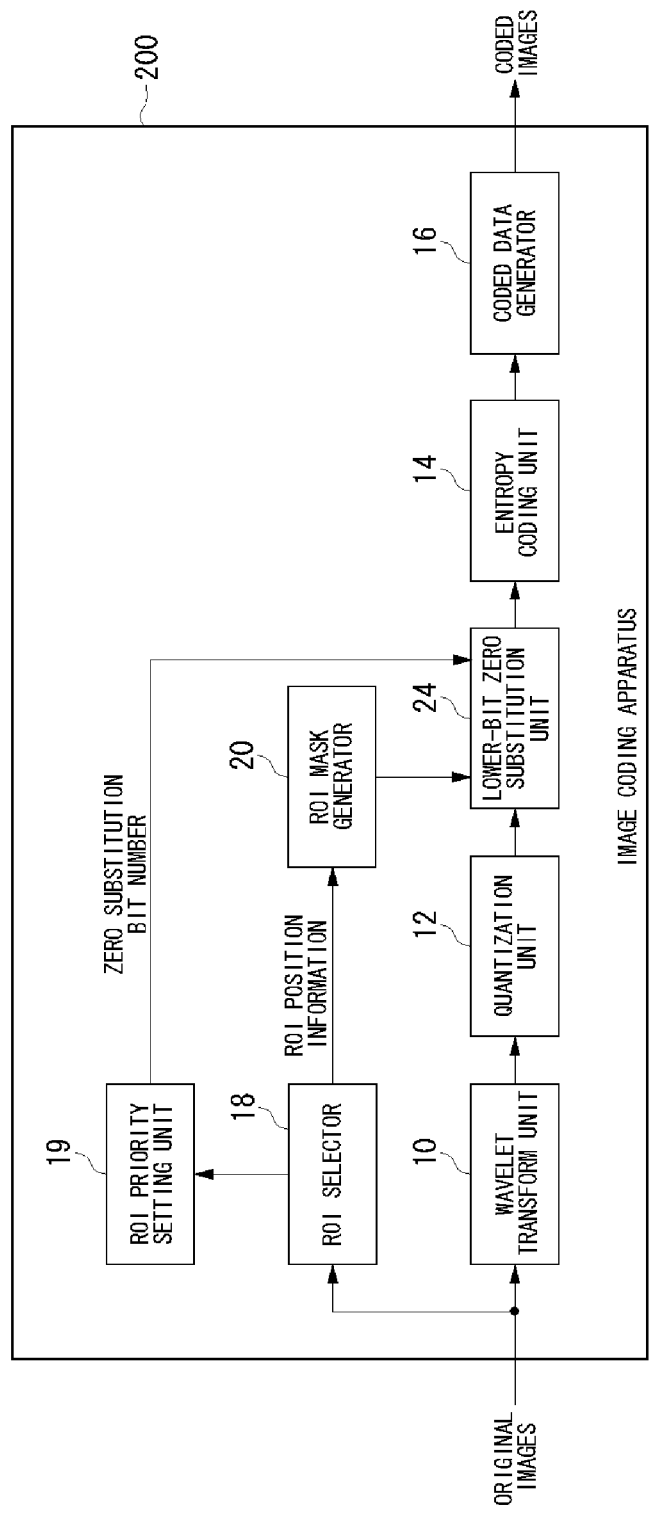
FIG. 12 illustrates a structure of an image coding apparatus according to a third embodiment of the present invention.

FIG. 12 illustrates a structure of an image coding apparatus 200 according to a third embodiment of the present invention. With an image coding apparatus 200 according to the first embodiment, a single region of interest only is selected, but an image coding apparatus 200 according to this third embodiment selects a plurality of regions having different degrees of priority in an image, performs compression and coding of the image according to the degrees of priority thereof, and generates a coded image having a plurality of regions with different image qualities. Hereinbelow, the same reference numerals will be used for a structure equal to that of the first embodiment, and the structure and operation different from those of the first embodiment will be described.

A ROI selector 18 selects a plurality of regions of interest in an original image and supplies ROI position information indicative of the positions of the respective regions of interest to a ROI mask generator 20. The plurality of regions of interest may have overlaps with each other, and the regions of interest may contain some non-regions-of-interest therein. The ROI mask generator 20 generates ROI masks for specifying the wavelet transform coefficients corresponding to the respective regions of interest, which are the ROI transform coefficients, based on the ROI position information.

The ROI mask generator 20 generates ROI masks for the respective regions of interest by carrying out processings for specifying the ROI transform coefficients as described in the first embodiment on each of the plurality of regions of interest selected by the ROI selector 18.

A ROI priority setting unit 19 sets respective degrees of priority for a plurality of regions of interest. For example, when the central part of an image and the periphery thereof are selected as a plurality of regions of interest and the rest of the image surrounding them as a non-region-of-interest, the central part of the image is set for a high degree of priority for a high image-quality reproduction and the periphery thereof is set for a lower degree of priority for a standard image-quality reproduction. As another example, when a region with characters and a region with a human face are selected as a plurality of regions of interest, the region with characters is set for the highest degree of priority for a highest image quality and the region with a human face set for a next degree of priority for the high image quality, with the rest of the image set for a standard image quality as the non-region-of-interest. To protect the person's privacy, the region with a human face may also be set for a low degree of priority for a low image quality or as a non-region-of-interest.

Figure 13:
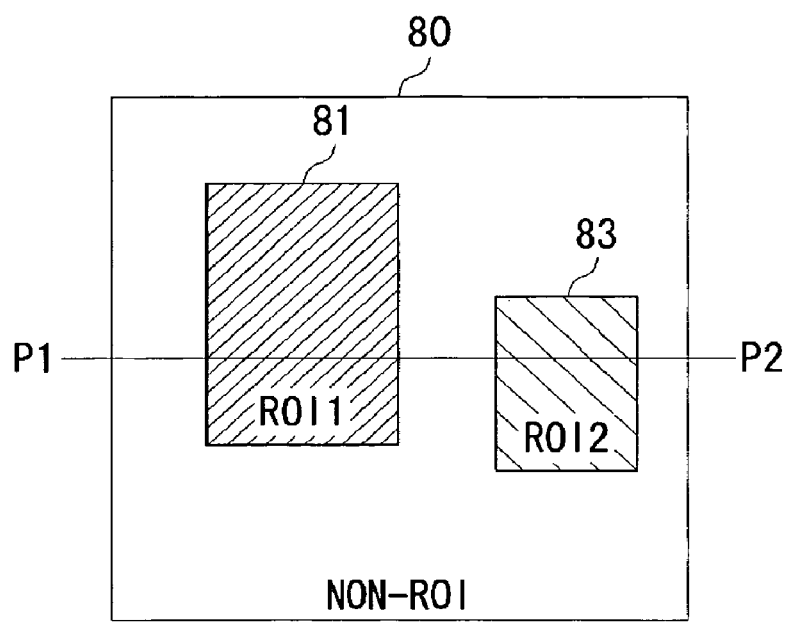
FIG. 13 illustrates an example of priority setting when a plurality of regions of interest are provided in an original image.

FIG. 13 illustrates an example of priority setting when a plurality of regions of interest are provided in an original image 80. When two regions of interest 81 and 83 are set in an original image 80 as shown in FIG. 13, the ROI priority setting unit 19 sets a priority order in a manner such that the degree of priority descends, for instance, in the order of a first region of interest 81 (ROI1 hereafter), a second region of interest 83 (ROI2 hereafter) and a remaining non-region-of-interest (non-ROI hereafter).

Based on the degrees of priority thus set, the ROI priority setting unit 19 determines the number of low-order bits $S_0$ to be zero-substituted in the bit string of the non-ROI transform coefficients, which are the wavelet transform coefficients corresponding to the non-region-of-interest, and the number of low-order bits $S_i$ (i=1, ..., N; N being the number of regions of interest) to be zero-substituted in the bit string of the ROI transform coefficients, which are the wavelet transform coefficients corresponding to each of the plurality of regions of interest.

In the example of FIG. 13, if, for instance, the wavelet transform coefficients of the original image is made up of 7 bit-planes, then the ROI priority setting unit 19 will set 0 for the number of zero-substitution bits $S_i$ for the first priority region of interest ROI1, 2 for the number of zero-substitution bits $S_2$ for the second priority region of interest ROI2, and 4 for the number of zero substitution bits $S_0$ for the non-region-of-interest. In other words, the lower the degree of priority, the larger the number of zero-substitution bits will be.

A lower-bit zero substitution-unit 24 shown in FIG. 12 refers to the ROI masks for the respective regions of interest generated by the ROI mask generator 20 and zero-substitutes $S_0$ bits only counted from the lowest bit in the bit string of the non-ROI transform coefficients not masked by the ROI masks and also zero-substitutes $S_i$ bits only counted from the lowest bit in the bit string of the ROI transform coefficients masked by the ROI masks.

Here, the number of zero-substitution bits $S_0$ in the non-ROI transform coefficients and the number of zero-substitution bits $S_i$ in the ROI transform coefficients are each determined by a ROI priority setting unit 19 according to the relative degrees of priority among the non-region-of-interest and the plurality of regions of interest. They are arbitrary natural numbers the upper limit of which being the number of bit-planes of wavelet transform coefficients and are subject to the condition of $S_0 > S_i$. By changing the numbers of zero-substitution bits $S_0$ and $S_i$, the ROI priority setting unit 19 can continuously adjust the level of degradation in reproduced image quality of the non-region-of-interest relative to the region of interest and it can also continuously adjust the dominance in reproduced image quality among the plurality of regions of interest. And the plurality of regions of interest are reproduced with such image qualities that the objects can be visually verifiable.

Figure 14A:
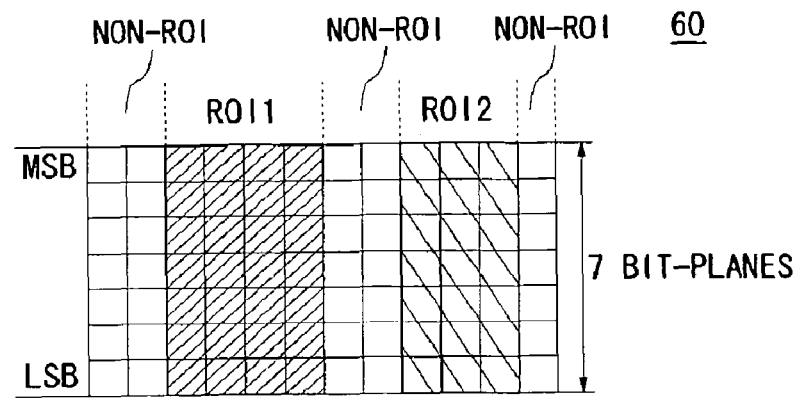
FIGS. 14A to 14C illustrate how low-order bits of wavelet transform coefficients of an original image are zero-substituted.
Figure 14B:
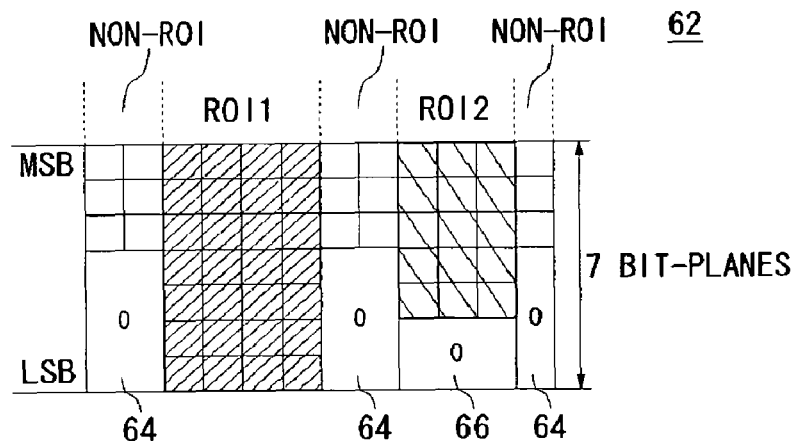
Figure 14C:
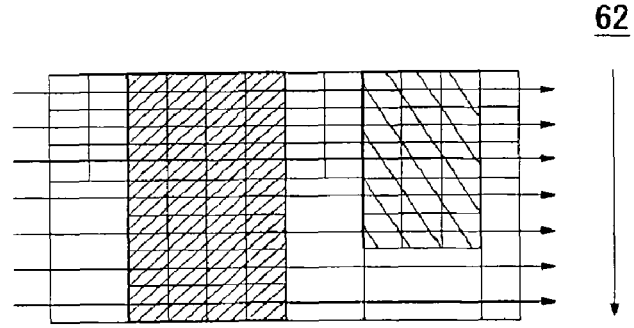

FIGS. 14A to 14C illustrate how the low-order bits of the wavelet transform coefficients 60 of an original image are zero-substituted by a lower-bit zero substitution unit 24. FIG. 14A shows the wavelet transform coefficients 60 after a quantization by a quantization unit 12. They include 7 bit-planes, and the ROI transform coefficients are shaded with oblique lines. FIG. 14A represents the bit string of wavelet transform coefficients corresponding to the pixels on line P1-P2 in the example of an original image 80 containing two regions of interest ROI1 and ROI2 shown in FIG. 13.

As is shown in FIG. 14B, the lower-bit zero substitution unit 24 substitutes the $S_0$ bits on the LSB side of the non-ROI transform coefficients not masked by ROI masks. In this example, $S_0=4$, and as reference numeral 64 indicates in FIG. 14B, the 4 bits on the LSB side of the non-ROI transform coefficients are substituted with zeros. Furthermore, the lower-bit zero substitution unit 24 substitutes the $S_i$ bits on the LSB side of the ROI transform coefficients masked by the ROI masks with zeros. In this example, where two regions of interest, namely, ROI1 and ROI2, are set, their respective numbers of zero substituted bits $S_1$ and $S_2$ are 0 and 2, and as reference numeral 66 indicates in FIG. 14B, the 2 bits on the LSB side of the ROI transform coefficients corresponding to ROI2 are substituted with zeros. In this manner, wavelet transform coefficients 62 which have been zero-substituted by the lower-bit zero substitution 24 are obtained.

An entropy coding unit 14 shown in FIG. 12 entropy-codes the wavelet transform coefficients 62 containing the ROI transform coefficients and the zero-substituted non-ROI transform coefficients by scanning the bit-planes in order from MSB as indicated by the arrows in FIG. 14C.

It is to be noted that where there are no regions of interest in an original image, the low-order bits of the wavelet transform coefficients are coded through zero-substitution as a whole in the same way as in the first embodiment.

A coded data generator 16 processes entropy-coded data into a stream together with such coding parameters as quantizing width and outputs it as a coded image. This coded image, which contains a plurality of regions with different image qualities at reproduction, is supplied to a storage device, a network or the like through an output part and is decoded by an image display apparatus having a decoding means and reproduced on the screen thereof.

As described in the first embodiment, in cases where there is an upper limit set for the data size of a final coded image due to some limitations in storage capacity, transmission rate and so forth, the entropy coding unit 14 may, as appropriate, discontinue a coding process at a halfway bit-plane when bit-planes are being coded in sequence from the high-order one, or the coded data generator 16 may, as appropriate, discontinue a stream output at a halfway bit-plane when coded data are being outputted in a stream bit-plane by bit-plane from the high-order one.

Accordingly, even when the data size of a coded image is subject to some limitation like this, the third embodiment is such that for low-order bit-planes, the wavelet transform coefficients corresponding to non-regions-of-interest and low-priority regions of interest are zero-substituted and the wavelet transform coefficients corresponding to high-priority regions of interest only are subjected to coding as significant information. As a result, the compression efficiency for low-order bit-planes is high, and thus the data size will not increase much even when the coding covers and reaches the lowest bit-plane.

Figure 15:
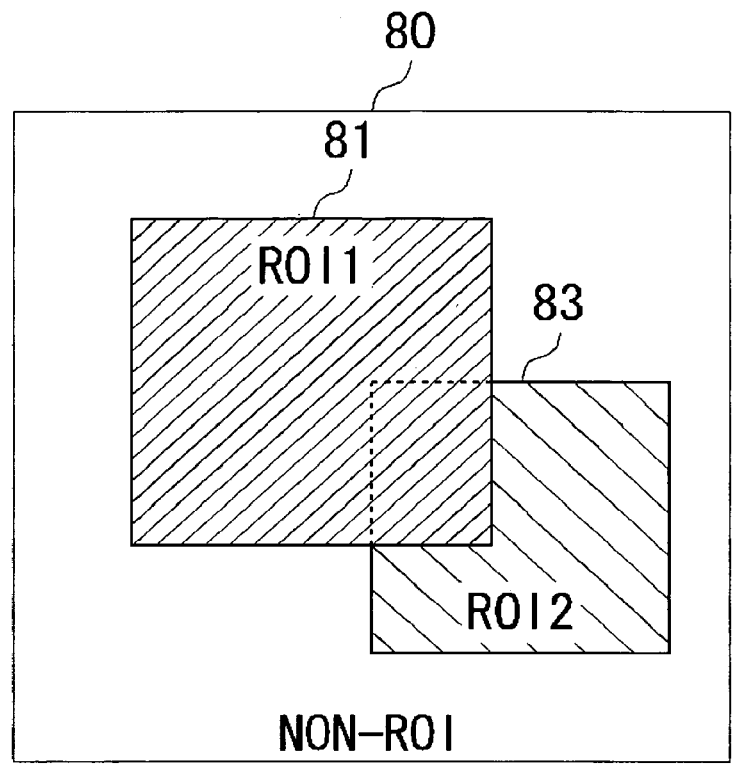
FIG. 15 illustrates an example of setting the degrees of priority when there is an area of overlap in a plurality of regions of interest provided in an original image.

FIG. 15 illustrates an example of setting the degrees of priority when there is an area of overlap in a plurality of regions of interest provided in an original image 80. When two regions of interest 81 and 83 are set in an original image 80 as shown in FIG. 15, the ROI priority setting unit 19, in the same way as in the example of FIG. 13, sets a number of zero-substituted bits $S_1$ for a first region of interest 81 (ROI1), a number of zero-substituted bits $S_2$ for a second region of interest 83 (ROI2) and a number of zero-substituted bits $S_0$ for a remaining non-region-of-interest (non-ROI).

The lower-bit zero substitution unit 24 zero-substitutes $S_0$ bits from the LSB side for the non-ROI transform coefficients and also zero-substitutes $S_i$ bits from the LSB side for each of the ROI transform coefficients corresponding respectively to the two regions of interest ROI1 and ROI2. However, to the overlapping region of the two regions of interest ROI1 and ROI2, the lower-bit zero substitution unit 24 applies preferentially the number of zero-substituted bits $S_i$ for a region of interest with a higher degree of priority.

Figure 16:
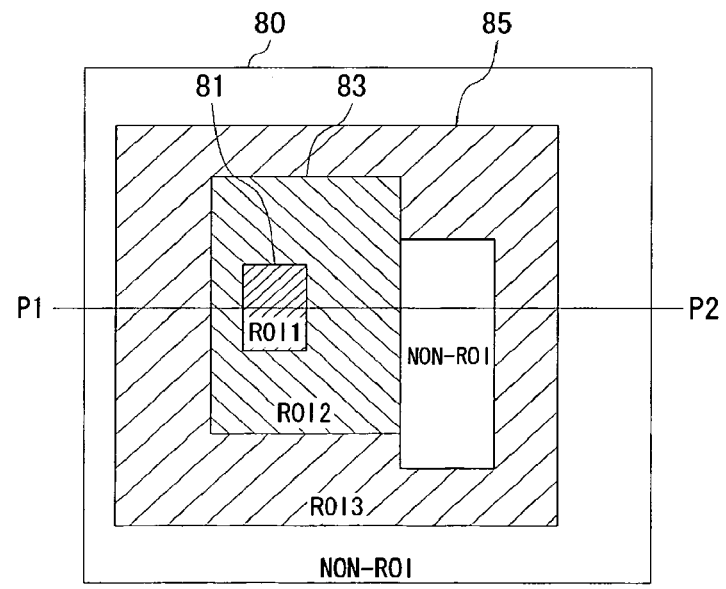
FIG. 16 illustrates an example of setting the degrees of priority when there are areas of overlap in a plurality of regions of interest provided in an original image and a non-region-of-interest is contained within a region of interest.

FIG. 16 illustrates an example of setting the degrees of priority when there are areas of overlap in a plurality of regions of interest provided in an original image 80 and a non-region-of-interest is contained in a region of interest. Suppose that, as shown in FIG. 16, a first region of interest 81 (ROI1), a second region of interest 83 (ROI2) and a third region of interest 85 (ROI3) are set in an original image 80 and they have the degrees of priority descending in this order. ROI1 is inside ROI2, and ROI2 is inside ROI3, and a non-region-of-interest (non-ROI) occupies a part of ROI3. Moreover, a non-ROI also exists outside ROI3.

In this case, as with the case of FIG. 15, a lower-bit zero substitution unit 24 applies a number of zero-substituted bits with a higher degree of priority to an area of overlap. Hence, the number of zero-substituted bits $S_1$ is preferentially applied to ROI1; the number of zero-substituted substituted bits $S_2$ is preferentially applied to ROI2 (excluding ROI1, however); and the number of zero-substituted bits $S_3$ is preferentially applied to ROI3 (excluding ROI2, however). To the non-ROI inside ROI3, however, the number of zero-substituted bits $S_0$ of the non-ROI is applied as an exception. This is because, when a non-region-of-interest is set within a region of interest, the purpose is such that the user wants a particular region, which contains confidential information such as personal information, blurred even though it is within the region of interest.

Figure 17A:
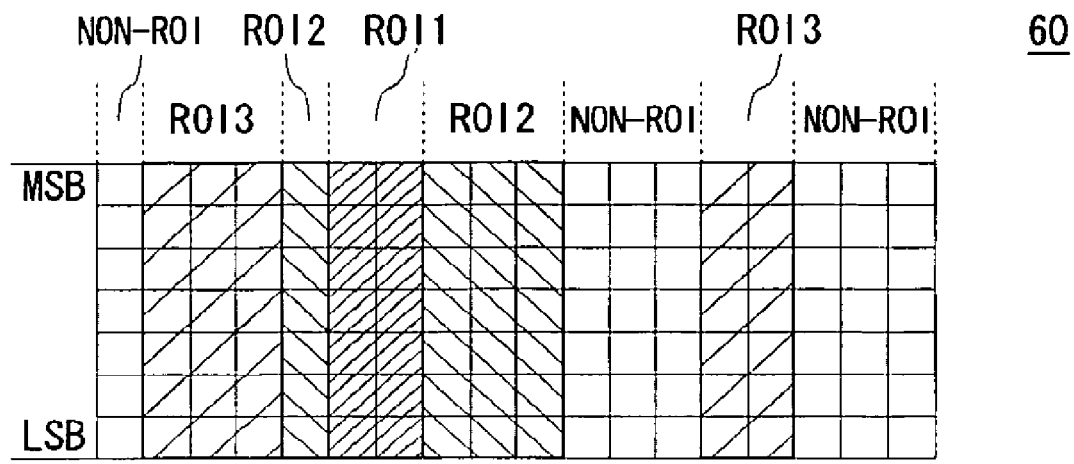
FIGS. 17A and 17B illustrate how low-order bits of wavelet transform coefficients of an original image in the example of FIG. 16 are zero-substituted.
Figure 17B:
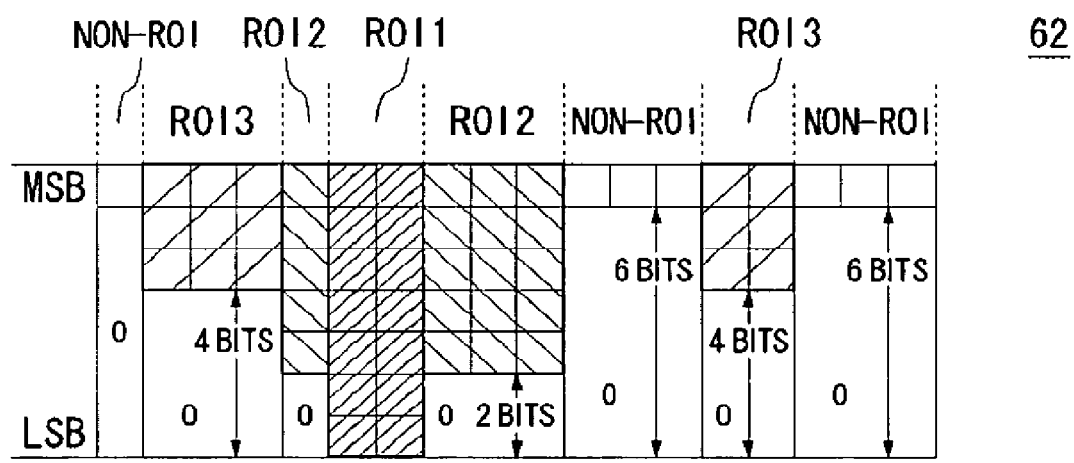

FIGS. 17A and 17B illustrate how the low-order bits of the wavelet transform coefficients 60 of an original image in the example of FIG. 16 are zero-substituted by a lower-bit zero substitution unit 24. FIG. 17A shows wavelet transform coefficients 60 after a quantization by a quantization unit 12, which include 7 bit-planes with the ROI transform coefficients shaded with oblique lines. FIG. 17A represents the bit string of wavelet transform coefficients corresponding to the pixels along line P1-P2 in the example of an original image 80 containing the three regions of interest ROI1 to ROI3 in FIG. 16.

FIG. 17B shows the wavelet transform coefficients 62 which have been zero-substituted by the lower-bit zero substitution unit 24. The So bits on the LSB side of the non-ROI transform coefficients corresponding to the non-ROIs outside and inside ROI3 are substituted with zeros. In this example, $S_0=6$. Furthermore, the $S_i$ bits on the LSB side of the ROI transform coefficients corresponding to ROI1 to ROI3 are substituted with zeros. In this example, $S_1=0$, $S_2=2$, and $S_3=4$.

In the decoding process, an image decoding apparatus having the same structure as that of an image decoding apparatus 210 of the first embodiment decodes an image coded by an image coding apparatus 200 of the third embodiment, using an ordinary decoding scheme of JPEG2000. An image thus decoded, which contains a plurality of regions with different image qualities, are supplied to an image display apparatus through an output part and reproduced on the screen thereof.

As described above, the image coding apparatus 200 according to the third embodiment not only zero-substitutes the non-ROI transform coefficients but also codes a plurality of regions of interest in the order of priority by zero-substituting the ROI transform coefficients corresponding to the plurality of regions of interest by the numbers of bits-according to their respective degrees of priority. Moreover, it can produce differences in reproduced image quality among the plurality of regions of interest by performing a coding according to the differences in the degree of priority thereof.

Fourth Embodiment

Figure 18:
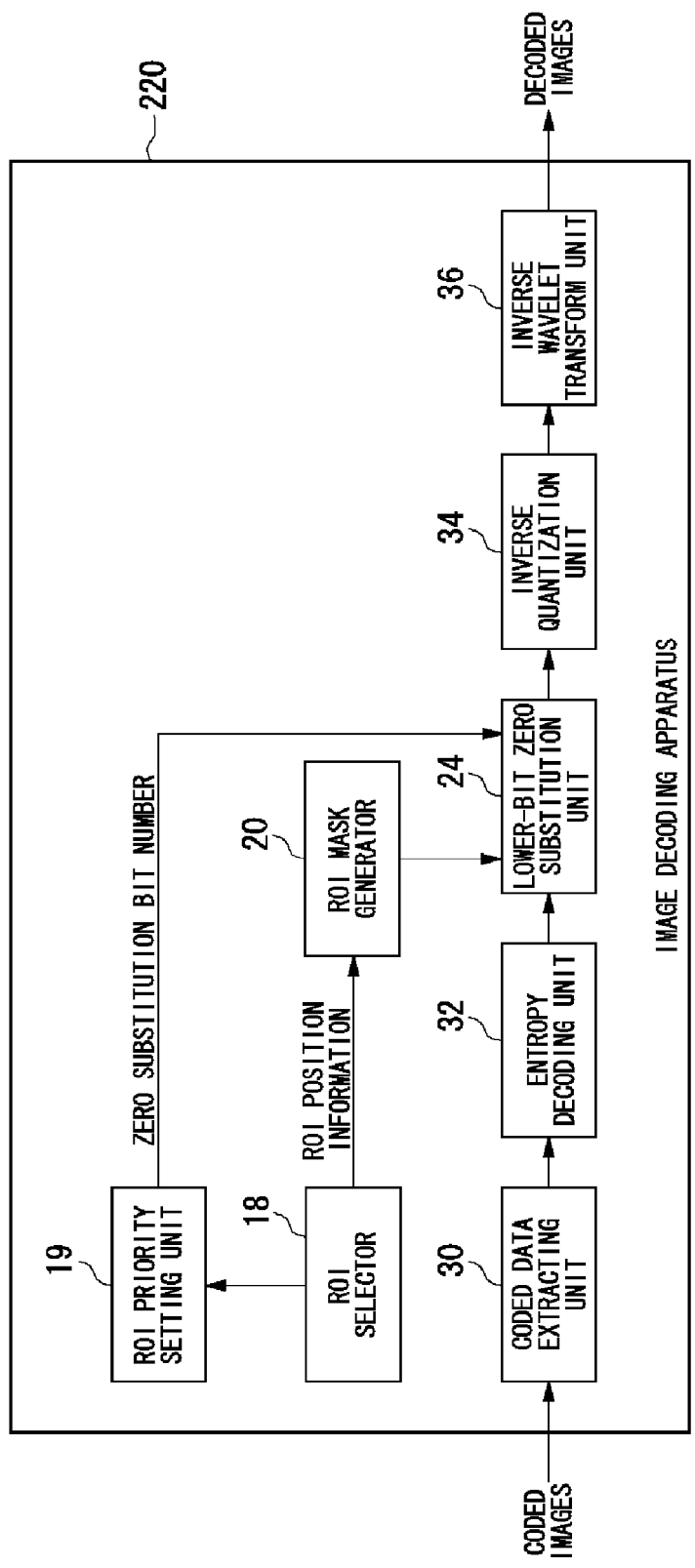
FIG. 18 illustrates a structure of an image decoding apparatus according to a fourth embodiment of the present invention.

FIG. 18 illustrates a structure of an image decoding apparatus 220 according to a fourth embodiment of the present invention. In this fourth embodiment, a coded image inputted to the image decoding apparatus 220 is a normal coded image which has not been ROI-coded. With the image decoding apparatus 220 according to the second embodiment, a single region of interest only is specified for decoding, but the image decoding apparatus 220 according to this fourth embodiment specifies a plurality of regions of interest for decoding and decodes the plurality of regions of interest according to their respective degrees of priority. Hereinbelow, the same reference numerals will be used for a structure equal to that of the second embodiment, and the structure and operation different from those of the second embodiment will be explained.

A ROI selector 18 selects a plurality of regions of interest in an original image and supplies ROI position information indicative of the positions of the respective regions of interest to a ROI mask generator 20.

Where coded frames of a moving image are inputted consecutively to the image decoding apparatus 220, the regions of interest may be specified or extracted in a decoded image frame outputted from the image decoding apparatus 220 and the specified or extracted regions of interest may be selected as the regions of interest in the following coded frame. In such a case, a plurality of regions changing with time may be selected according to the respective degrees of change. For instance, a region with the greatest change, a region with the next greatest change, and a remaining region may be selected as a first-priority region of interest, a second-priority region of interest, and a non-region-of-interest.

A ROI mask generator 20 generates ROI masks for specifying the ROI transform coefficients, which are the wavelet transform coefficients corresponding to the respective regions of interest, based on the ROI position information. A ROI priority setting unit 19 sets respective degrees of priority for the plurality of regions of interest, and determines the number of zero-substituted bits $S_0$ for the non-region-of-interest and the numbers of zero-substituted bits $S_i$ for the respective regions of interest, based on the respective degrees of priority. A lower-bit zero substitution unit 24 zero-substitutes $S_0$ bits from the LSB side of the non-ROI transform coefficients and also $S_i$ bits from the LSB side of the ROI transform coefficients, out of the wavelet transform coefficients decoded by an entropy decoder 32, by referring to the ROI masks.

Figure 19A:
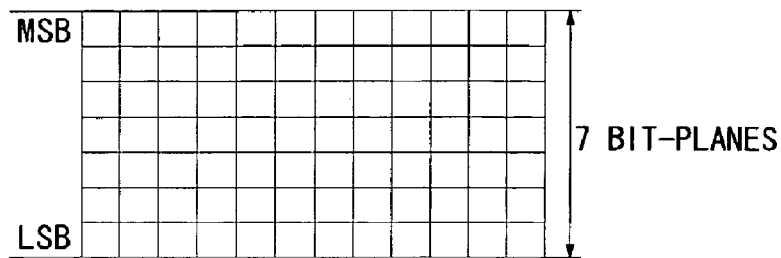
FIGS. 19A to 19C illustrate how low-order bits of wavelet transform coefficients after a decoding of a coded image are zero-substituted.
Figure 19B:
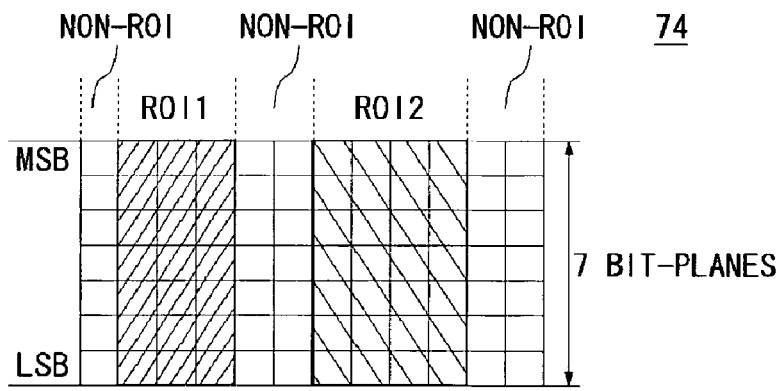
Figure 19C:
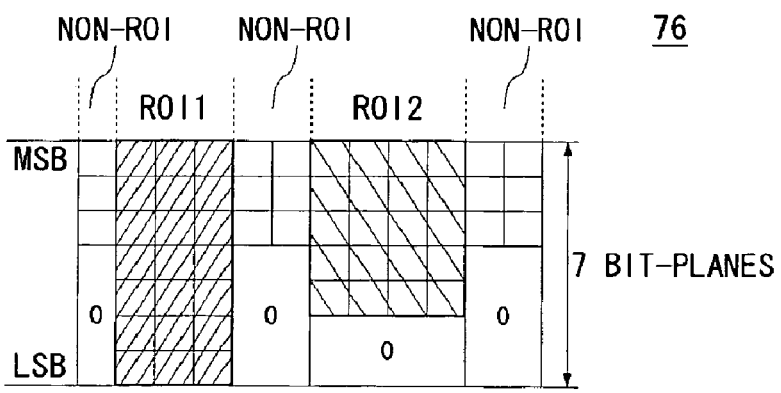

FIGS. 19A to 19C illustrate how the low-order bits of wavelet transform coefficients after a decoding of a coded image are zero-substituted by a lower-bit zero substitution unit 24. FIG. 19A shows wavelet transform coefficients 74 of an entropy-decoded image, which include 7 bit-planes. In FIG. 19B, the areas shaded by oblique lines represent ROI transform coefficients corresponding to a plurality of regions of interest specified by the ROI selector 18. In this example, there are two regions of interest ROI1 and ROI2, of which ROI1 has a higher degree of priority. FIG. 19C represent wavelet transform coefficients 76 after a zero-substitution by the lower-bit zero substitution unit 24. In this example, 4 low-order bits of the non-ROI transform coefficients are substituted with zero, the ROI transform coefficients of ROI1 are left unchanged, and 2 low-order bits of the ROI transform coefficients of ROI2 are substituted with zero.

When a plurality of regions of interest in an image are selected during a simplified reproduction, the image decoding apparatus 220 reproduces the image by decoding, down to the lowest-order bit plane, the wavelet transform coefficients for which the low-order bits of the non-regions-of-interest and the low-order bits of at least one of the plurality of regions of interest have been zero-substituted by the lower-bit zero substitution unit 24. At this time, the processing load may rise, resulting in a loss of frames to 15 frames per second, for instance, or a slowed reproduction, but the plurality of regions of interest may be reproduced with high image quality according to their respective degrees of priority.

In this manner, when a plurality of region of interest are selected, the plurality of regions of interest can be reproduced with high image quality according to their respective degrees of priority while the quality of the non-regions-of-interest remains at a level equal to a simplified reproduction.

Hence, the image decoding apparatus 220 according to the fourth embodiment can decode a normal coded image, which has not been ROI-coded, in such a manner that the image quality of a plurality of regions of interest is relatively raised higher than that of the non-regions-of-interest according to their respective degrees of priority, by zero-substituting the low-order bits of the wavelet transform coefficients corresponding to the non-regions-of-interest and also zero-substituting the low-order bits of the wavelet transform coefficients corresponding to the plurality of regions of interest according to their respective degrees of priority. Normally, much computation is required for the reproduction of a whole image with high quality, but according to the fourth embodiment, a plurality of regions of interest are decoded according to their respective degrees of priority, so that the amount of computation can be suppressed.

Fifth Embodiment

Figure 20:
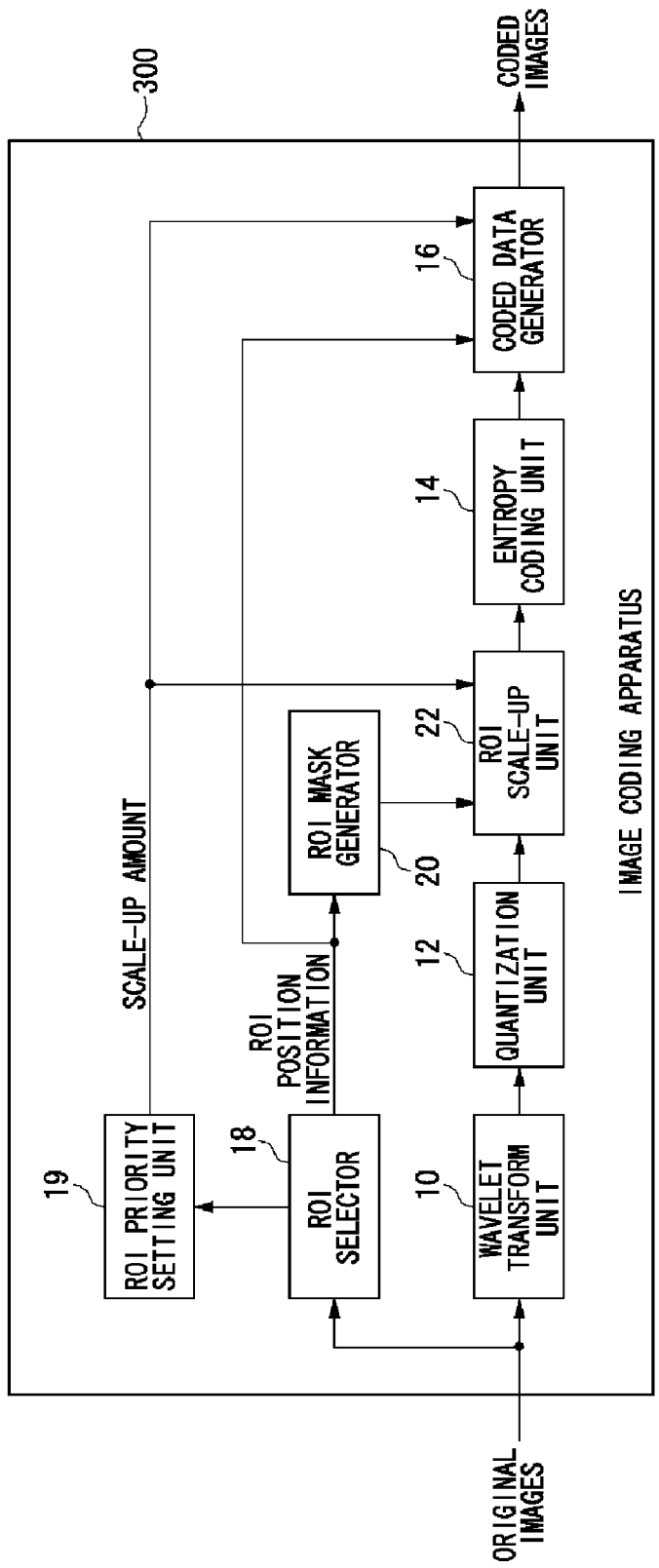
FIG. 20 illustrates a structure of an image coding apparatus according to a fifth embodiment of the present invention.

FIG. 20 illustrates a structure of an image coding apparatus 300 according to a fifth embodiment of the present invention. According to this fifth embodiment, the ROI transform coefficients corresponding to a plurality of regions of interest are scaled-up according to their respective degrees of priority.

Hereinbelow, the structure and operation different from those of the third embodiment will be explained.

A ROI priority setting unit 19 sets degrees of priority for a plurality of regions of interest selected by a ROI selector 18 and determines the scale-up amounts $S_i$ for the ROI transform coefficients corresponding to the plurality of regions of interest based on their respective degrees of priority. The setting is such that the higher the degree of priority for a region of interest, the larger the scale-up amount $S_i$ for the ROI transform coefficients will be.

A ROI scale-up unit 22 scales-up the ROI transform coefficients corresponding to the respective regions of interest based on the scale-up amounts $S_i$ determined by a ROI priority setting unit 19.

Figure 21A:
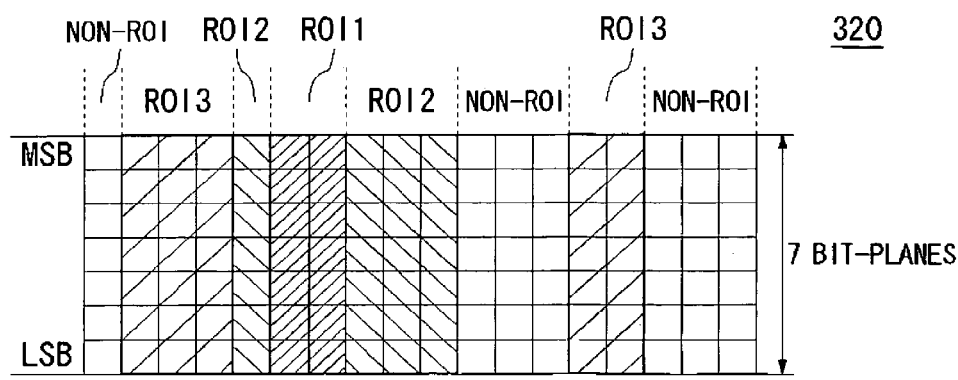
FIGS. 21A and 21B illustrate how wavelet transform coefficients of an original image are scaled up.
Figure 21B:
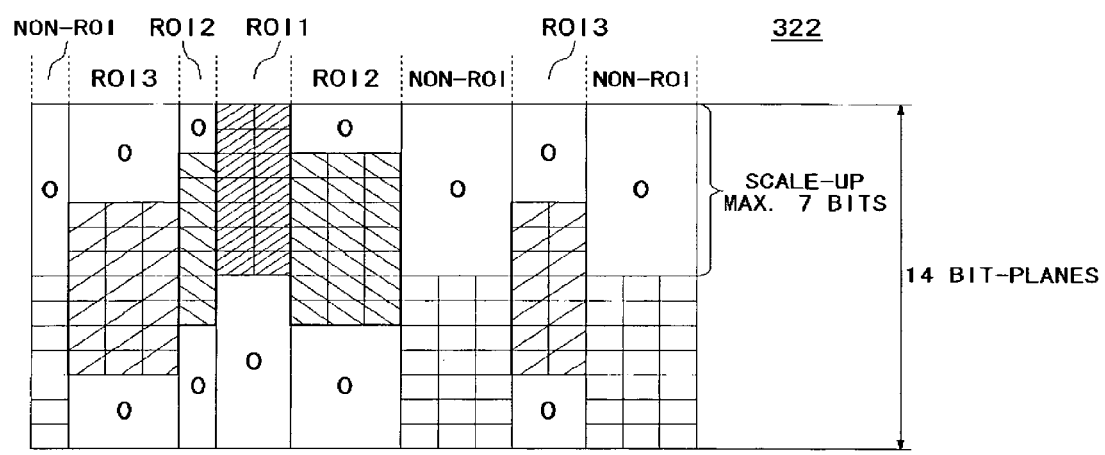

FIGS. 21A and 21B illustrate how the wavelet transform coefficients of an original image are scaled-up by a ROI scale-up unit 22. FIG. 21A represents wavelet transform coefficients 320 after a quantization by a quantization unit 12, which include 7 bit-planes, with the ROI transform coefficients shaded with oblique lines. In this example, there are three regions of interest ROI1, ROI2 and ROI3, whose degree of priority descends in this order. Based on this order of priority, the ROI priority setting unit 19 determines the scale-up amounts $S_1$, $S_2$ and $S_3$ of ROI1, ROI2 and ROI3, respectively, as $S_1=7$, $S_2=5$, and $S_3=3$.

FIG. 21B represents wavelet transform coefficients 322 scaled-up by the ROI scale-up unit 22. The ROI scale-up unit 22 scales-up the ROI transform coefficients of ROI1 by 7 bits, the ROI transform coefficients of ROI2 by 5 bits, and the ROI transform coefficients of ROI3 by 3 bits. And in the wavelet transform coefficients 322 after the scale-up, zeros are allotted to the digits (or bits, here) that have been newly created by the scale-up. This results in the wavelet transform coefficients 322 composed of a total of 14 bit-planes.

Figure 22:
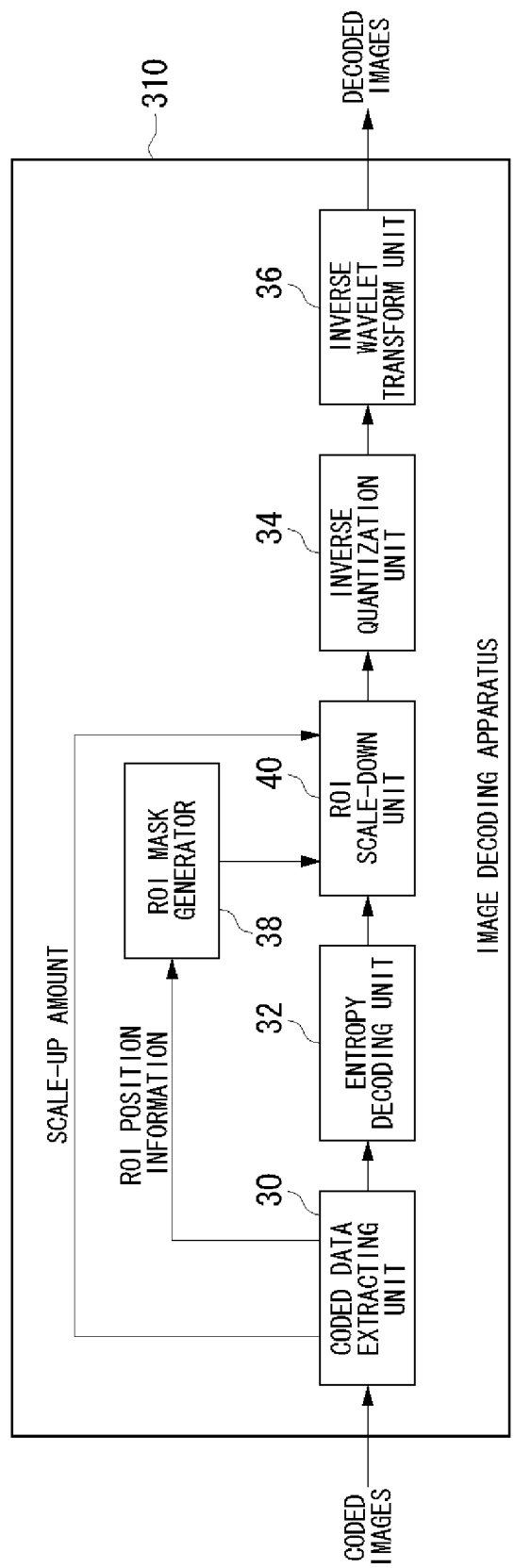
FIG. 22 illustrates a structure of an image decoding apparatus according to a fifth embodiment of the present invention.

FIG. 22 illustrates a structure of an image decoding apparatus 310 according to a fifth embodiment of the present invention. The image decoding apparatus 310 according to this fifth embodiment decodes an image which has been ROI-coded by the image coding apparatus 300.

A coded data extracting unit 30 extracts coded data, various coding parameters, ROI position information and scale-up amounts from the inputted coded image. An entropy decoding unit 32 decodes the coded data bit-plane by bit-plane and stores the derived quantized values of the wavelet transform coefficients in a memory.

Figure 23A:
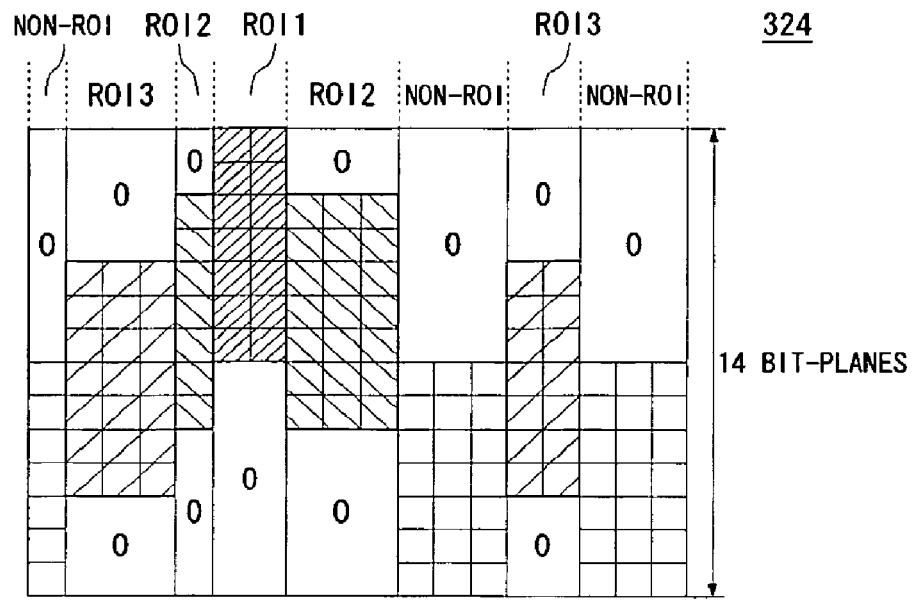
FIGS. 23A and 23B illustrates how wavelet transform coefficients after a decoding of a coded image are scaled down.
Figure 23B:
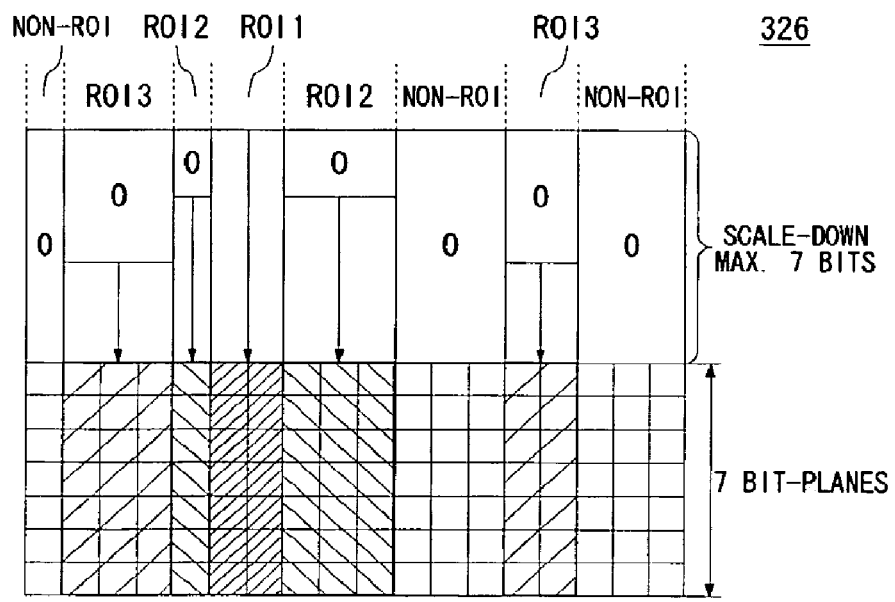

FIG. 23A shows wavelet transform coefficients 324 after an entropy decoding. In correspondence to the example of FIG. 21B, the wavelet transform coefficients 324 after the entropy decoding include a total of 14 bit-planes. A ROI scale-down unit 40 refers to the ROI masks for the respective regions of interest and scales down the ROI transform coefficients of the respective regions of interest by $S_i$ bits based on the scale-up amounts $S_i$ therefore extracted by the coded data extracting unit 30. In this example, the scale-up amounts for the regions of interest ROI1, ROI2 and ROI3 are $S_1=7$, $S_2=5$ and $S_3=3$, and therefore, as shown in FIG. 23B, the ROI transform coefficients of ROI1, ROI2 and ROI3 are scaled-down by 7 bits, 5 bits and 3 bits, respectively. And the digits (or bits, here) left behind by the scale-down are discarded, and as a result, a total of 7 bit-planes of quantized wavelet transform coefficients 326 are derived.

Sixth Embodiment

FIG. 24 illustrates a structure of an image display apparatus 400 according to a sixth embodiment of the present invention. The image display apparatus 400, which displays moving images, may be a display control unit in a DVD (digital video disk) player, a television receiver, a surveillance camera, or the like.

A coding block 420 codes an inputted original image and stores a coded image in a storage unit 440. An original image to be inputted to the coding block 420 are moving image frames, and the moving image frames are coded consecutively and stored in the storage unit 440.

The coding block 420, which may have a structure of an image coding apparatus 200 according to any of the first, third and fifth embodiments of the present invention, receives information on the regions of interest set on a screen from a region selector 450, compression-codes the original image according to the degrees of priority of the regions of interest, and generates a coded image with different image qualities for the respective regions of interest.

A decoding block 430 decodes a coded image read from the storage unit 440 and supplies a decoded image to a display unit 410. A coded image read from the storage unit 440 are coded frames of a moving image, and the coded frames are decoded consecutively and sent to the display unit 410. It is to be noted here that the decoding block 430 may acquire coded images via a communication interface of a wireless or wired network or it may acquire the coded images via a receiving block that receives broadcasting waves.

The decoding block 430, which has a structure of an image decoding apparatus 220 according to any of the first to fifth embodiments of the present invention, decodes a coded-image stored in the storage unit 440. Here, when regions of interest have already been selected at the stage of coding and the image qualities therefore have been adjusted, the decoding block 430 decodes the coded image just as it is. However, when regions of interest have not been selected at the stage of coding, the decoding block 430 receives information on the regions of interest set on the screen from the region selector 450, decodes the regions of interest on a preferential basis, and generates a decoded image with the regions of interest having different image qualities.

The display unit 410 receives a decoded image from the decoding block 430 and outputs it to a display. On the screen of the display, image frames decoded by the decoding block 430 are displayed consecutively, thus reproducing moving images.

The region selector 450 selects a region or regions of interest on the screen of a display. The region of interest may be freely specified by the user or may be set beforehand, for instance, in the middle or in a top part of the screen. The region selector 450 may be provided with a specifying means for the user to specify a region of interest on the screen. For example, the region or regions may be specified, using a pointing device such as a mouse, or a touch-type display device such as a touch panel. The region selector 450 thus receives information specifying a region, of interest from the user or preset information thereon from the display unit 410 and conveys the position information on the region of interest to the coding block 420 and the decoding block 430.

The position information on the region or regions of interest supplied to the coding block 420 and the decoding block 430 from the region selector 450 is given to a ROI selector 18 of the respective blocks, and thereafter the region of interest is coded or decoded preferentially at the respective blocks. It is to be noted that a non-region-of-interest, instead of a region of interest, may be selected by the region selector 450. In such a case, the region other than the non-region-of-interest is coded and decoded preferentially as a region of interest by the coding block 420 and the decoding block 430, respectively.

The first to sixth embodiments described above are only exemplary and it is understood by those skilled in the art that there may exist various modifications to the combination of such each component and process and that such modifications are within the scope of the present invention.

In the embodiments as described above, the low-order bits of non-ROI transform coefficients only are zero-substituted and no scale-up is done for the ROI transform coefficients. However, the scale-up of ROI transform coefficients may be combined with the zero-substitution of the low-order bits of non-ROI transform coefficients.

In all of the above-described embodiments, wavelet transformation has been explained as a method of spatial filtering for the coding of an image, but other spatial frequency transformations may also be employed. For example, a discrete cosine transform used in a JPEG standard can improve the compression efficiency for an image as a whole at the sacrifice of the image quality of the non-region-of-interest and at the same time raise the relative image quality of the region of interest by carrying out a zero-substitution of the low-order bits of the transform coefficients of the non-region-of-interest in a similar manner.

Moreover, by incorporating an image coding apparatus and an image decoding apparatus according to the above embodiments into a signal processing unit of a surveillance camera, the region of interest to be monitored can be coded and decoded preferentially. The data of images which have been shot by the surveillance camera and then coded may be transmitted by way of a network. In such a case, an image decoding apparatus connected to the network reproduces the images by decoding the coded image data received from the network.

Though the foregoing description has been about an image divided into a non-region-of-interest and a plurality of regions of interest, an image may also be divided into a plurality of regions according to their respective degrees of priority without making a distinction between the regions of interest and the non-region-of-interest. In the above embodiments, a non-region-of-interest and a plurality of regions of interest are given an order of priority among them, which practically means that the non-region-of-interest and the regions of interest have differences in the degree of priority only. Which further means that the similar processing can be applied even to a case where an image is divided into regions for each different degree of priority without making any distinction between the non-region-of-interest and the regions of interest.

The present invention further relates to the technology where moving images that differ in resolution or image quality are generated from coded image data streams. Hereinbelow, still another preferred mode of carrying out the present invention will be described. In the present embodiment, considered as an example here is an image processing apparatus that processes images by decoding coded image data conforming to Motion-JPEG2000.

Figure 25:
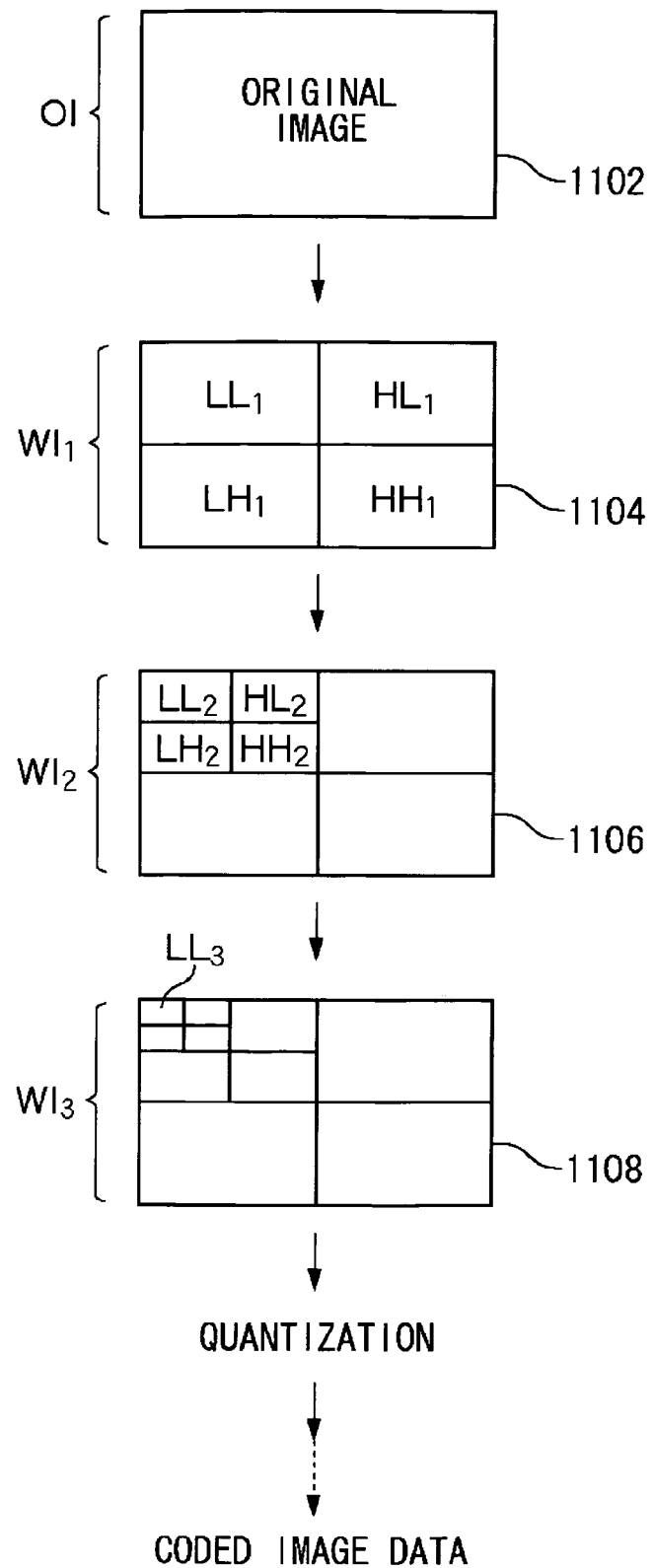
FIG. 25 illustrates a procedure of an image coding processing.

Referring to FIG. 25, a method for coding moving images using a Motion-JPEG2000 scheme is briefly explained first. An image coding apparatus, not shown, codes consecutively each frame of moving images frame by frame so as to generate a coded data stream of moving images. At the start of a coding processing, an original image OI 1102 corresponding to a single frame of the moving images is loaded into a frame buffer. The original image OI which has been loaded into the frame buffer is hierarchized by a wavelet transformer.

The wavelet transformer in JEPG2000 utilizes Daubechies filters. This filter operates as both a low-pass filter and a high-pass filter simultaneously in the respective x and y directions of an image, and divides a single image into four frequency sub-bands. These sub-bands are an LL sub-band which has low-frequency components in both x and y directions, an HL sub-band and an LH sub-band which have a low-frequency component in one of the x and y directions and a high-frequency component in the other, and an HH sub-band which has high-frequency component in both x and y directions. This filter also operates in a manner that the number of pixels in the vertical and horizontal directions of each sub-band is ½ of that of the image before the processing, and one time of filtering produces sub-band images whose resolution, or image size, is ¼ of the original image. In this specification, an image obtained after one time wavelet transform performed on an original image OI is called a first hierarchy image $WI_1$ and, an image obtained after nth time wavelet transform is called an nth hierarchy image $WI_n$ according to the number of times n of wavelet transformations performed on the image OI.

As shown schematically in FIG. 25, four sub-bands $LL_1$, $HL_1$, $LH_1$ and $HH_1$ are produced for the first hierarchy image $WI_1$ 1104. A wavelet transform is performed on the first hierarchy image $WI_1$ 1104 so as to produce a second hierarchy image $WI_2$ 1106. Here, the wavelet transform from the second time onward is carried out to an only LL sub-band component in an image immediately prior thereto. Thus in the second hierarchy image $WI_2$ a sub-band $LL_1$ of the first hierarchy image $WI_1$ is decomposed into four sub-bands $LL_2$, $HL_2$, $LH_2$ and $HH_2$. The wavelet transformer carries out this filtering a predetermined number of times and outputs wavelet transform coefficients for each sub-band. Thereafter, the image coding apparatus carries out quantization and other processings so as to finally output coded image data CI.

For the simplicity of explanation, suppose in this example that the image coding apparatus performs the wavelet transform on the original image OI three times. Thus, if, for example, the original image has 1440×960 pixels, the size of $LL_1$ sub-band in the first hierarchy image $WI_1$ 1104 will be 720×480, the size of $LL_2$ sub-band in the second hierarchy image $WI_2$ 1106 360×240 and the size of $LL_3$ sub-band in the third hierarchy image $WI_3$ 1108 180×120.

Attention shall be directed to observing, with regards to the hierarchized image, that in FIG. 25 the low frequency components in the original image OI appears most likely in and closer to the upper left area. In the case of FIG. 25, the $LL_3$ sub-band at the upper-left corner of the third hierarchy image $WI_3$ shows the lowest frequency. Conversely stating, the most fundamental properties of the original image OI can be reconstructed as long as this $LL_3$ sub-band is obtained. This knowledge and understanding will be utilized in the following embodiment.

The codestream may be, for instance, one for SVD (Scalable Video Codec), where there are both a high-quality SD stream and a low-quality SD stream in a single stream, or one for Motion-JPEG, besides Motion-JPEG2000. In JPEG, each frame is transmitted starting from the lower-degree term of Fourier coefficients, so that the image quality can be selected in accordance with how higher-degree term is used and then decoded.

Seventh Embodiment

A seventh embodiment according to the present invention concerns an image processing apparatus which receives coded image data streams that are hierarchized by resolution and can furnish a display device with moving images that differ in resolution.

Figure 26:
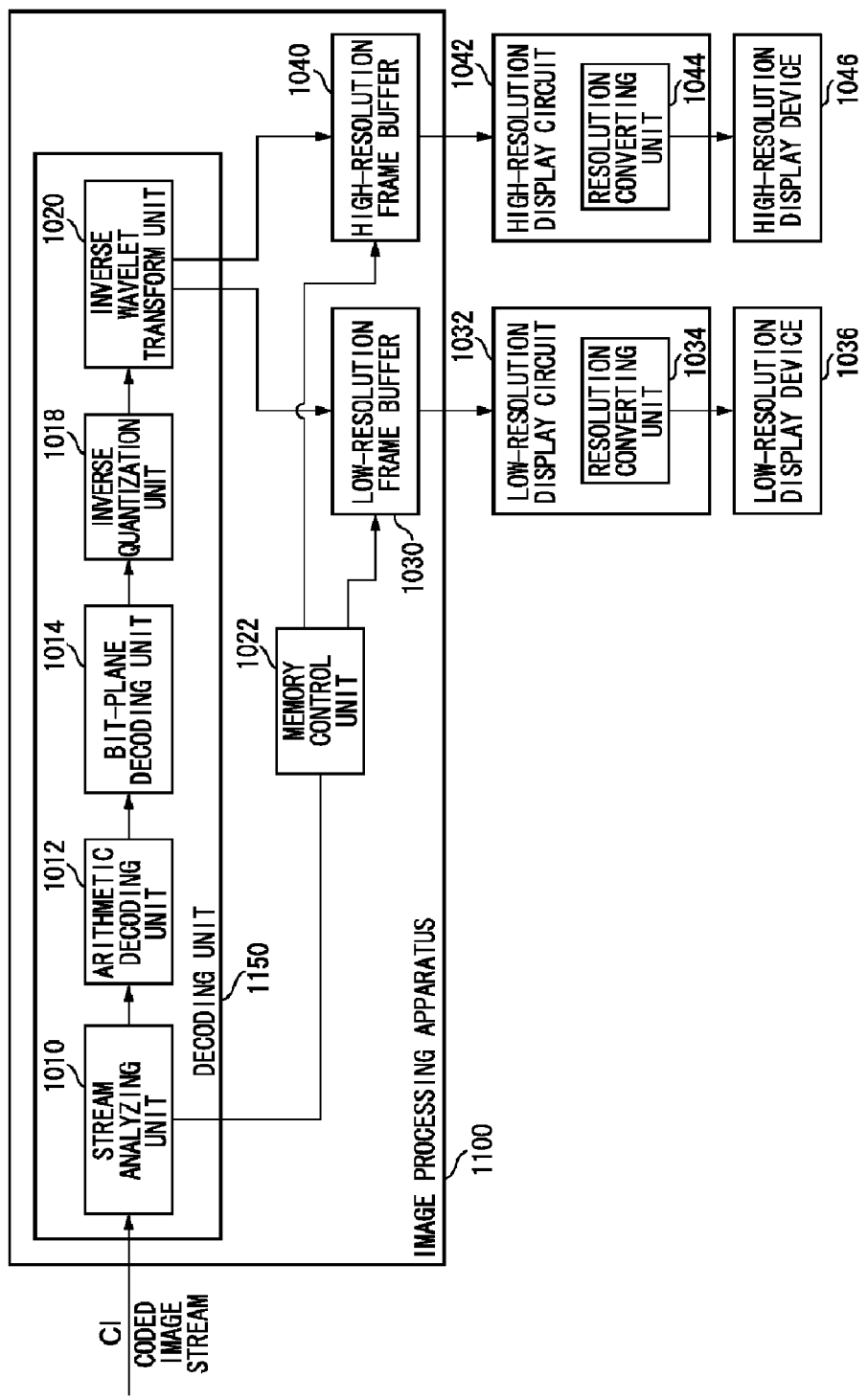
FIG. 26 illustrates a structure of an image processing apparatus according to a seventh embodiment of the present invention.

FIG. 26 illustrates a structure of the image processing apparatus 1100 according to the seventh embodiment of the present invention. In terms of hardware, this structure of image processing apparatus 1100 can be realized by a CPU, a memory and other LSIs of an arbitrary computer. In terms of software, it can be realized by memory-loaded programs which have decoding functions or the like, but drawn and described herein are function blocks that are realized in cooperation with those. Thus, it is understood by those skilled in the art that these function blocks can be realized in a variety of forms such as by hardware only, software only or the combination thereof.

A stream of coded image data CI is inputted to a decoding unit 1150 in the image processing apparatus 1100. The decoding unit 1150 includes a stream analyzing unit 1010 which receives coded image data CI and analyzes the data stream thereof, an arithmetic decoding unit 1012 which decodes arithmetically data sequences to be decoded as determined as a result of the analysis, a bit-plane decoding unit 1014 which decodes the data thus obtained in a form of a bit-plane for each color component, an inverse quantization unit 1018 which inverse-quantizes the decoded quantization data, and an inverse wavelet transform unit 1020 which performs an inverse wavelet transform on an nth hierarchy image $WI_n$ obtained as a result of the inverse quantization. Every time the inverse wavelet transformation is performed on the coded image data CI by the inverse wavelet transform unit 1020, the further upper-hierarchy image is obtained, so that decoded image data DI can be obtained finally.

The seventh embodiment is characterized by a feature that an nth hierarchy image generated in the middle of an inverse-wavelet transform process for obtaining the decoded images DI in the inverse wavelet transform unit 1020 is outputted to a low-resolution frame buffer 1030. The image processing apparatus 1100 operates in a manner that image data suited to the respective resolutions are supplied to a low-resolution display device 1036 which displays low-resolution moving images and a high-resolution display device 1046 which displays high-resolution moving images. Hence, a memory control unit 1022 acquires information on the resolution level of moving images to be displayed by the low-resolution display device 1036 and the high-resolution display device 1046, determines which coded images CI, on which a certain number of wavelet transforms are performed, properly correspond to the respective resolutions, and conveys its result to the inverse wavelet transform unit 1020. According to this information, the inverse wavelet transform unit 1020 writes, into a low-resolution frame buffer 1030 or a high-resolution frame buffer 1040, an LL sub-band of the nth hierarchy image $WI_n$ in the middle of an inverse wavelet transform processing or decode image data DI which is a completely decoded result. This operation will be described later with reference to FIG. 29. It is to be noted here that the low-resolution frame buffer 1030 and the high-resolution frame buffer 1040 are named for descriptive purposes only and no strict distinction therebetween is intended and, hence, they do not necessarily have different buffer sizes.

The image data written to the low-resolution frame buffer 1030 are produced as display signals by a low-resolution display circuit 1032, and then displayed on the low-resolution display device 1036. Similarly, the image data written to the high-resolution frame buffer 1040 are produced as display signals by a high-resolution display circuit 1042, and then displayed on the high-resolution display device 1046. In this manner, the image processing apparatus 1100 can simultaneously display the moving images, which differ in resolution, on a plurality of display devices, using coded image data streams.

Both/either the low-resolution display circuit 1032 and/or the high-resolution display circuit 1042 may be equipped with a resolution converting unit 1034 and/or a resolution converting unit 1044. With this resolution converting unit, if the resolution obtained by an inverse wavelet transform processing in the decoding unit 1150 differs from the resolution of moving images displayed on each of display devices 1036 and 1046, the decoding is done up to an image of the hierarchy having a resolution closest to such the resolution and, thereafter, the resolution converting unit 1034 and/or the resolution converting unit 1044 can covert it to a desired resolution. These resolution converting units 1034 and 1044 are optional and if displaying moving images having resolutions other than those obtained by the inverse wavelet, transform processing is not intended, the low-resolution display circuit 1032 and the high-resolution display circuit 1042 may not be equipped with the resolution converting units 1034 and 1044, respectively.

Figure 27:
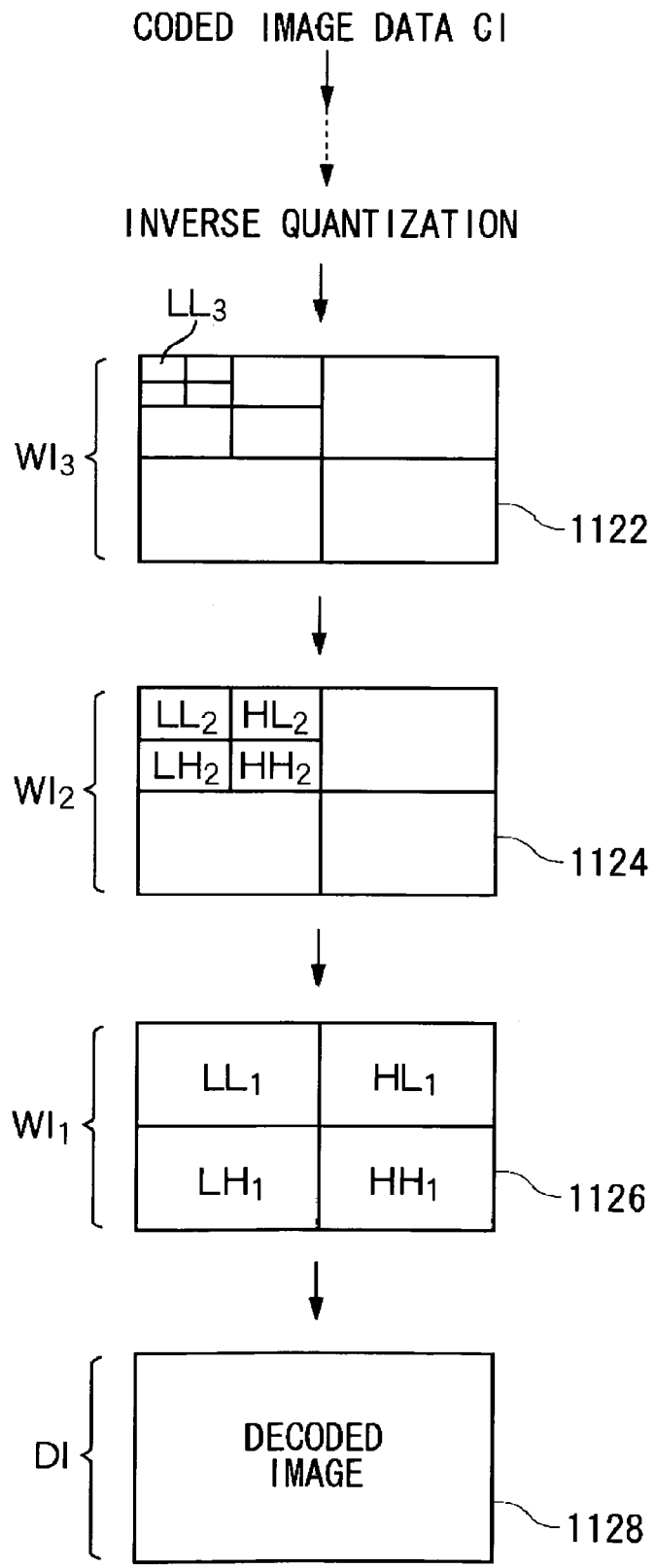
FIG. 27 shows a processing procedure of an image decoding.

FIG. 27 shows a processing procedure in the decoding unit 1150. The following description will be given assuming, as described above, that a stream of coded image data, in which the wavelet transform is carried out three times to the original image OI, is supplied to the image processing apparatus 1100.

First, the coded image data CI inputted to the image processing apparatus 1100 are returned to the state of a third hierarchy image $WI_3$ 1122 by way of the stream analyzing unit 1010, the arithmetic decoding unit 1012, the bit-plane decoding unit 1014 and the inverse quantization unit 1018. Then, as a result of the first-time inverse wavelet transform by the inverse transform unit 1020 a second hierarchy image $WI_2$ 1124 is obtained, as a result of the second-time inverse wavelet transform an image $WI_1$. 1126 corresponding to the first hierarchy is obtained, and finally as a result of the third-time inverse wavelet transform a decoded image DI 1128 is obtained.

It is to be noted here that the LL sub-band in each hierarchy is one such that a low-frequency component is extracted in the hierarchy and the size thereof is ¼ of an image of a hierarchy immediately prior to the hierarchy; hence, such an image has a lower resolution compared to that of the original image OI. Therefore, as an example, the sub-band $LL_1$ (720×480) of the first hierarchy image $WI_1$ 1126 obtained by the second-time inverse wavelet transform can be outputted to the low-resolution frame buffer 1030 as low-resolution image data and the decoded data DI (1440×960) obtained by the third-time inverse wavelet transform can be outputted to the high-resolution frame buffer 1040 as high-resolution image data. After the execution of a wavelet transform the size of an image becomes ½ in the vertical and horizontal directions of each sub-band. Thus, as the number of wavelet transformation done increases, moving images having greater variety of resolutions can be displayed.

Figure 28:
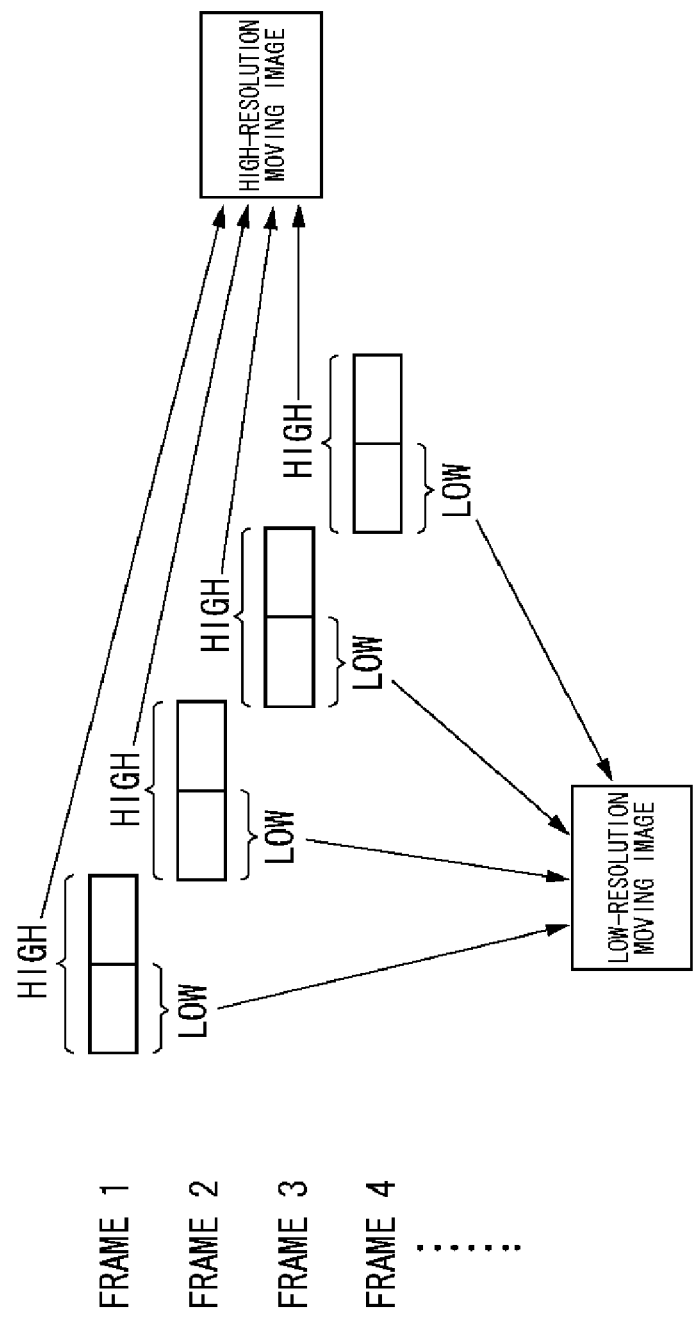
FIG. 28 illustrates a frame processing by an image processing apparatus.

FIG. 28 illustrates conceptually the generation of moving images from each frame. In accordance with an instruction from the memory control unit 1022, the inverse wavelet transform unit 1020 performs a necessary decoding processing on each coded image frame, then outputs low-resolution images to the low-resolution frame buffer 1030 and outputs high-resolution images to the high-resolution frame buffer 1040. And the inverse wavelet transform unit 1020 outputs consecutively the low-resolution images or the high-resolution images at a certain frame rate, so that low-resolution or high-resolution moving images are formed from the same-coded image stream.

Figure 29:
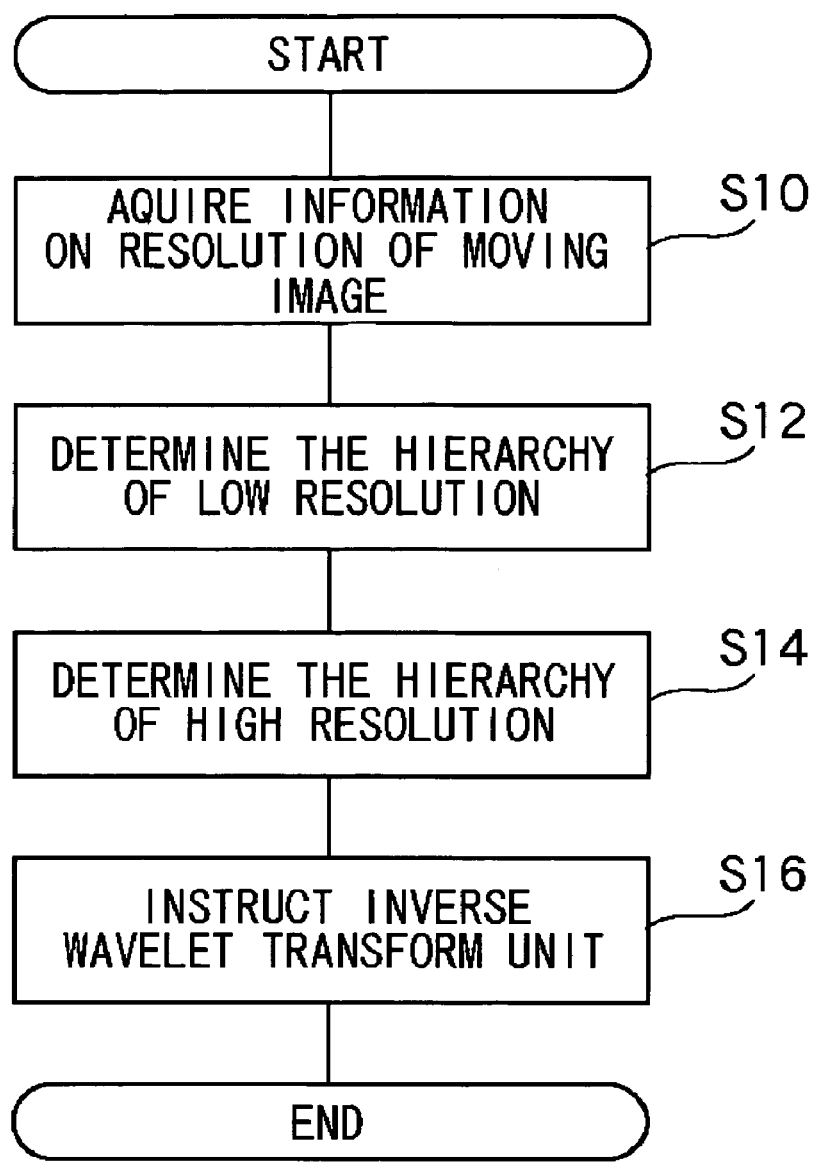
FIG. 29 is a flowchart to explain a processing by a memory control unit.

FIG. 29 is a flowchart to explain an operation of the memory control unit 1022. First, the memory control unit 1022 acquires information on the resolution of moving images displayed by the low-resolution display device 1036 and the high-resolution display device 1046 (S10). Alternatively, a structure may be such that the information on resolution of moving images displayed by the respective display devices is inputted by the user. Next, the memory control unit 1022 determines which hierarchy's LL sub-band, relative to a coded image CI, corresponds to the low-resolution image displayed by the low-resolution display device 1036 (S12). Subsequently, the memory control unit 1022 determines which hierarchy's LL sub-band of an image corresponds to the high-resolution image displayed by the high resolution display device 1046 or if the completely decoded image DI corresponds to the high-resolution image (S14). At the time when the inverse wavelet transform for obtaining the thus determined hierarchy's image at the steps S12 and S14, respectively, has been completed, the memory control unit 1022 instructs the inverse wavelet transform unit 1020 to write the sub-band image LL or the decoded image DI to the low-resolution frame buffer 1030 or the high-resolution frame buffer 1040 (S16). Though obvious, it suffices that either the low-resolution frame buffer 1030 or the high-resolution frame buffer 1040 is used if there is only a single display device to which the image data are be outputted froth the image processing apparatus.

As described before, in JPEG200 the resolution of LL sub-band decreases each time by ½ in the vertical direction and each time by ½ in the horizontal direction relative to the original image, so that there may be cases where an appropriate image that agrees with a desired resolution of a display device cannot be obtained. Thus, if it is judged that suitable resolution cannot be obtained in step S12 or S14, the memory control unit 1022 may instruct the resolution converting units 1034 and 1044 provided in the low-resolution display circuit 1032 and high-resolution display circuit 1042, respectively, to carry out an interpolation processing for the resolution as necessary.

Moreover, by providing the increased number of frame buffers, the image processing apparatus 1100 can display moving images that each differ in resolution on three or more display devices. For instance, using the above-mentioned example, the $LL_2$ sub-band (360×240) of the second hierarchy image $WI_2$ 1124 obtained by the first-time inverse wavelet transform is outputted to a low-resolution frame buffer, the $LL_1$ sub-band (720×480) of the first hierarchy image $WI_1$ 1126 obtained by the second-time inverse wavelet transform is outputted to an intermediate-resolution frame buffer and the decoded image 1128 (1440×960) obtained by the third-time inverse wavelet transform is outputted to a high-resolution frame buffer, so that moving image of low resolution, intermediate resolution and high resolution can be respectively displayed by display circuits corresponding respectively thereto.

As described above, according to the seventh embodiment, the moving images that differ in resolution can be simultaneously displayed on two or more display devices by utilizing a single coded image data stream. Conventionally, decoding must be done for each separate time in accordance with resolution if the use of different resolutions are intended. In contrast thereto, by outputting images in the middle of a decoding processing stage to the frame buffer, the image data having a plurality of resolutions can be generated by a single decoding unit, thus being significantly efficient and advantageous.

Eighth embodiment

Figure 30:
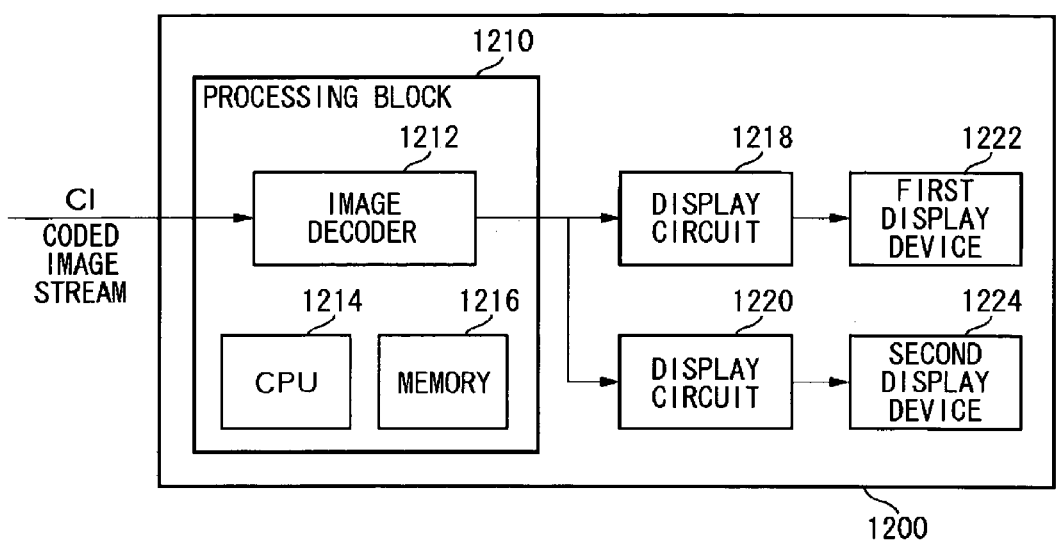
FIG. 30 illustrates a structure of an image display apparatus according to an eighth embodiment of the present invention.

FIG. 30 illustrates a structure of an image display apparatus 1200 according to an eighth embodiment of the present invention. The image display apparatus 1200 includes two display devices, namely, a first display device 1222, such as a display and a projector, which displays high-resolution moving images, and a second display device 1224 which displays low-resolution moving images.

An image decoder 1212 in a processing block 1210 consecutively decodes inputted coded image data streams, in cooperation with a CPU 1214 and a memory 1216. An image decoder 1212 has the structure of the image processing apparatus 1100 described in the seventh embodiment. High-resolution image data are outputted to the first display device 1222 via a display circuit 1218 whereas low-resolution image data are outputted to the second display device 1224 via a display circuit 1220. On each screen, image data decoded by the image decoder 1212 are displayed consecutively at a given frame rate, and moving images are reproduced. The processing block 1210 may acquire a coded image data stream via a communication interface of a wireless or wired network or it may acquire the coded image data stream via a receiving block that receives broadcasting waves.

The following operations can be realized by the use of this image display apparatus 1200.

1. In-Flight Movie Showing

When inside an airplane there is provided a large screen located in front of a cabin and there is provided a small-sized liquid crystal display, for personal use, located on the back of each seat, provision of a single coded image data stream can reproduce moving images on both the screen and the liquid crystal display.

2. Presentation

Provision of a single coded image data stream at a presentation can reproduce moving images on both a large screen projected from a projector and a, PC's screen.

3. Double-Screen Cellular Phone

By incorporating the above-described screen display device into a cellular phone handset having a main display and a sub-display therein, moving-image contents can be displayed on both the main display and the sub-display by receiving a single coded image data stream.

It is to be noted, though obvious, that the image display apparatus 1200 may be equipped with three or more display devices which respectively display moving images that differ respectively in resolution.

Ninth embodiment

An image processing apparatus according to a ninth embodiment of the present invention concerns one that decodes image streams hierarchized by resolution or image quality and then displays the decoded images on a display device, wherein when an instruction to raise the image quality of part of a region in an image is given by a user, a processing amount is controlled in a manner such that the processing amount does not exceed its maximum capacity.

FIG. 31 illustrates a structure of the image processing apparatus 1300 according to the ninth embodiment of the present invention. The image processing apparatus 1300 includes a decoding unit 1310 which receives the input of a stream of coded image data CI and then decodes the images; and a region specifying unit 1320 which performs a processing on a region of interest, in an image, that is specified by a user. A stream analyzing unit 1010, an arithmetic decoding unit 1012, a bit-plane decoding unit 1014, an inverse quantization unit 1018 and an inverse wavelet transform unit 1020 which are contained in the decoding unit 1310 are the same as those described in the seventh embodiment.

The image data decoded by the decoding unit 1310 are displayed on a display device 1062 by a display circuit 1060. Using an input device (not shown) such as a pointing device, the user specifies a region of interest, in an image, whose image quality is to be raised and reproduced accordingly (referred to as "ROI" (region of interest) hereinafter). As a result, a position information creating unit 1050 in the region specifying unit 1320 creates ROT position information indicative of the position of the region of interest ROI. If the region of interest ROI is specified in the form of a rectangle, this ROI position information is given by coordinate values of a pixel at the upper left corner of a rectangular area and the number of pixels in the vertical and horizontal directions of the rectangular area. When the region of interest ROI is specified by the user in the form of a circle or the like, a rectangle that circumscribes the circle may be set as the region of interest. The region of interest may be set in a manner that it is always set in a predetermined region such as a central region in the original image.

A decision unit 1052 calculates, based on the created ROI position information, an amount of increase in a data processing required for setting a region of interest for a higher image quality, and determines whether the total decoding processing amount added with the processing amount at the present time falls within the maximum capacity of the image processing apparatus 1300 or not. Based on this decision result, an image quality instruction unit 1054 determines whether increase in image quality of the region of interest is permitted or not, or determines setting areas other than the region of interest (referred to as "normal area" hereinafter) for a lower image quality, and then a given instruction is outputted to a ROI mask generator 1056. The detailed description of this processing will be given later with reference to FIG. 35 or FIG. 38.

The ROI mask generator 1056 generates ROI masks necessary for specifying a part of wavelet transform coefficients corresponding to a region of interest, based on the ROI position information from the position information creating unit 1050. The thus generated ROI masks are used to adjust the low-order bit numbers, among bit strings of the wavelet transform coefficients, to be substituted with zero values by a lower-bit zero substitution unit 1058. By performing an inverse wavelet transform on the thus adjusted pixels, an image whose region of interest has been set for a higher image quality is obtained. This processing will be described later.

Referring to FIGS. 32A to 32C, a method for generating ROI masks by the ROI mask generator 1056 based on the ROI position information is described herein. As shown in FIG. 32A, suppose that the user specifies a region of interest 1090 in an image 1080 which is decoded and displayed by the image processing apparatus 1300. The ROI mask generator 1056 specifies, at each sub-band, wavelet transform coefficients necessary for restoring the region of interest 1090 selected in the image 1080.

FIG. 32B shows a first-hierarchy transform image 1082 which is obtained by performing one time wavelet transform on the image 1080. The first-hierarchy transform image 1082 is constituted by four first-level sub-bands $LL_1$, $HL_1$, $LH_1$ and $HH_1$. The ROI mask generator 1056 specifies wavelet transform coefficients 1091, 1092, 1093 and 1094 in the first-hierarchy transform image 1082 (referred to as "ROI transform coefficients" hereinafter) necessary for restoring the region of interest in the image 1080 at each of the first-level sub-bands $LL_1$, $HL_1$, $LH^1$ $HH_1$.

FIG. 32C shows a second-hierarchy transform image 1084 which is obtained by performing another wavelet transform on the sub-band $LL_1$ of the transform image 1082 shown in FIG. 32B. Referring to FIG. 32C, the second-hierarchy transform image 1084 contains four second-level sub-bands $LL_2$, $HL_2$, $LH_2$ and $HH_2$ in addition to three first-level sub-bands $HL_1$, $LH_1$. and $HH_1$. The ROI mask generator 1056 specifies wavelet transform coefficients in the second-hierarchy transform image 1084, namely, ROI transform coefficients 1095, 1096, 1097 and 1098 necessary for restoring the ROI transform coefficient 1091 in the sub-band $LL_1$ of the first-hierarchy transform image 1082 at each of the second-level sub-bands $LL_2$, $HL_2$, $LH_2$ $HH_2$.

In the similar manner, by specifying recursively the ROI transform coefficients that correspond to the region of interest 1090 at each hierarchy for a certain number of times corresponding to the number of wavelet transforms done, all ROI transform coefficients necessary for restoring the region of interest 1090 can be specified in the final-hierarchy transform image. The ROI mask generator 1056 generates a ROI mask for specifying the position of this finally specified ROI transform coefficient in the last-hierarchy transform image. For example, when the wavelet transform is carried out two times only, generated are ROI masks which can specify the position of seven ROI transform coefficients 1092 to 1098 which are represented by areas shaded by oblique lines in FIG. 32C.

Figure 33B:
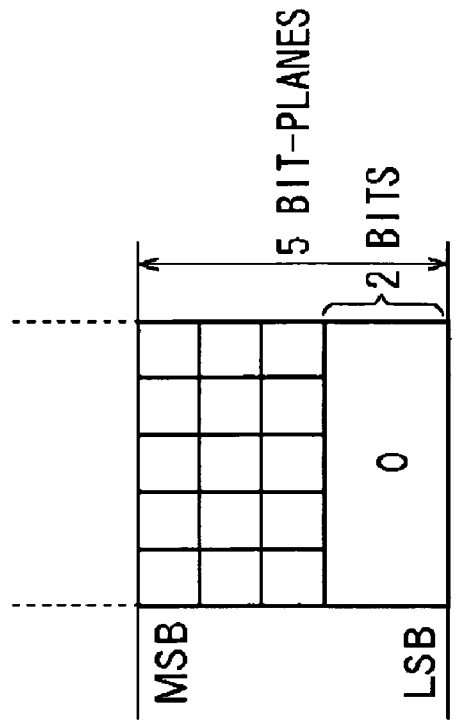
FIGS. 33A and 33B illustrate how low-order bits of wavelet transform coefficients are zero-substituted.
Figure 33A:
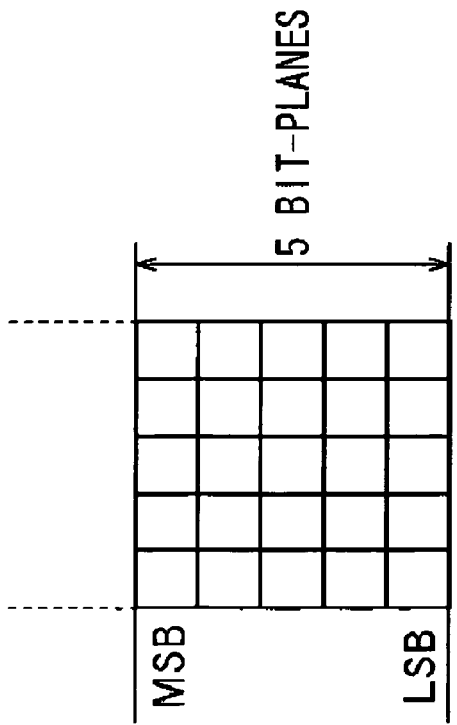

Referring now to FIGS. 33A and 33B and FIGS. 34A to 34C, a method for producing a high image quality for a region of interest will be described. As shown in FIG. 33A, it is assumed here that coded image data CI is constituted by 5 bit-planes from MSB (most significant bit) to LSB (least significant bit).

Normally, when there is no specification of a region of interest by the user, the image processing apparatus 1300 performs a simplified reproduction, in which low-order bit-planes of wavelet transform coefficients are discarded as appropriate in order to reduce processing load. Let us call the image quality in such reproduction "intermediate image quality". In this case, the lower-bit zero substitution unit 1058, as shown in FIG. 33B, zero-substitutes, for example, 2 low-order bits only of the bit-planes decoded by the bit-plane decoding unit 1014, so that the 3 bit-planes only are decoded. If a high image quality is to be realized for the region of interest only from this condition, what is needed is to decode a larger number of bit-planes for the region of interest only.

FIGS. 34A to 34C illustrate an example of processing to realize a high image quality for a region of interest. As shown in FIG. 34A, during a simplified reproduction, 2 low-order bits on the LSB side are being zero-substituted by the lower-bit zero substitution unit 1058. Upon specifying a region of interest by the user, the ROI mask generator 1056 generates a ROI mask corresponding to the region of interest. The shaded part of FIG. 34B represents such a processing. And the lower-bit zero substitution unit 1058 refers to the ROI mask and zero-substitutes the 2 low-order bits only of the non-ROI parts, which are not ROI-masked, to generate the wavelet transform coefficients as shown in FIG. 34C.

The inverse quantization unit 1018 inverse-quantizes the thus generated wavelet transform coefficients, and the inverse wavelet transform unit 1020 inverse-transforms the inverse-quantized wavelet transform coefficients. As a result, image data, of which the region of interest ROI only has a high image quality, are obtained.

Referring now to the flowchart of FIG. 35, the processing performed at the decision unit 1052 will be described hereinbelow. It is presumed here that normally, when there is no region of interest specified by the user, a moving image is being displayed with an intermediate image quality as mentioned above.

First, the decision unit 1052 receives ROI position information on a region of interest from the position information creating unit 1050 (S30). Next, the decision unit 1052 calculates the area (or the number of pixels) of the region of interest from the ROI position information and then calculates the decoding processing amount P for the image processing apparatus 1300 as a whole (S32).

Here, the decoding processing amount P can be given by a total sum of a multiplication of the processing amount of each image quality and the area of the image of each image quality. If the processing amount per unit area for low image quality is denoted by $l_L$, the processing amount per unit area for intermediate image quality by $l_M$, the processing amount per unit area for high image quality by $l_H$, and the area of an entire image by S, then the decoding processing amount for normal operation is expressed as:

$$P=l_M \cdot S \qquad (1)$$

And the decoding processing amount P when a high image quality is set for a region of interest may be calculated by the following equation:

$$P=l_H s_H + l_M(S-s_H) \qquad (2)$$

where $s_H$ is the area of the region of interest specified by the user.

The decision unit 1052 determines if the decoding processing amount P calculated by Equation 2 surpasses the upper-limit processing capacity $P_{max}$ of the image processing apparatus 1300 during one frame period (S34). If the decoding processing amount P is less than or equal to the upper-limit processing capacity $P_{max}$ (NO of S34), the image quality instruction unit 1054 permits the use of high image quality for the region of interest (S36). And if the decoding processing amount P is above the upper-limit processing capacity $P_{max}$ (YES of S34), which means an absence of processing capacity for high-image-quality decoding in the image processing apparatus 1300, the image quality instruction unit 1054 does not permit the use of high image quality for the region of interest (S38).

Figure 35:
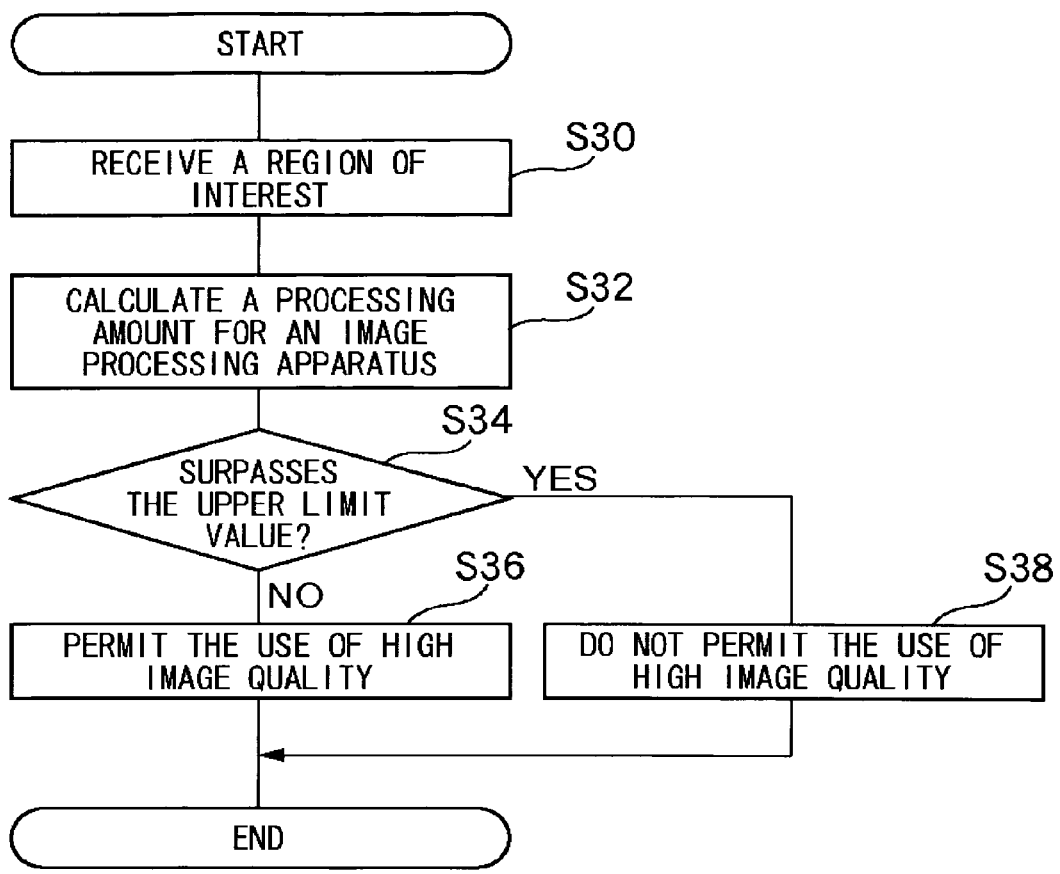
FIG. 35 is a flowchart explaining a processing at a decision unit, according to the ninth embodiment.
Figures 36A, 36B:
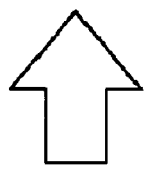
FIGS. 36A and 36B illustrate how a region of interest is set for high image quality.

FIGS. 36A and 36B schematically illustrate the conditions of a screen when it is determined that the decoding processing amount P is less than or equal to the upper-limit processing capacity $P_{max}$ at S34 in the flowchart of FIG. 35. In FIGS. 36A and 36B, "L" represents a region of low image quality, "M" a region of intermediate image quality, and "H" a region of high image quality. If the user specifies a region of interest on the screen while an image as a whole is being decoded with intermediate image quality as shown in FIG. 36A, then the region of interest only will be displayed with high image quality (H) and the other region will remain unchanged with intermediate image quality (M) as shown in FIG. 36B.

With an image processing apparatus according to the ninth embodiment described as above, a region of interest will be set to high image quality if the image processing apparatus has extra decoding capacity when the user specifies the region of interest to be reproduced with high image quality within an image having been decoded and now being displayed, but the region of interest will not be set to high image quality if the image processing apparatus does not have any extra decoding capacity then.

When a region of interest is specified, the region of interest only can be reproduced with higher quality than that of the other region which remains substantially the same as in a simplified reproduction. This feature proves particularly useful in applications, such as surveillance images, which require a reproduction of the areas of interest with higher quality only in time of abnormal incident.

Figure 37A:
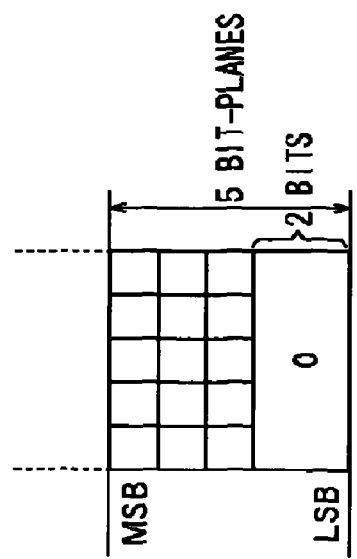
FIGS. 37A to 37C illustrate how low-order bits of wavelet transform coefficients are zero-substituted when a region of interest is specified in an original image and an amount of the processing is large.
Figure 37B:
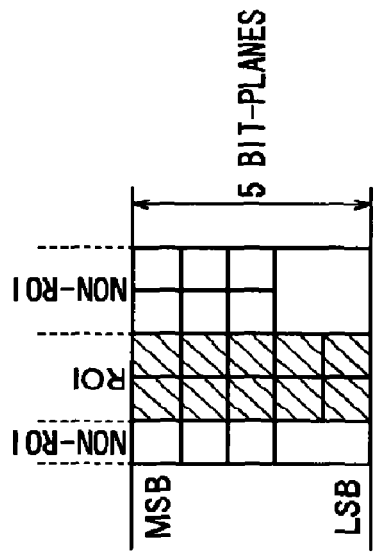
Figure 37C:
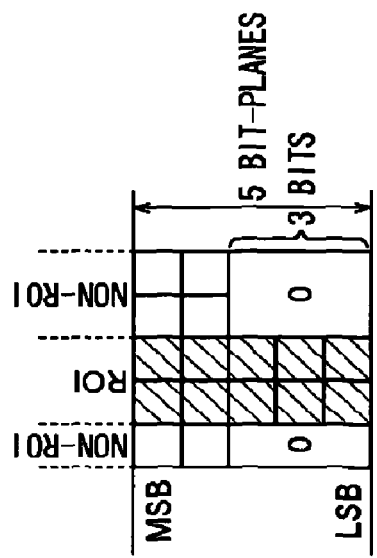

Referring to FIGS. 37A to 37C, another example of the case of processing will be described wherein use of a high image quality for a region of interest results in a shortage of processing capacity of an image processing apparatus 1300.

As shown in FIG. 37A, it is assumed that during a simplified reproduction, 2 low-order bits on the LSB side are zero-substituted by a lower-bit zero substitution unit 1058. Upon specifying of a region of interest by the user, the ROI mask generator 1056 generates a ROI mask corresponding to the region of interest. The shaded part of FIG. 37B represents such a processing. In this case, however, if a high image quality is used for a larger area of the region of interest than in FIG. 34B, then the processing capacity of the image processing apparatus 1300 becomes insufficient. In such a case, the lower-bit zero substitution unit 1058 refers to the ROI mask and zero-substitutes 3 low-order bits, instead of the 2 low-order bits, of the non-ROI parts, which are not ROI-masked, to generate the wavelet transform coefficients as shown in FIG. 37C.

Then the inverse quantization 1018 inverse-quantizes the thus generated wavelet transform coefficients, and the inverse wavelet transform unit 1020 inverse-transforms the inverse-quantized wavelet transform coefficients. As a result, image data, of which the region of interest ROI has a high image quality and the other region has a lowered image quality, are obtained. In this manner, in a case where the processing capacity of the image processing apparatus becomes insufficient by the use of a high image quality for a ROI-masked region of interest, that is, by an increase in the number of bit-planes, the processing amount of the image processing apparatus as a whole is balanced by reducing the number of bit-planes in the other region which is not ROI-masked.

Referring to the flowchart of FIG. 38, a description will be given of the processing performed at the decision unit 1052 when use of a high image quality for a region of interest results in a shortage of processing capacity of the image processing apparatus 1300. In the same way as in FIG. 35, it is presumed that normally, when there is no region of interest specified by the user, a moving image is being displayed with an intermediate image quality as mentioned above.

Reception of a region of interest (S50) and calculation of the decoding processing amount P for the image processing apparatus 1300 as a whole (S52) are the same as S30 and S32 of FIG. 35. The decision unit 1052 determines whether or not the decoding processing amount P calculated at S52 surpasses the upper-limit processing capacity $P_{max}$ of the image processing apparatus 1300 during one frame period (S54). If the decoding processing amount P is less than or equal to the upper-limit processing capacity $P_{max}$ (NO of S54), the image quality instruction unit 1054 permits the use of a high image quality for the region of interest (S64).

And if the decoding processing amount P is above the upper-limit processing capacity $P_{max}$ the decision unit 1052 calculates a processing amount $l_1$, which satisfies $$P=l_H s_H + l_L(S-s_H) \qquad (3)$$

and determines an image quality for the normal region (S56). Then the image quality instruction unit 1054 displays on a display device a warning screen for the user asking if he/she accepts a drop in image quality for the normal region which is the region other than the region of interest (S58). Now if the user expresses his/her intention of not accepting it via an input device (not shown) (NO of S60), the image quality instruction unit 1054 will not permit the use of a high image quality for the region of interest (S66). Or if the user expresses his/her intention of accepting it (YES of S60), the image quality instruction unit 1054 will issue instructions to raise the image quality for the region of interest and lower the image quality for the normal region decoding processing amount P is held equal to or below the upper-limit processing capacity $P_{max}$.

Figure 38:
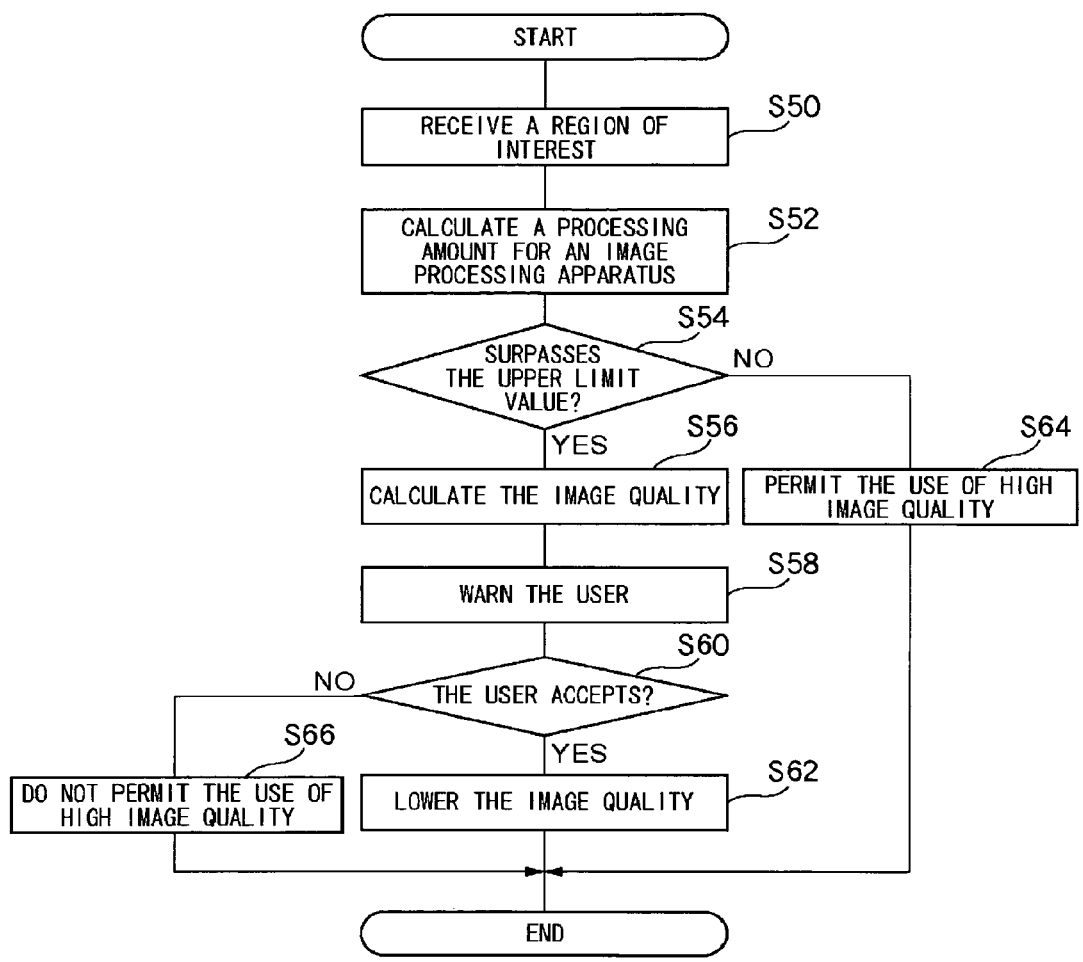
FIG. 38 is a flowchart explaining another processing, at a decision unit according to the ninth-embodiment.
Figures 39A, 39B:
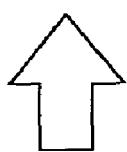
FIGS. 39A and 39B illustrate how a region of interest is set for high image quality and a normal region is set for low image quality.

FIGS. 39A and 39B schematically illustrate the conditions of a screen when the user accepts a drop in image quality for the normal region which is the region other than the region of interest at S60 in the flowchart of FIG. 38. If the user specifies a region of interest on the screen while an image as a whole is being decoded with intermediate image quality (M) as shown in FIG. 39A, then the region of interest will be displayed with a high image quality (H) and the normal region which is the region other than the specified region of interest will be displayed with a lowered image quality (L) as shown in FIG. 39B.

According to this ninth embodiment, when the user specifies a region of interest which he/she desires to be reproduced with high image quality, the high image quality is realized by increasing the decoding processing amount for the region of interest, and at the same time the decoding processing amount for the normal region which is the region other than the region of interest is reduced by a corresponding amount so as to hold the processing amount of the image processing apparatus as a whole less than or equal to its upper-limit processing capacity. As a result, such a region as the user is interested in may be reproduced with a high image-quality without increasing the processing amount of an image processing apparatus. Furthermore, any drop of frames that results from the decoding processing amount exceeding the capacity of an image processing apparatus can be avoided.

As another example of the present embodiment, when a region of interest is specified by the user, the arrangement may be such that the image quality for the region of interest is maintained at an intermediate image quality whereas that for the normal region which is the region other than the region of interest is lowered to a low image quality. In this case, the lower-bit zero substitution 1058 zero-substitutes the low-order bits of the wavelet transform coefficients corresponding to the non-ROI areas, so that decoding can be done with a relatively higher image quality for the region of interest than for the remaining region which is the normal region. FIGS. 40A and 40B illustrate how the image quality for a ROI is held at the intermediate level (M) and that for the normal region is lowered to the low quality (L). If the user specifies a region of interest on the screen while an image as a whole is being decoded with intermediate image quality (M) as shown in FIG. 40A, then the region of interest will continue to be displayed with the same intermediate image quality, but the normal region will be displayed with a lowered image quality (L) as shown in FIG. 40B. This will present a display screen which shows the region of interest distinctly, thus improving the user's subjective sense of image quality.

In the foregoing description, image quality is divided into three levels of high, intermediate and low, but the image quality may be divided into more than three levels depending on the number of low-order bits to be zero-substituted.

The user may specify a plurality of regions of interest. When two regions of interest are specified by the user, the image quality instruction unit 1054 may specify a high image quality for one of the regions of interest and the same unchanged image quality for the other, according to a decoding processing amount. And the regions of interest may be set by the position information creating unit 1050, which automatically extracts important regions that contains humans, characters or the like, instead of being specified by the user.

If the decoding processing amount P surpasses the upper-limit processing capacity $P_{max}$ in a determination with the regions of interest set for a high image quality, the image quality instruction unit 1054 may instruct the decoding unit 1310 to lower the frame rate of moving images to be outputted. This reduces the decoding processing amount per unit time of an image processing apparatus as a whole, and as a result, high image quality can be achieved for the regions of interest despite a lowered temporal resolution.

Tenth Embodiment

Figure 41:
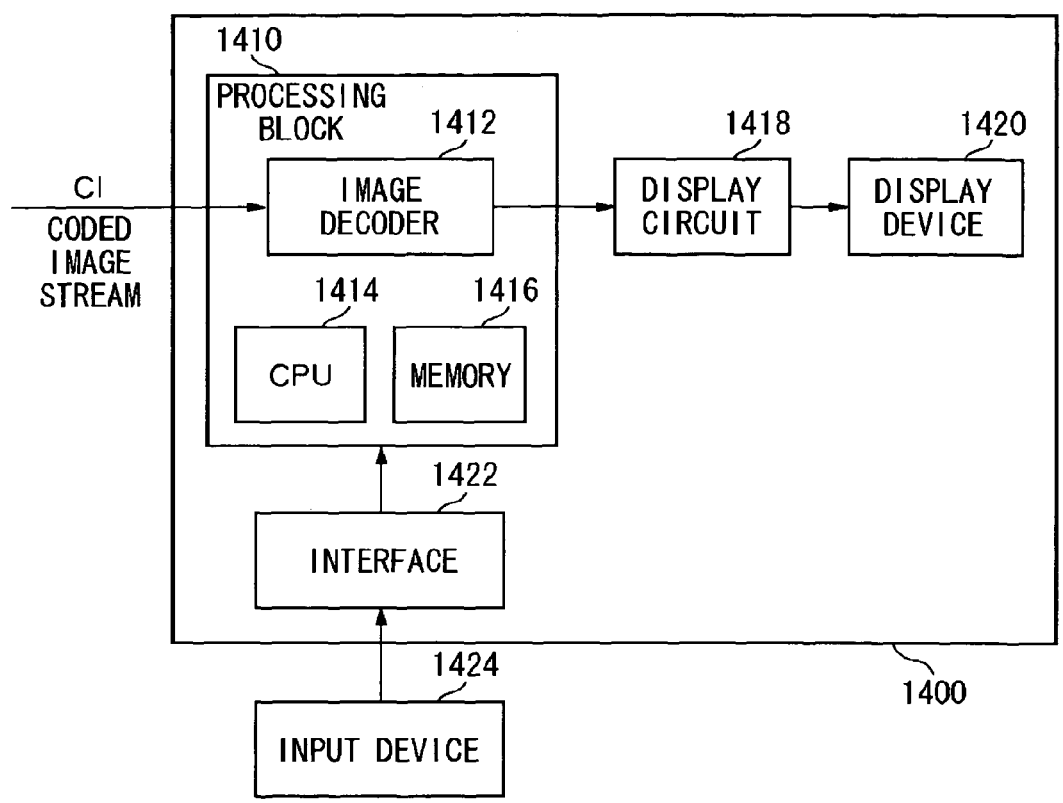
FIG. 41 illustrates a structure of an image display apparatus according to a tenth embodiment of the present invention.

FIG. 41 illustrates a structure of an image display apparatus 1400 according to a tenth embodiment of the present invention. The image display apparatus 1400, which displays moving images on a display device such as a display, may be realized, for instance, as a display control unit in a television receiver, a surveillance camera or the like.

An image decoder 1412 within a processing block 1410, in cooperation with a CPU 1414 and a memory 1416, decodes a data stream of inputted coded images consecutively. The image decoder 1412 has a structure of an image processing apparatus 1300 according to the ninth embodiment. It is to be noted that the processing block 1410 may acquire a data stream of coded images via a communication interface of a wireless or wired network or it may acquire the data stream of coded images via a receiver block that receives broadcasting waves.

A display circuit 1418 receives decoded images from the processing block 1410 and outputs them to a display device 1420. On the display device 1420, the decoded image frames are displayed consecutively, thus reproducing the moving images.

The user specifies a region of interest in an image being displayed on the display device 1420, using an input device such as a pointing device, or the user specifies the region of interest, using a touch-type display device such as a touch panel. Information on the region of interest is inputted to the processing block 1410 via an interface 1422. The processing block 1410 receives the information on the region of interest and generates a decoded image with a different image quality for the region of interest.

By employing this image display apparatus 1400 according to the tenth embodiment, the user can have the region selected by himself/herself displayed with a higher image quality in an image taken from a motion picture or a surveillance camera.

Eleventh Embodiment

An image display system according to an eleventh embodiment receives a data stream of coded images hierarchized by resolution, decodes consecutively the respective coded frames by a decoding unit and provides moving image data to both a display device which displays low-resolution moving images and another display device which displays high-resolution moving images. And it produces the improved image quality for both the moving image at low resolution and the moving image at high resolution when an instruction is given by the user to raise the image quality for part of a region in an image at either one of the display devices.

FIG. 42 illustrates a structure of an image system 1500 according to the eleventh embodiment of the present invention. Since display circuits 1218 and 1220 and a first display unit 1222 and a second display unit 1224 are identical to those in the eighth embodiment, the same reference numerals are used therefore. A decoding unit 1512 and a region specifying unit 1514 have the same respective structures as a decoding unit 1310 and a region specifying unit 1320 of the ninth embodiment shown in FIG. 31.

The decoding unit 1512 in an image processing apparatus 1510 decodes a data stream of inputted coded images consecutively. And the image data of high resolution are outputted to the first display device 1222 for displaying moving images at high resolution by way of a frame buffer 1516 and a display circuit 1218, whereas the image data of low resolution are outputted to the second display device 1224 for displaying moving images at low resolution by way of a frame buffer 1518 and a display circuit 1220. This processing is carried out according to the procedure described in the seventh embodiment. And on the first display device 1222 and the second display device 1224, decoded image data are displayed consecutively at a given frame rate, thus reproducing the moving images. The image processing apparatus 1510 may acquire a data stream of coded images via a communication interface of a wireless or wired network or it may acquire the data stream of coded images via a receiver block that receives broadcasting waves.

The user specifies a region of interest in an image being displayed on the first display device 1222 or the second display device 1224, using an input device 1524 such as a pointing device, or the user specifies the region of interest, using a touch-type display device such as a touch panel. Information on the region of interest is inputted to the image processing apparatus 1510 via an interface 1522. A region specifying unit 1514 receives the information on the region of interest, decides on whether to use a high image quality for the region of interest or not, and conveys the decision result to the decoding unit 1512. Now the decoding unit 1512, based on the conveyed decision result, generates image data with a difference in image quality between the region of interest and the other region, namely the normal region, for both the image data of high resolution and the image data of low resolution. This processing is carried out according to the procedure described in the ninth embodiment. Thereafter, the moving images are reproduced on the first display unit 1222 and the second display unit 1224 in the same manner as has been described above.

According to this eleventh embodiment, when moving images are being displayed simultaneously at different resolutions on a plurality of display units, specifying a region of interest from any one of the plurality of display devices can effect a rise of image quality for the region of interest on the other of the display units as well. For example, when a moving image is being reproduced on both a large screen projected by a projector and a PC screen in a presentation, a dramatic effect can be produced by this system by impressing a particular image on the audience. Also, in a surveillance camera system, when the same surveillance image stream is being displayed on a plurality of displays in different security rooms, a particular region in an image to be noted can be emphasized to the other surveillance staff in the other rooms.

It will also be apparent to those skilled in the art that an image display system 1500 may be provided with three or more display devices for displaying moving images at their respective resolutions.

The seventh to eleventh embodiments described above are only exemplary and it is understood by those skilled in the art that there may exist various modifications to the combination of such each component and process and that such modifications are within the scope of the present invention.

In all of the above-described embodiments, wavelet transform has been explained as a method of spatial filtering for the coding of an image, but other spatial frequency transformations may also be employed therefor. For example, a discrete cosine transform used in a JPEG standard can raise a relative image quality for a region of interest by carrying out a zero-substitution of the low-order bits of the transform coefficients of the non-region-of-interest in a similar manner and thereby can reduce the processing amount of an image processing apparatus as a whole at the sacrifice of the image quality of the non-region-of-interest.

Although the present invention has been described by way of exemplary embodiments, it should be understood that many other changes and substitutions may further be made by those skilled in the art without departing from the scope of the present invention which is defined by the appended claims.

What is claimed is:

1. An image coding apparatus, comprising:
a selector which selects a region of interest on a moving image;
a coding unit which encodes the moving image; and
a generator which generates a codestream including therein the coded moving image and information for specifying the region of interest,
wherein when a plurality of regions of interest are defined on the moving image, the information for specifying the plurality of regions of interest includes a degree of priority thereof, and wherein the degree of priority is indicated by a zero substitution of non-region of interest transform coefficients.

2. An image coding apparatus according to claim 1, wherein the coding unit encodes the moving image in such a manner that image quality of the region of interest defined on the moving image is different from the other region.

3. An image coding apparatus according to claim 2, wherein the coding unit encodes the moving image in such a manner that image quality of the plurality of the regions of interest defined on the moving image is different from each other according to the respective degree of priority.

4. An image coding apparatus, comprising:
a selector which selects a plurality of regions of interest on an image;
a coding unit which encodes the image; and
a generator which generates a codestream including therein the coded image and information for specifying the plurality of the regions of interest,
wherein the information for specifying the plurality of regions of interest includes a degree of priority of the respective region of interest, and wherein the degree of priority is indicated by a zero substitution of non-region of interest transform coefficients.

5. An image coding apparatus according to claim 4, therein the coding unit encodes the image in such a manner that image quality of the plurality of the regions of interest defined on the image is different from each other.

6. An image coding apparatus according to claim 5, wherein the coding unit encodes the image in such a manner that image quality of the plurality of the regions of interest defined on the image is different from each other according to the respective degree of priority.

* * * * *